United States Patent
Hanson et al.

(12) 
(10) Patent No.: US 6,375,344 B1
(45) Date of Patent: *Apr. 23, 2002

(54) DATA CAPTURE SYSTEM WITH COMMUNICATING AND RECHARGING DOCKING APPARATUS AND HAND-HELD DATA TERMINAL MEANS COOPERABLE THEREWITH

(76) Inventors: George E. Hanson, 1139 O Ave. NW., Cedar Rapids, IA (US) 52405; Keith K. Cargin, Jr., 3219 Blue Ridge Dr. NE., Cedar Rapids, IA (US) 52402

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/647,477

(22) Filed: May 14, 1996

Related U.S. Application Data

(63) Continuation of application No. 08/171,390, filed on Dec. 21, 1993, now Pat. No. 5,517,434, which is a continuation-in-part of application No. 08/050,704, filed on Apr. 21, 1993, now abandoned, which is a continuation-in-part of application No. 07/909,139, filed on Jul. 6, 1992, now abandoned, which is a continuation of application No. 07/345,200, filed on Apr. 28, 1989, now abandoned, which is a continuation-in-part of application No. 07/305,302, filed on Jan. 31, 1989, now abandoned, said application No. 08/171,390, is a continuation-in-part of application No. 07/984,980, filed on Nov. 30, 1992, now abandoned, which is a continuation-in-part of application No. 07/921,449, filed on Jul. 28, 1992, now abandoned, which is a continuation-in-part of application No. 07/707,954, filed on May 22, 1991, now abandoned, which is a continuation-in-part of application No. 07/364,594, filed on Jun. 7, 1989, now abandoned, and a continuation-in-part of application No. 07/364,902, filed on Jun. 8, 1989, said application No. 07/364,594, is a continuation-in-part of application No. 07/339,330, filed on Apr. 14, 1989, now abandoned, said application No. 08/171,390, is a continuation-in-part of application No. 07/561,994, filed on Jul. 31, 1990, now abandoned, which is a continuation-in-part of application No. 07/305,302, filed on Jan. 31, 1989, now abandoned, and a continuation-in-part of application No. 07/345,200, filed on Apr. 28, 1989, now abandoned, and a continuation-in-part of application No. 07/347,200, filed on May 3, 1989, now abandoned, and a continuation-in-part of application No. 07/347,849, filed on May 3, 1989, now abandoned, and a continuation-in-part of application No. 07/364,594, filed on Jun. 7, 1989, now abandoned.

(51) Int. Cl.⁷ .............................................. G06F 1/16
(52) U.S. Cl. ...................................... 364/708.1; 320/2
(58) Field of Search ........................ 364/708.1, 709.01, 364/709.4; 235/430, 462, 472; 320/2

(56) References Cited

U.S. PATENT DOCUMENTS

| | | | | |
|---|---|---|---|---|
| 4,721,849 A | * | 1/1988 | Davis et al. | 235/472 |
| 4,773,032 A | * | 9/1988 | Uehara et al. | 364/709.04 |
| 4,916,441 A | * | 4/1990 | Gombrich | 345/169 |
| 4,953,113 A | * | 8/1990 | Chadima, Jr. et al. | 361/680 |
| 5,052,943 A | * | 10/1991 | Davis | 439/357 |
| 5,517,434 A | * | 5/1996 | Hanson et al. | 364/708.1 |

* cited by examiner

Primary Examiner—Chuong Dinh Ngo

(57) ABSTRACT

In an exemplary embodiment, a hand-held data terminal has external electrical contact pads which mate with resilient contacts of a docking receptacle for the interchange of data and the supply of charging current to the terminal. The terminal may be loaded into and removed from the docking receptacle in a single motion with one hand. Keyboard and display of the terminal are fully accessible while in the docking receptacle. The terminal may be fully sealed and be completely free of the conventional pin and socket type electrical connector fittings at its exterior. Electrostatic discharge protection is provided by circuit components connected to the surface contact pads so that the sensitive electronic circuitry of the terminal is protected from electrostatic discharge transients.

32 Claims, 33 Drawing Sheets

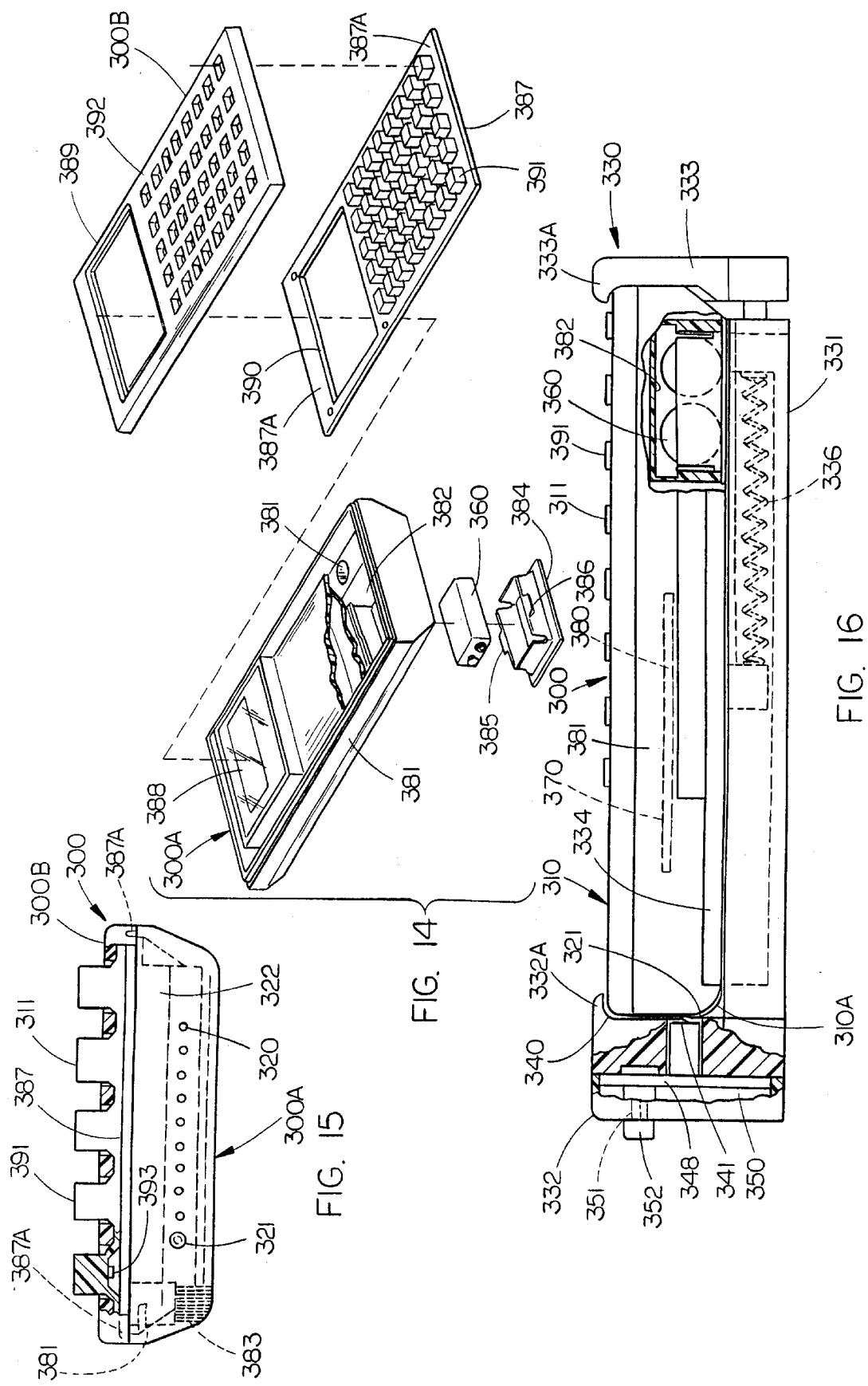

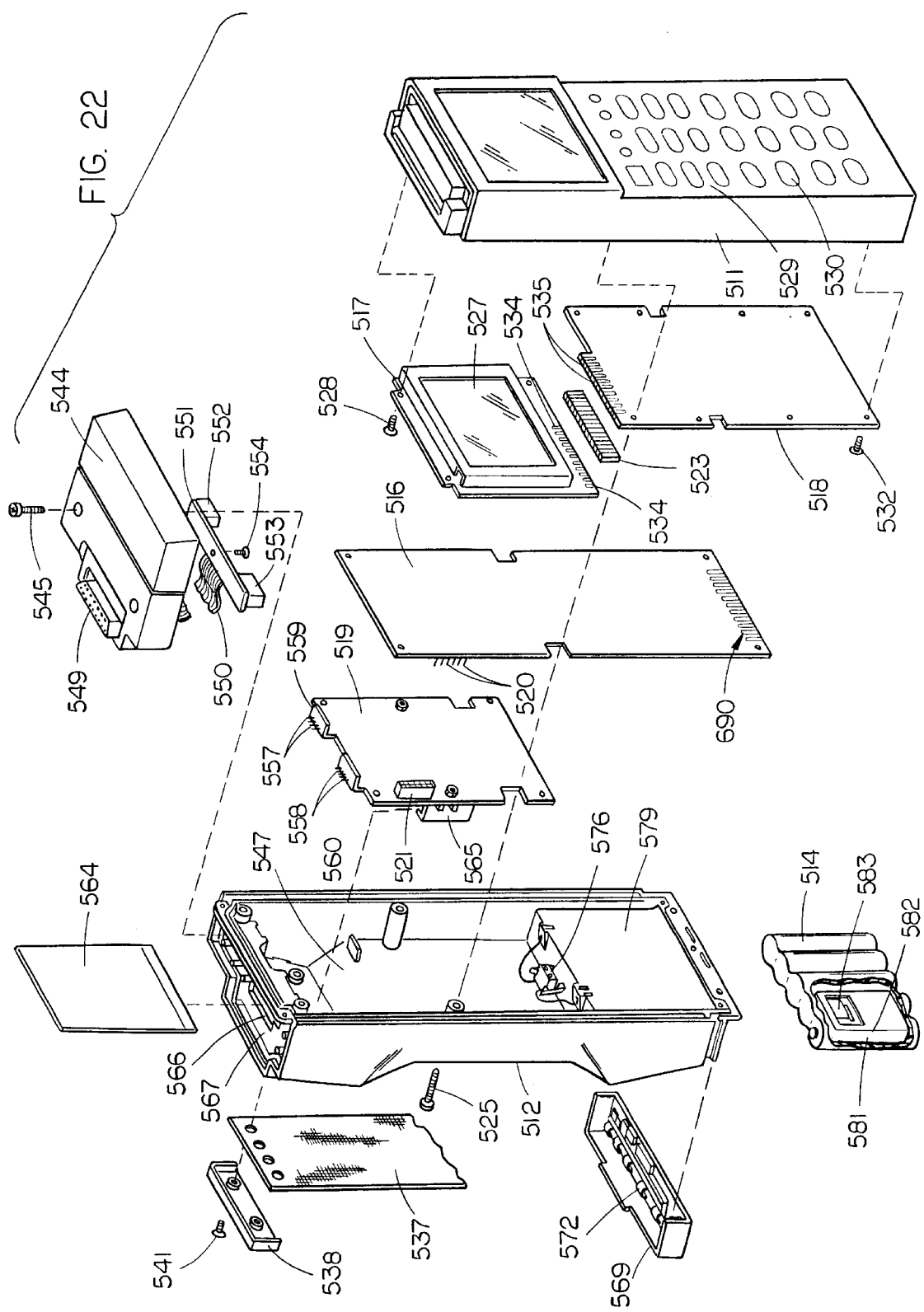

DATA CAPTURE SYSTEM WITH COMMUNICATING AND RECHARGING DOCKING APPARATUS AND HAND-HELD DATA TERMINAL MEANS COOPERABLE THEREWITH

CROSS-REFERENCE TO RELATED APPLICATIONS

The present application is a continuation of U.S. application Ser. No. 08/171,390, filed Dec. 21, 1993 (now U.S. Pat. No. 5,517,434), which is a continuation-in-part of U.S. application Ser. No. 08/050,704, filed Apr. 21, 1993 (now abandoned), which is a continuation-in-part of U.S. application Ser. No. 07/909,139, filed Jul. 6, 1992 (now abandoned), which is a continuation of U.S. application Ser. No. 07/345,200, filed Apr. 28, 1989 (now abandoned), which is a continuation-in-part of U.S. application Ser. No. 07/305,302, filed Jan. 31, 1989 (now abandoned).

Said U.S. application Ser. No. 08/171,390 is also a continuation-in-part of U.S. application Ser. No. 07/984,980, filed Nov. 30, 1992 (now abandoned), which is a continuation-in-part of U.S. application Ser. No. 07/921,449, filed Jul. 28, 1992 (now abandoned), which is a continuation-in-part of U.S. application Ser. No. 07/707,954, filed May 22, 1991 (now abandoned), which is a continuation-in-part of respective U.S. application Ser. No. 07/364,594, filed Jun. 7, 1989 (now abandoned) and Ser. No. 07/364,902, filed Jun. 8, 1989.

Said U.S. application Ser. No. 07/364,594 is in turn a continuation-in-part of U.S. application Ser. No. 07/339,330, filed Apr. 14, 1989 (now abandoned).

Said U.S. application Ser. No. 08/171,390 is also a continuation-in-part of U.S. application Ser. No. 07/561,994, filed Jul. 31, 1990 (now abandoned), which is a continuation-in-part of the following U.S. applications which are incorporated by reference in Ser. No. 07/561,994: U.S. application Ser. No. 07/305,302, filed Jan. 31, 1989 (now abandoned), U.S. application Ser. No. 07/345,200, filed Apr. 28, 1989 (now abandoned), U.S. application Ser. No. 07/347,200, filed May 3, 1989 (now abandoned), U.S. application Ser. No. 07/347,849, filed May 3, 1989 (now abandoned), and U.S. application Ser. No. 07/364,594, filed Jun. 7, 1989 (now abandoned).

BACKGROUND OF THE INVENTION

In the data capture field, there are many applications where hand-held data terminals should be of rugged construction so as to survive rough handling. Many operators are not inclined toward painstaking or precise manipulations. An example is in the use of RF data capture terminals on forklift trucks in factories and warehouses where items to be transported are identified by bar codes. Other examples are found in the field of route delivery and direct store delivery where many items are handled and the terminal means automates the accounting function. Even in applications where bar code data is transmitted on-line to a central station, it may be desirable for hand-held terminals to be inserted into docking apparatus for the interchange of data signals e.g. the loading of scheduling information or the like into the terminal at the beginning of a working shift. Further where terminal means has memory capacity for accumulating data during a delivery operation or the like, it may be desirable for such data to be transferred to a printer so that a hard copy may be produced. In cases where rechargeable batteries are used, the docking apparatus may provide for the recharging of such batteries at the same time as data communication is taking place.

It is conceived that it would be highly advantageous to provide a data capture system with docking apparatus adaptable to a wide range of terminal means, and which furthermore could be quickly and simply loaded in a relatively foolproof manner, and without requiring attention and care from operators engaged in physically demanding and arduous work routines. A docking apparatus would be desirable that completely avoids the use of mating pin and socket type electrical connections, and that does not rely on a specialized configuration of the terminal, e.g. the provision of an optical scanner tip which may be used for data communication.

SUMMARY OF THE INVENTION

The present invention relates particularly to data capture systems utilizing portable data terminal means which are to be held in one hand during data capture operation; however the invention is also applicable to portable data terminal means which may be mounted e.g. on a belt or e.g. on a vehicle during data capture operation. The data terminal means preferably will be of size and weight to be held in one hand, even though not so held during data capture operation. Also the data terminal means may be provided with batteries so as to be capable of portable operation, and such batteries may be rechargeable.

In a typical case, the portable data terminal means will have user interface means such as a manually operated data input (e.g. a keyboard) and/or a data output (e.g. a liquid crystal display), and will contain data storage means for the storage of programming instructions and/or program data, and/or for the storage of data capture information.

In accordance with an important aspect of the present invention, a docking apparatus removably receives portable data terminal means for purposes of data communication e.g. with a host computer and/or for the recharging of rechargeable batteries, and is so configured that the terminal means may have electrical contact pad means generally flush with the exterior of the terminal means. Preferably an abutting type engagement between the terminal contact pad means and cooperating electrical contact means of the docking apparatus is used for each electrical connection which is required at the docking apparatus, and the typical pin and socket type docking connections are entirely avoided.

In accordance with another aspect of the invention the same basic docking structure may be provided with greater or lesser numbers of contact positions. For example, one type of hand-held terminal intended for on-line RF communication with a host computer may have six contact pads for coupling with a local area network, and may have a nine position electrical connector for compatibility with an earlier type of interface system requiring interfitting of pin and socket connectors; another type of hand-held terminal designed for route accounting applications may have e.g. twelve external contact pads and be intended for interfacing only with systems having provision for open abutment type interconnection.

In an early embodiment as well as in a variety of later embodiments, the terminal receptacle means has been arranged so that with the terminal secured therein, the or each line of the terminal display remains visually observable in a convenient orientation relative to a driver of a vehicle for example. Also all of the key positions of the terminal keyboard are manually accessible, the legends on the keyboard having an orientation so as to be conveniently readable, e.g. by the driver of the vehicle. In particular the axis of each line of the display and of each row of key positions should be generally horizontal (rather than vertical) and the alphanumeric characters of the terminal display and keyboard legends should be upright (rather than inverted) as viewed by the operator.

Also in the early embodiment the terminal could be inserted into the receptacle with one hand against the action of a resilient bias stronger than the bias on the receptacle mating contacts. The same resilient bias allowing one handed loading, then served to firmly position the terminal for steady reliable electrical contact at each abutting type contact position in spite of vehicle jarring and vibration or the like.

The receptacle in the early embodiment was provided with a pair of standard nine pin D-sub connectors with threaded fastening of mating pin connectors, and with a power connector, so that a terminal while inserted into the receptacle could receive data from vehicle sensors via one nine pin connector, transmit commands via the other nine pin connector, and receive operating and/or charging power from the vehicle electric power system via the power connector.

The early embodiment and also the presently preferred embodiment of the invention are provided with integrated electrostatic discharge protection associated with the incoming signal paths of the device. Because of this novel advance, the housing of the data entry terminal may be constructed of lighter materials and molded from polymeric materials into an aesthetically pleasing and comfortably held form. The expensive application of metallic sheathing is avoided while isolation of sensitive circuit components from electrostatic discharge transients is achieved.

Other objects, features and advantages will be apparent from the following detailed description, taken in connection with the accompanying drawings, and from the individual features and relationships of the respective appended claims.

BRIEF DESCRIPTION OF THE DRAWING FIGURES

Figure 1:
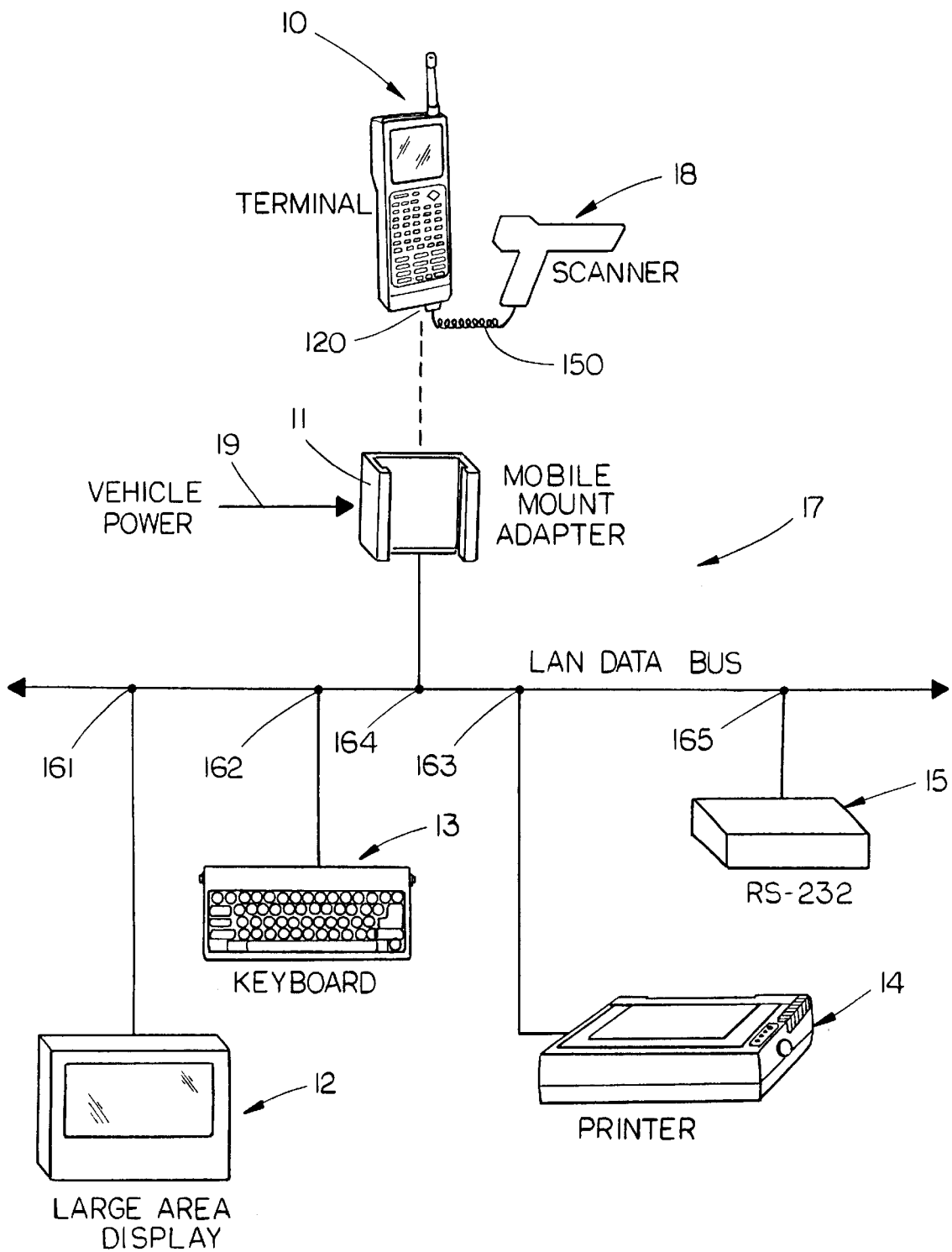
FIG. 1 is a diagrammatic illustration of a vehicle data system showing a docking system in accordance with the present invention, and which may represent a data system associated with a gasoline-powered or battery-powered material handling vehicle such a forklift truck.
Figure 3:
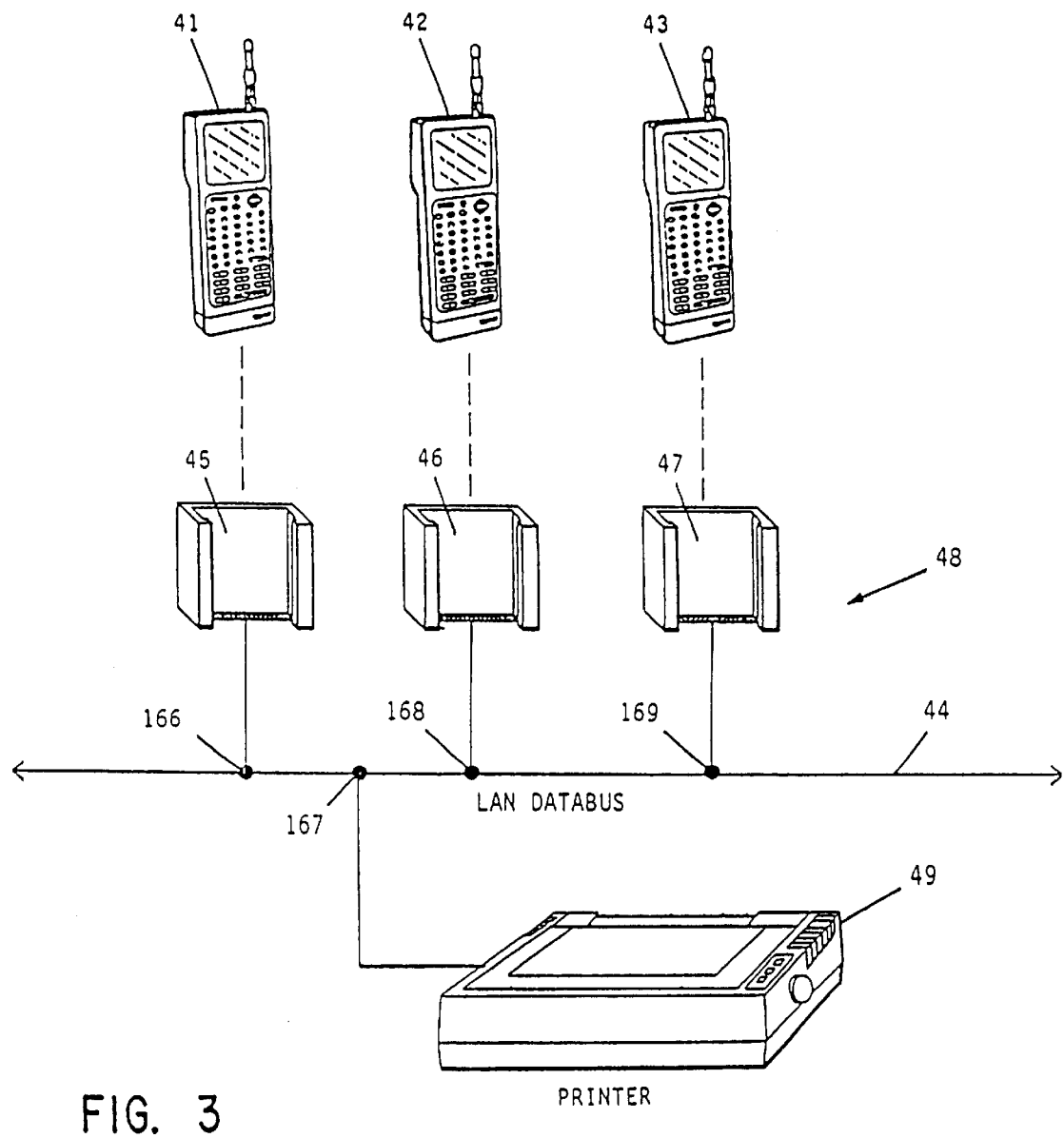

FIG. 3 hows a vehicle data system which may include the docking system of FIG. 1, and which further provides for plural terminals sharing a common peripheral device means such as a printer.

Figure 2:
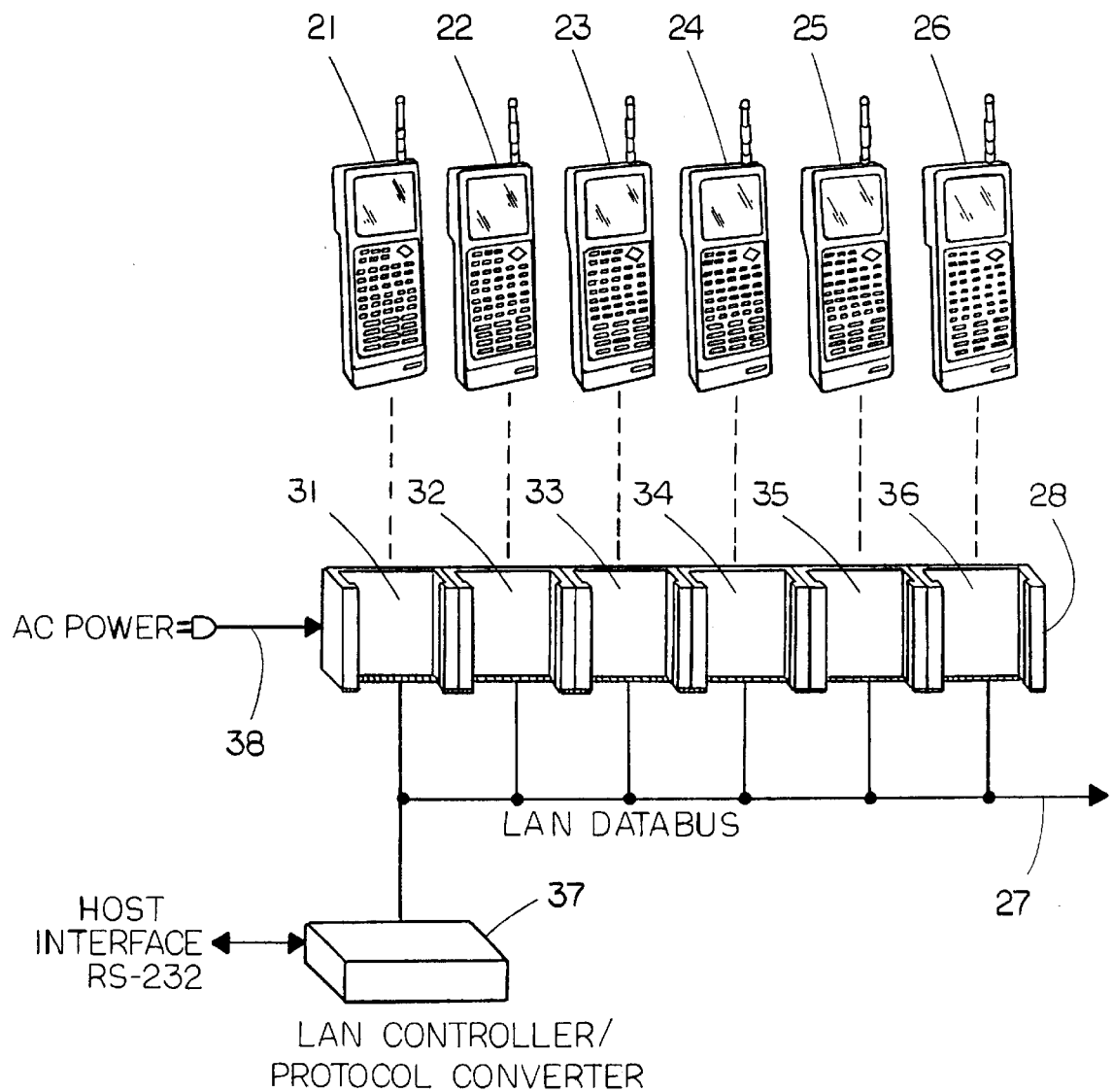
FIG. 2 shows by a similar diagrammatic illustration a fixed docking system which may utilize a local area network corresponding to that of FIG. 1, and may receive terminals from vehicles such as that of FIG. 1, for purposes of interchange of data with a host computer, and for recharging of the terminal batteries.
Figure 4:
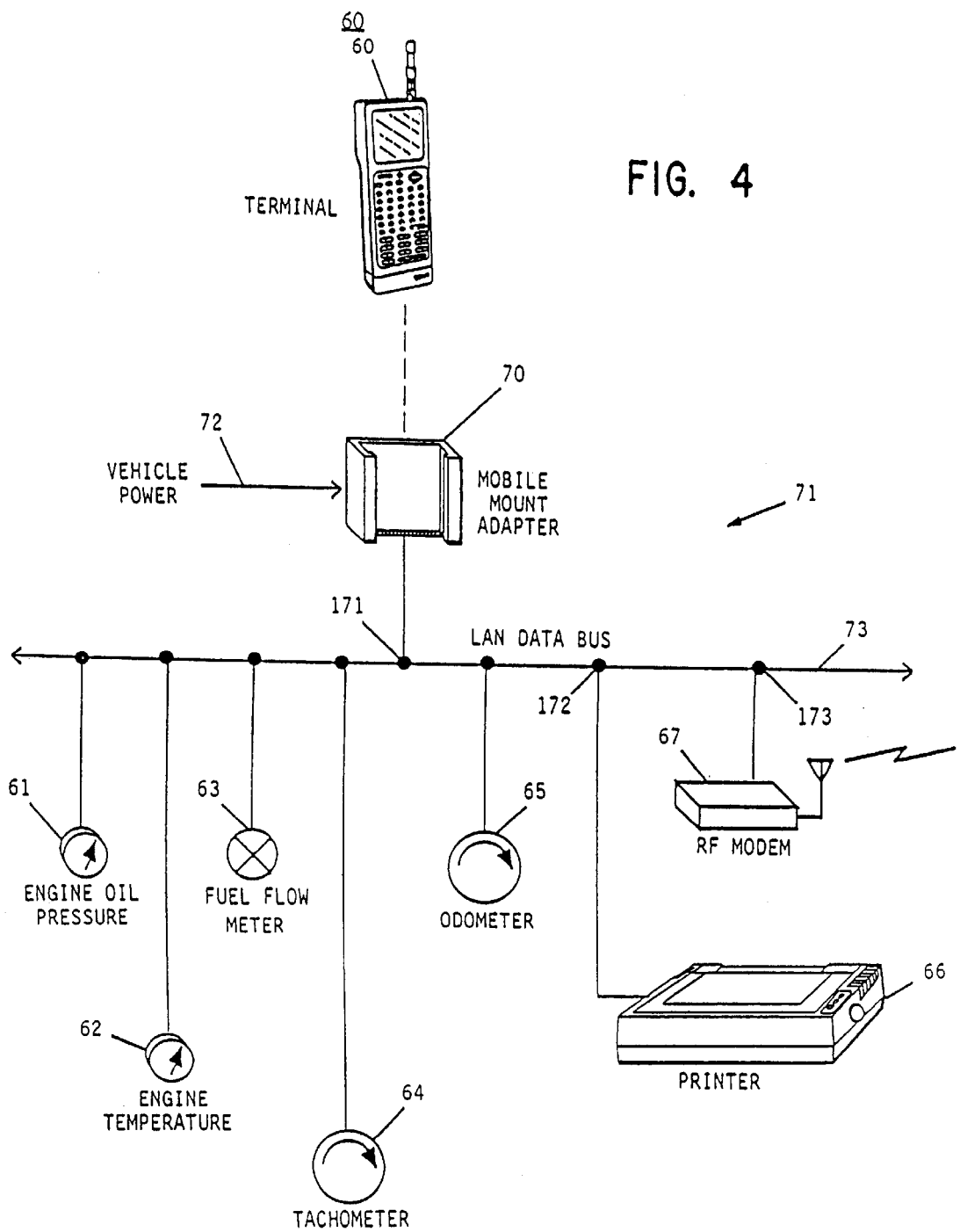

FIG. 4 shows a further vehicle data system including docking apparatus in accordance with the present invention, which is particularly appropriate for product distribution applications and the like, features of FIG. 3 also being applicable to FIG. 4, and the RF link for example of FIG. 4 also being applicable to FIGS. 1–3.

Figure 5:
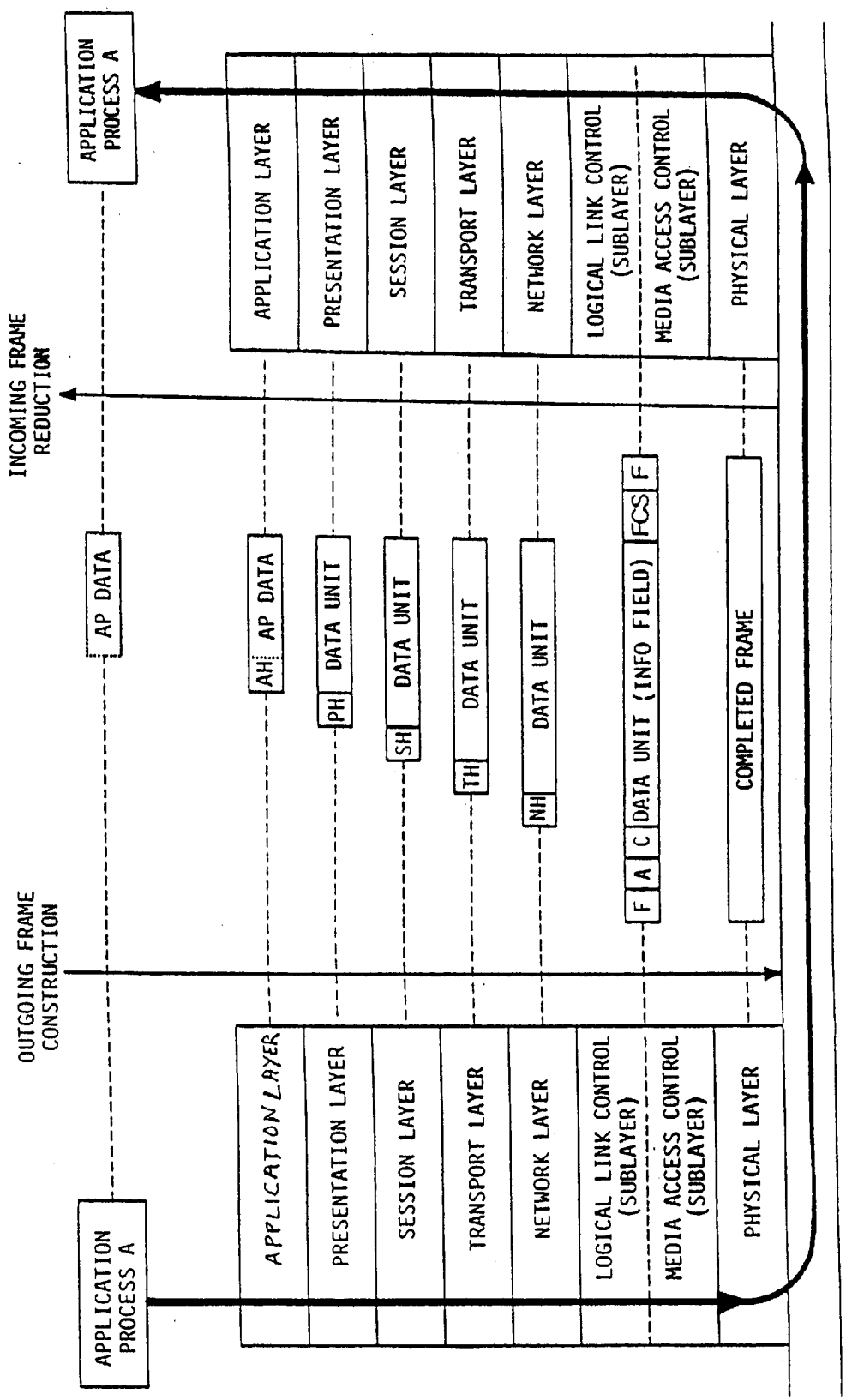

FIG. 5 is diagram illustrating the various data processing layers of a preferred implementation of local area network and representing message frame construction for an outgoing transmission at the left and the inverse incoming frame reduction at the right, exemplary frame formats for the respective layers being represented centrally of the diagram, and an exemplary physical transmission link being indicated as a horizontal path at the bottom of the diagram (and corresponding to the LAN data bus transmission paths of FIGS. 1–4).

Figure 6:
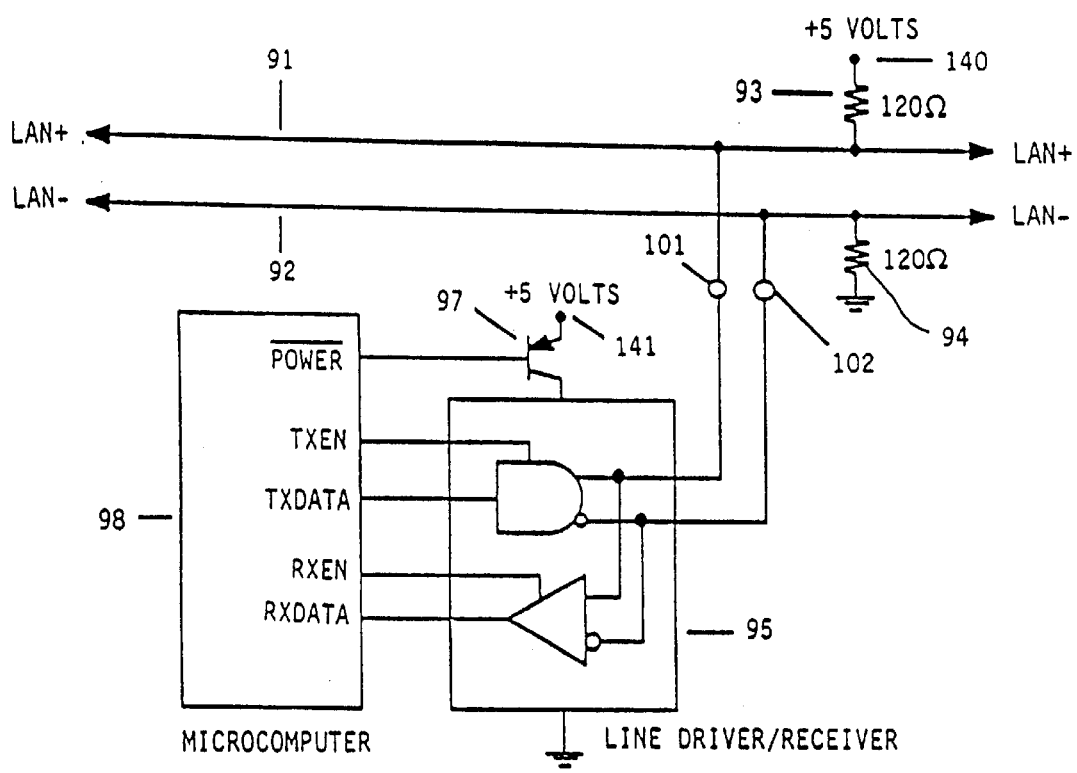

FIG. 6 shows a preferred electrical interface arrangement for coupling each of the terminals and peripheral devices associated with the docking apparatus of FIGS. 1–4 and the LAN transmission link of these Figures. The illustrated electrical interface of FIG. 6 is an example of a "Physical layer" as diagrammed in FIG. 5.

Figure 7:
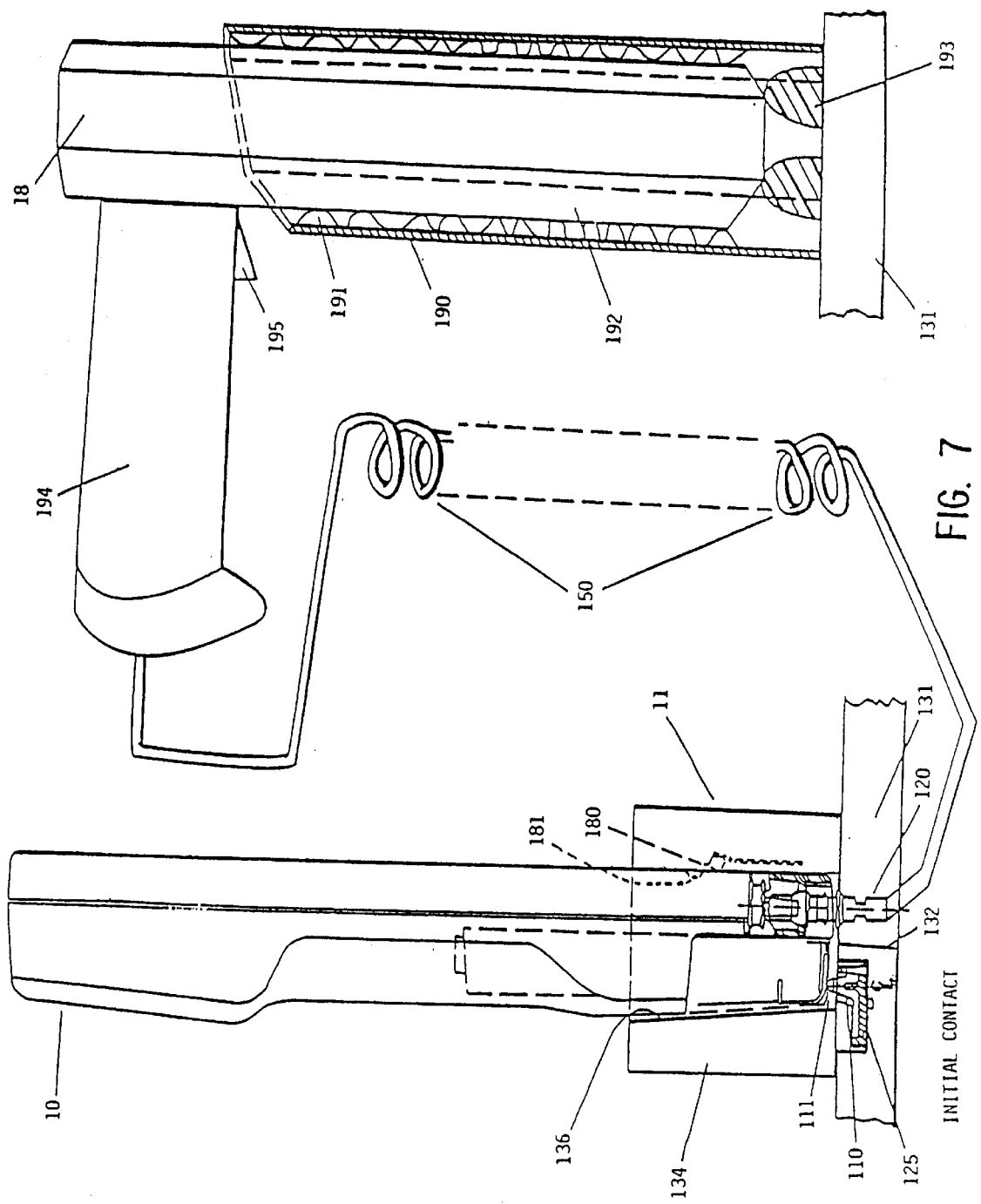

FIG. 7 is a somewhat diagrammatic partial vertical sectional view illustrating constructional details of a docking apparatus for the systems of FIGS. 1–4, a portable battery powered terminal corresponding to that of FIG. 1 being shown as being inserted part way into the docking channel, to the point of initial electrical contact; and also indicating in diagrammatic fashion a laser bar code scanner device in a separate vehicle mounting or holster means and coupled with the terminal via an extendable coiled cable.

Figure 8:
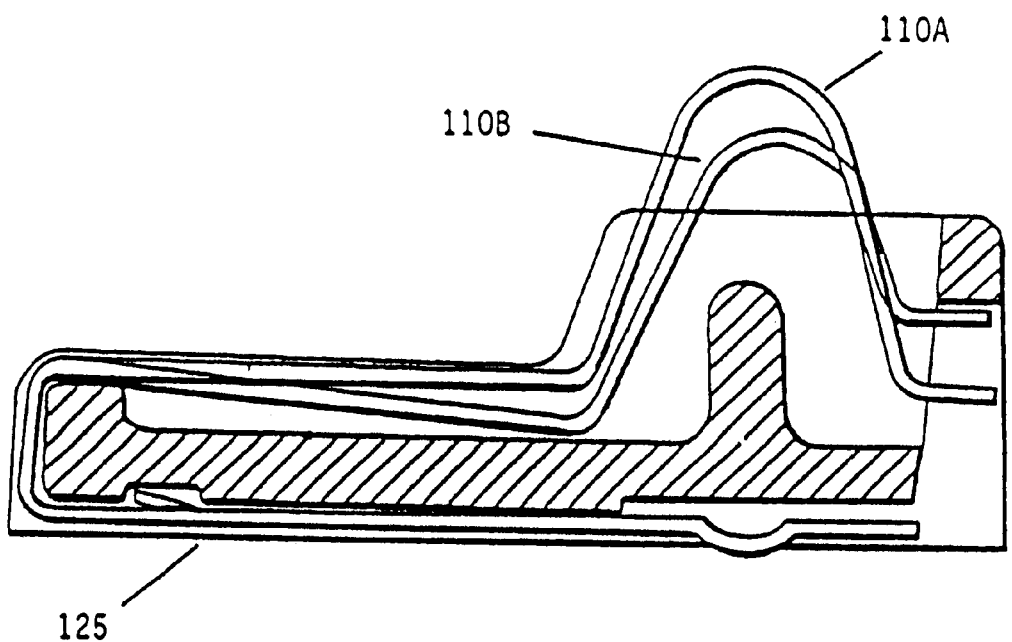

FIG. 8 is a somewhat diagrammatic longitudinal sectional view showing the contact assembly of the docking apparatus of FIG. 7 on a greatly enlarged scale.

Figure 9:
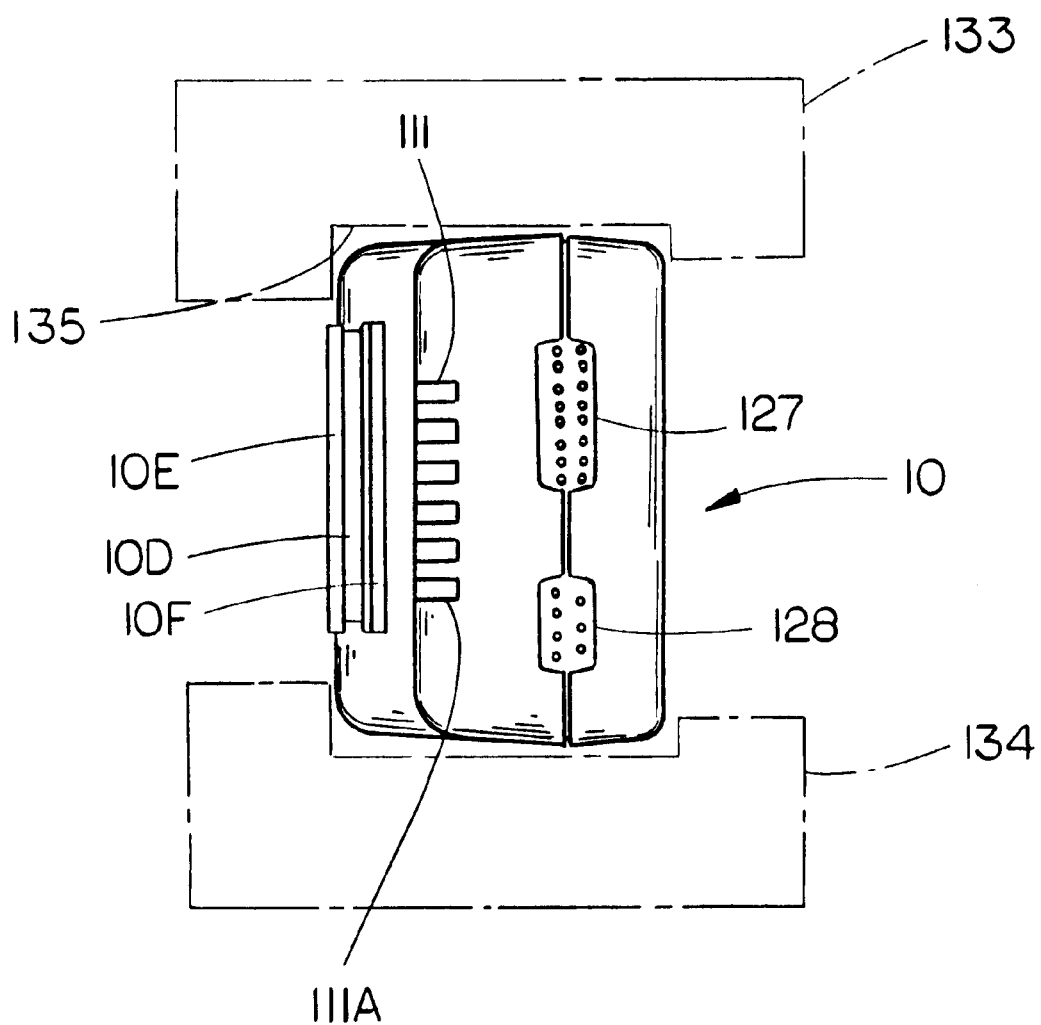

FIG. 9 is a diagrammatic bottom plan view of the terminal of FIGS. 1 and 7, illustrating the external contact pads of the terminal and also the connector fittings for coupling the terminal with a scanner such as the hand-held laser bar code scanner which is diagrammatically indicated in FIGS. 1 and 7.

Figure 10:
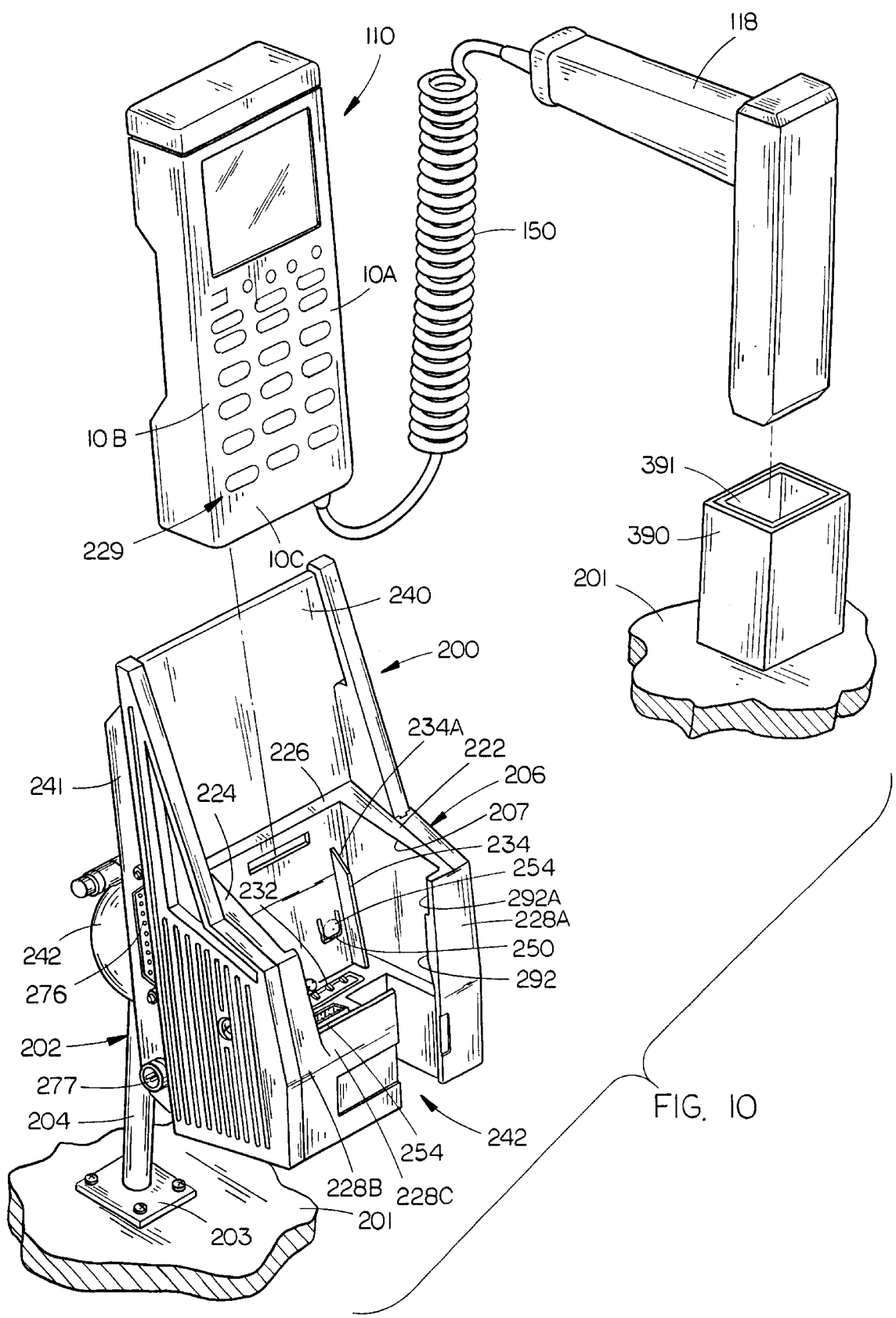

FIG. 10 is a somewhat diagrammatic perspective view similar to FIG. 7 and showing portions of a vehicle frame mounting a vehicle docking unit for receiving a hand-hand data terminal, and mounting a reader head holster for receiving a bar code or RF tag reader or the like and shown coupled with the data terminal by means of an extensible cable.

Figure 11:
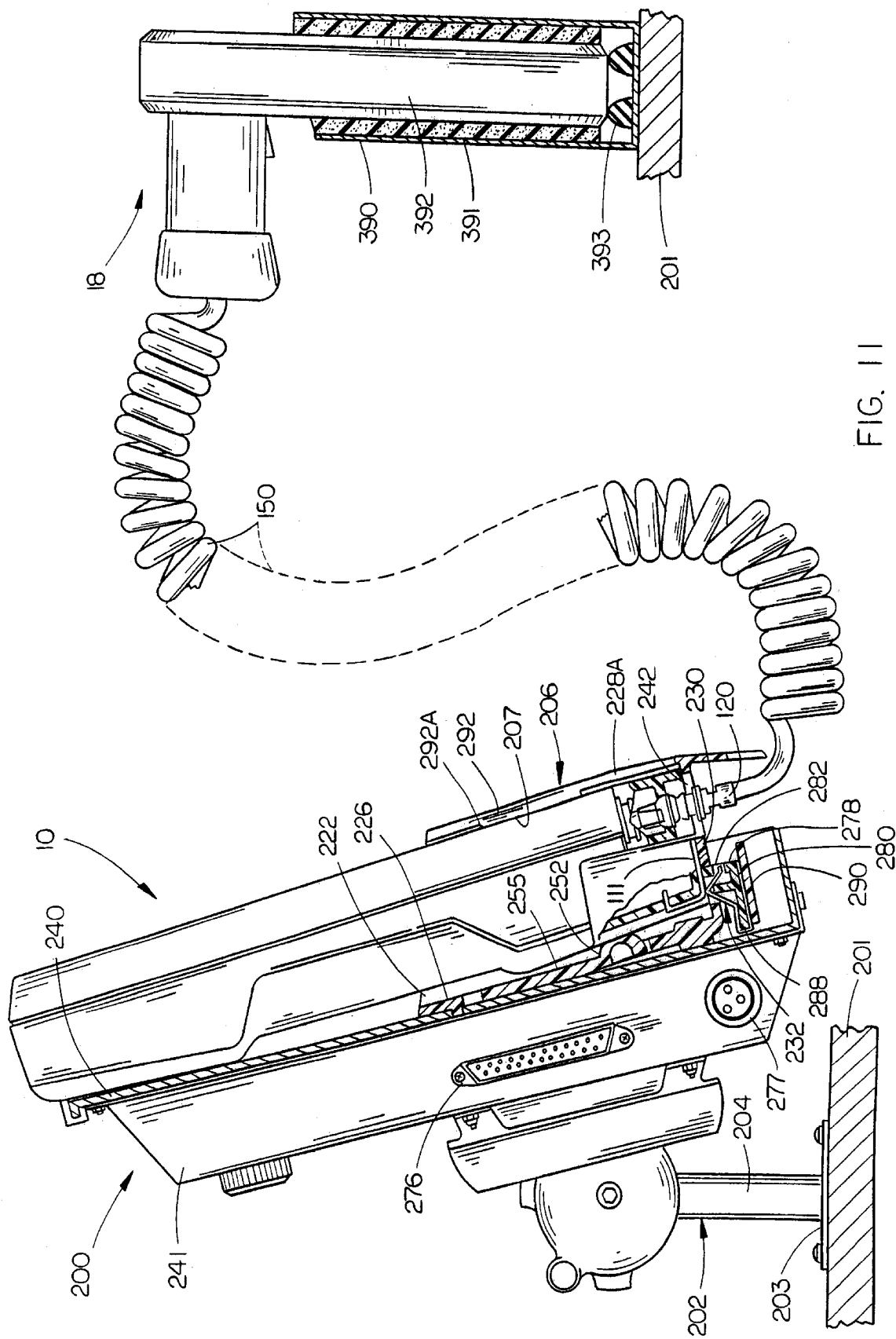

FIG. 11 is a somewhat diagrammatic elevational view of the mounting arrangement of FIG. 10, with portions of the terminal receptacle means and received data terminal broken away and in section to reveal preferred details of construction, and with the reader holster shown in vertical section and having the reader head inserted therein.

Figure 12:
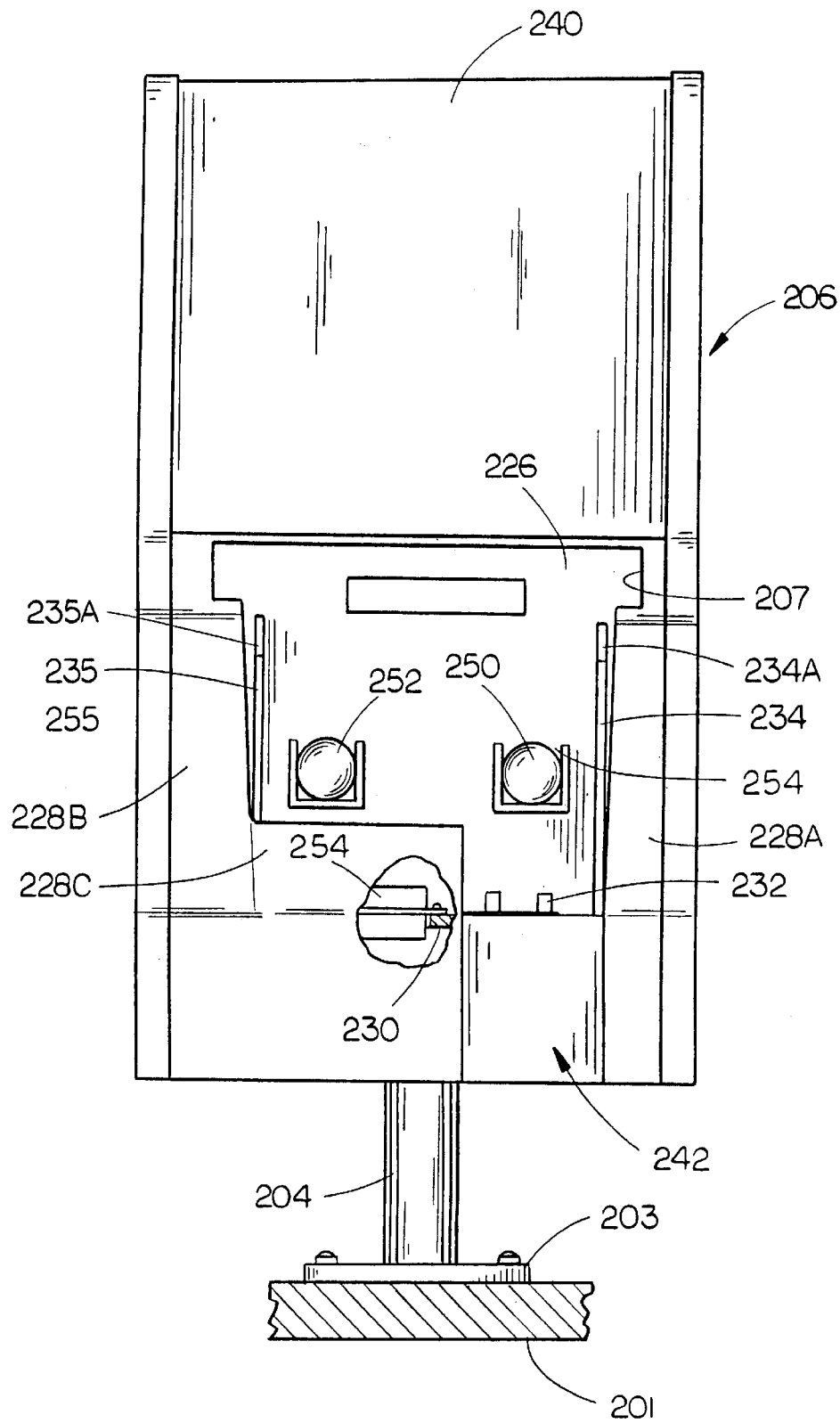

FIG. 12 is a somewhat diagrammatic frontal elevational view of the terminal docking unit, with a portion thereof broken away to show internal parts.

Figure 13:
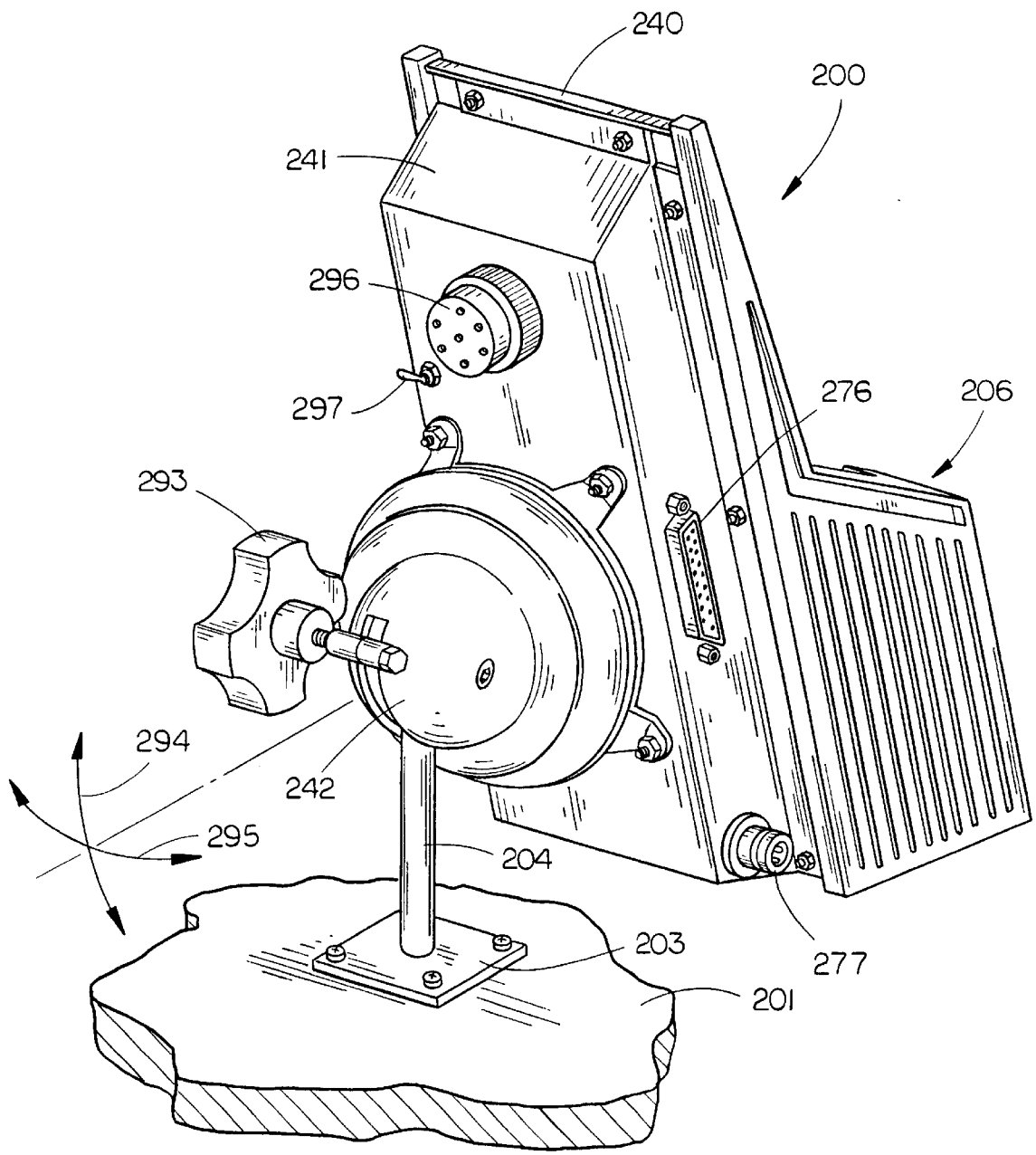

FIG. 13 is a somewhat diagrammatic rear perspective view of the docking unit of FIGS. 10, 11 and 12, showing an exemplary adjustable mount for adjustably positioning the terminal receptacle means at any desired angular orientation, e.g. so as to facilitate operation of the terminal keyboard and observation of the terminal display while the terminal is inserted into the docking unit.

FIG. 14 is an exploded somewhat diagrammatic perspective view showing major parts of an early hand-held data terminal having external generally flush contact pads as the sole means of conductive electrical interchange with external devices, and representing an early embodiment of teachings and concepts of the present invention.

FIG. 15 is an end elevational view of the assembled terminal whose components are shown in FIG. 14, and illustrates one of the linear series of ten external contact pads, a portion of the upper housing part being broken away to show exemplary keyboard detail.

FIG. 16 shows the assembled hand-held data terminal according to FIG. 15 inserted into a terminal receptacle means of a vehicle mounted type of docking unit for data interchange with external devices, and for charging of batteries of the terminal from vehicle power means.

Figure 17:
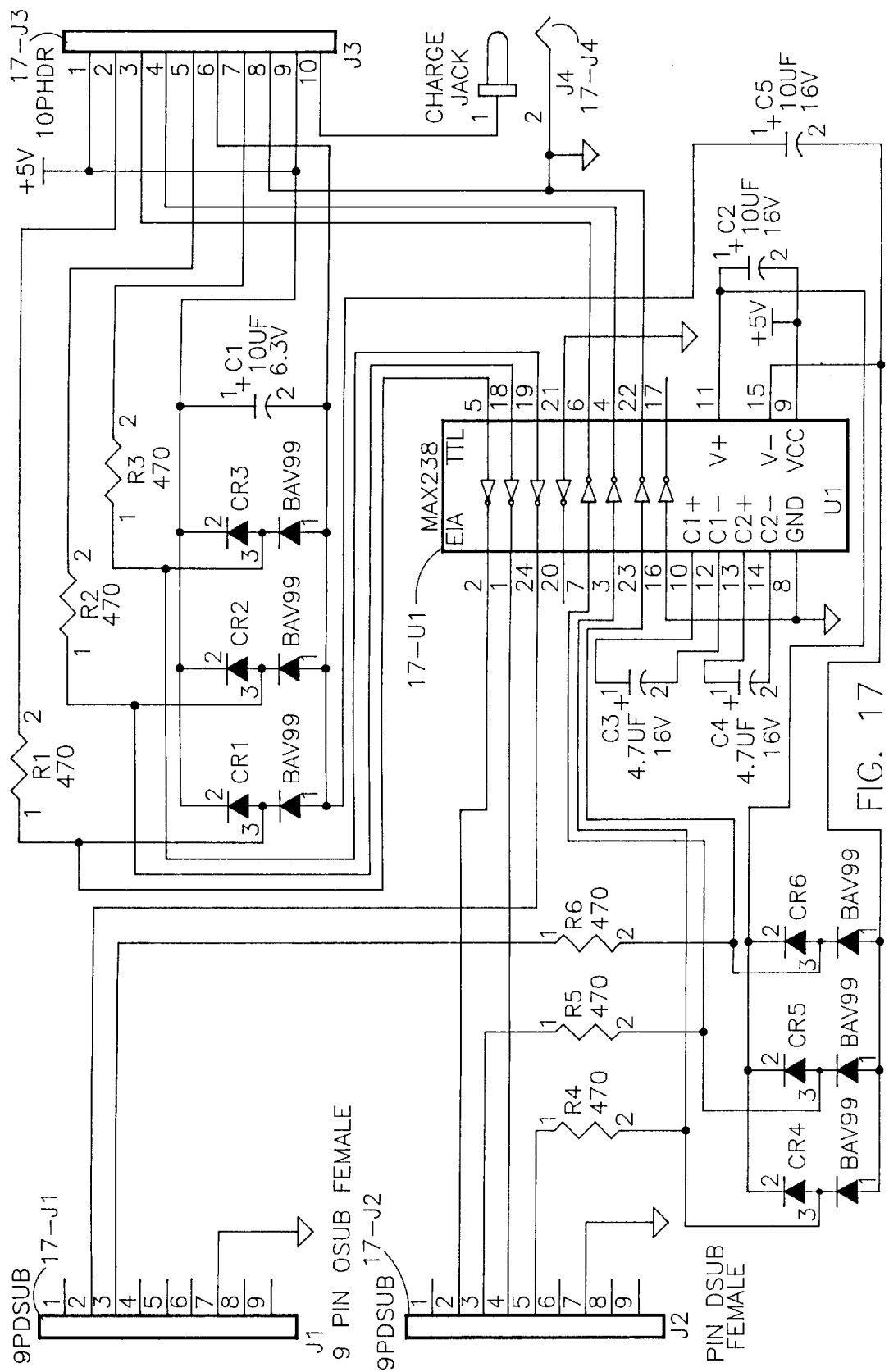

FIG. 17 is a schematic diagram showing exemplary interface circuitry for the terminal receptacle of FIG. 16.

Figure 18A:
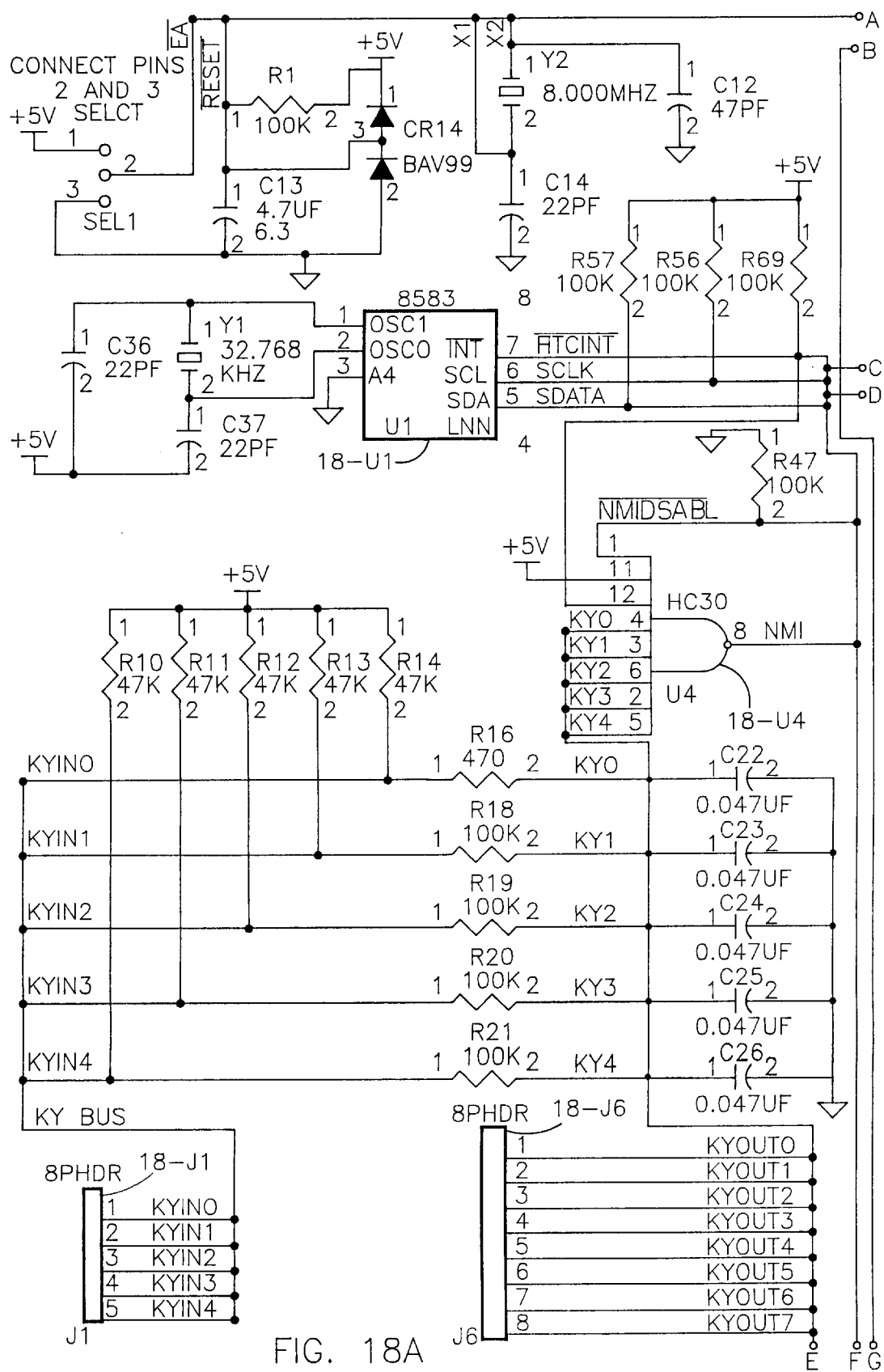
Figures 1, 18B:
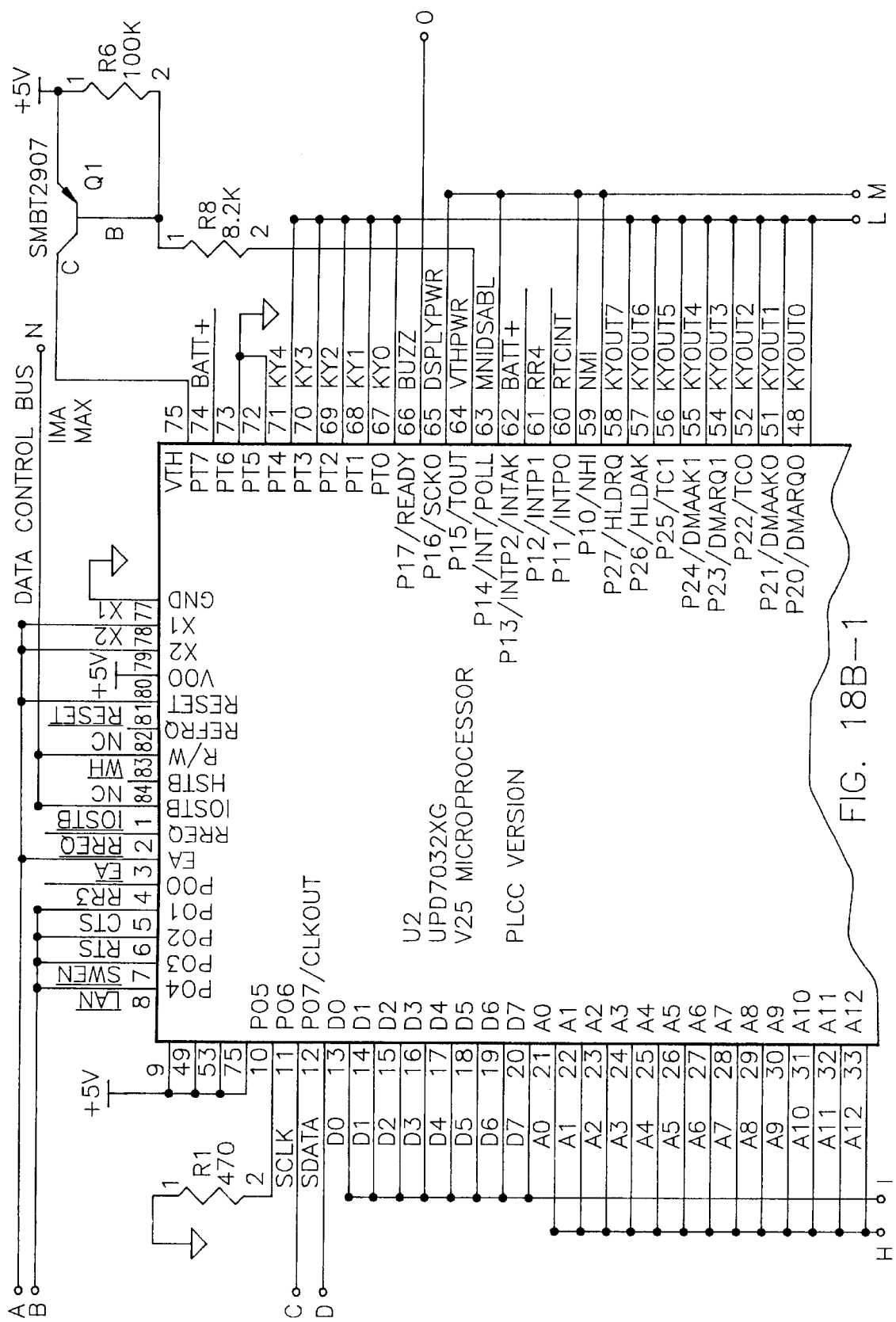
Figures 2, 18B:
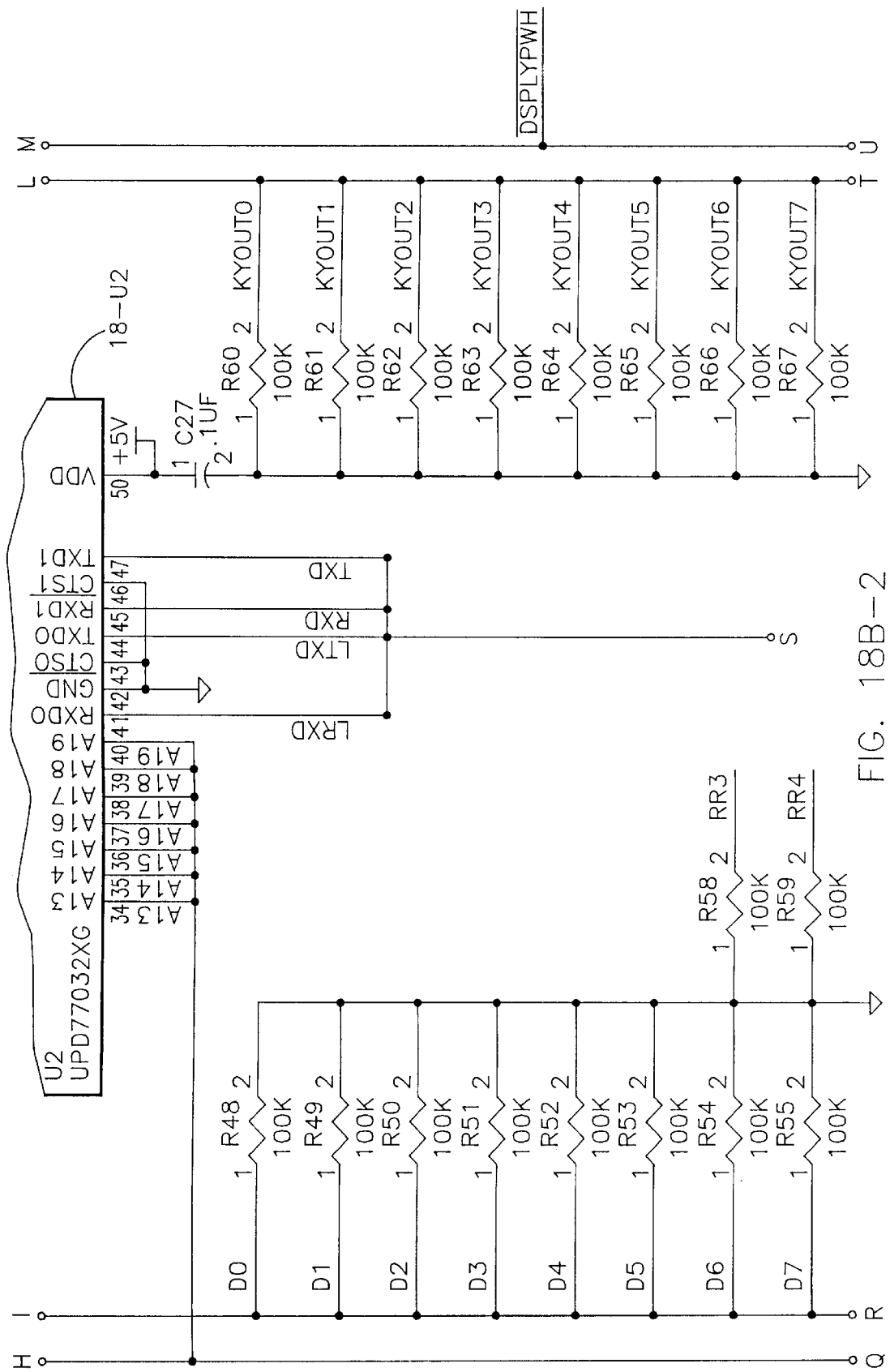
Figure 18C:
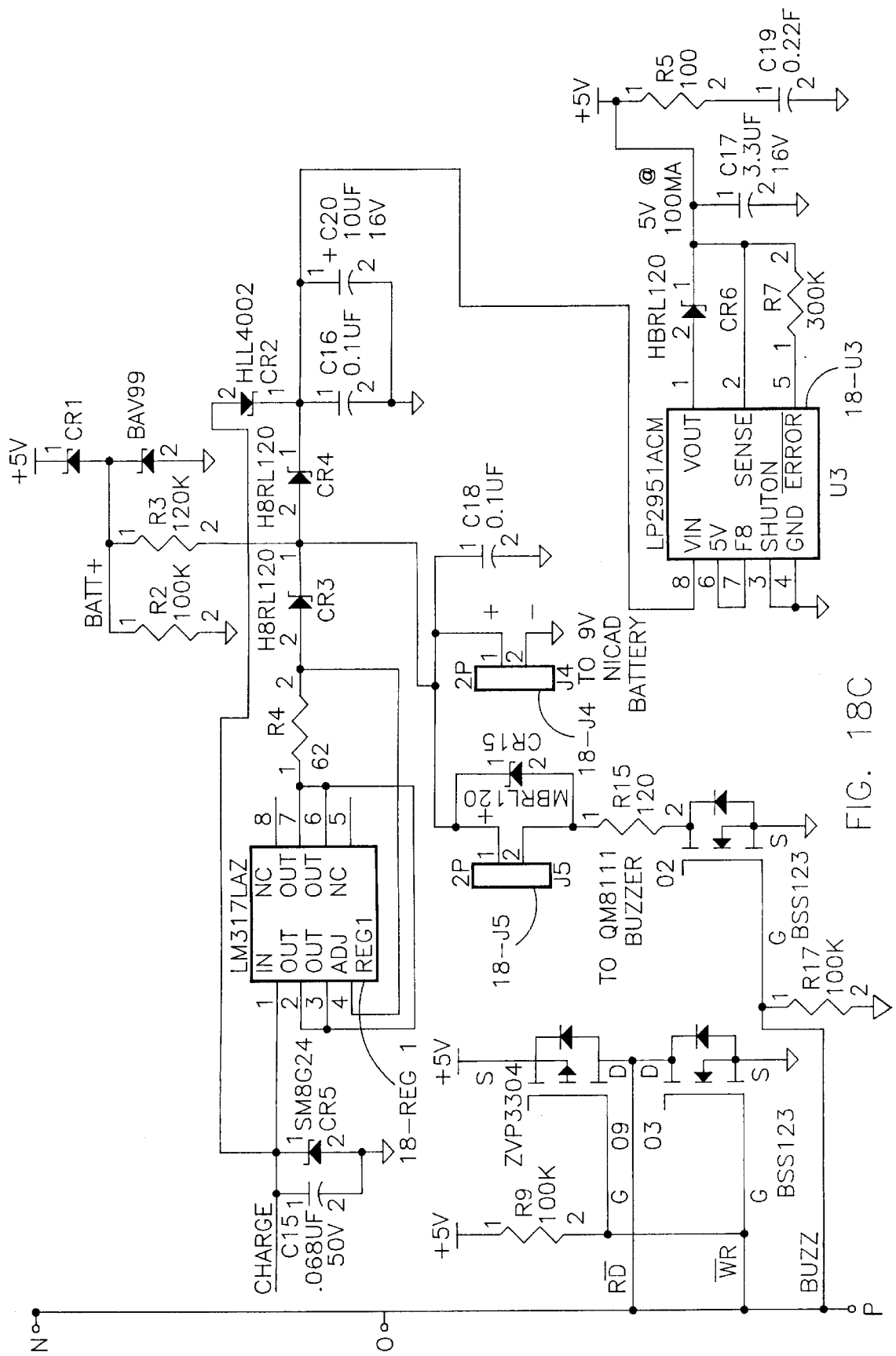
Figure 18D:
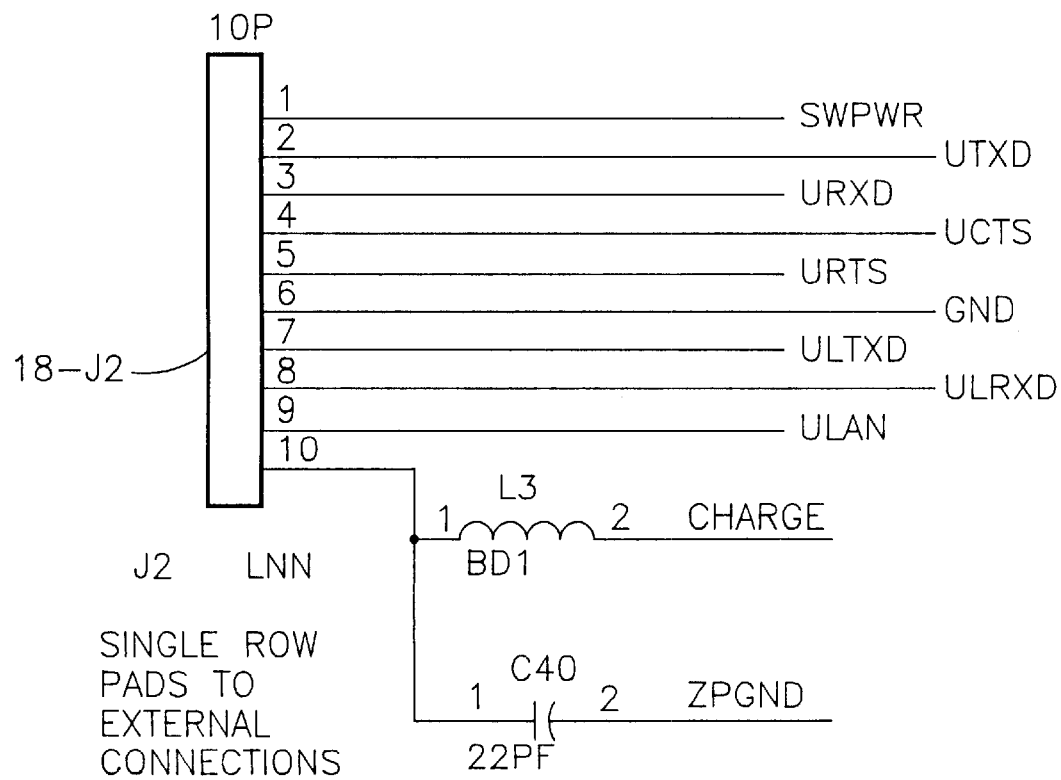
Figures 1, 18E:
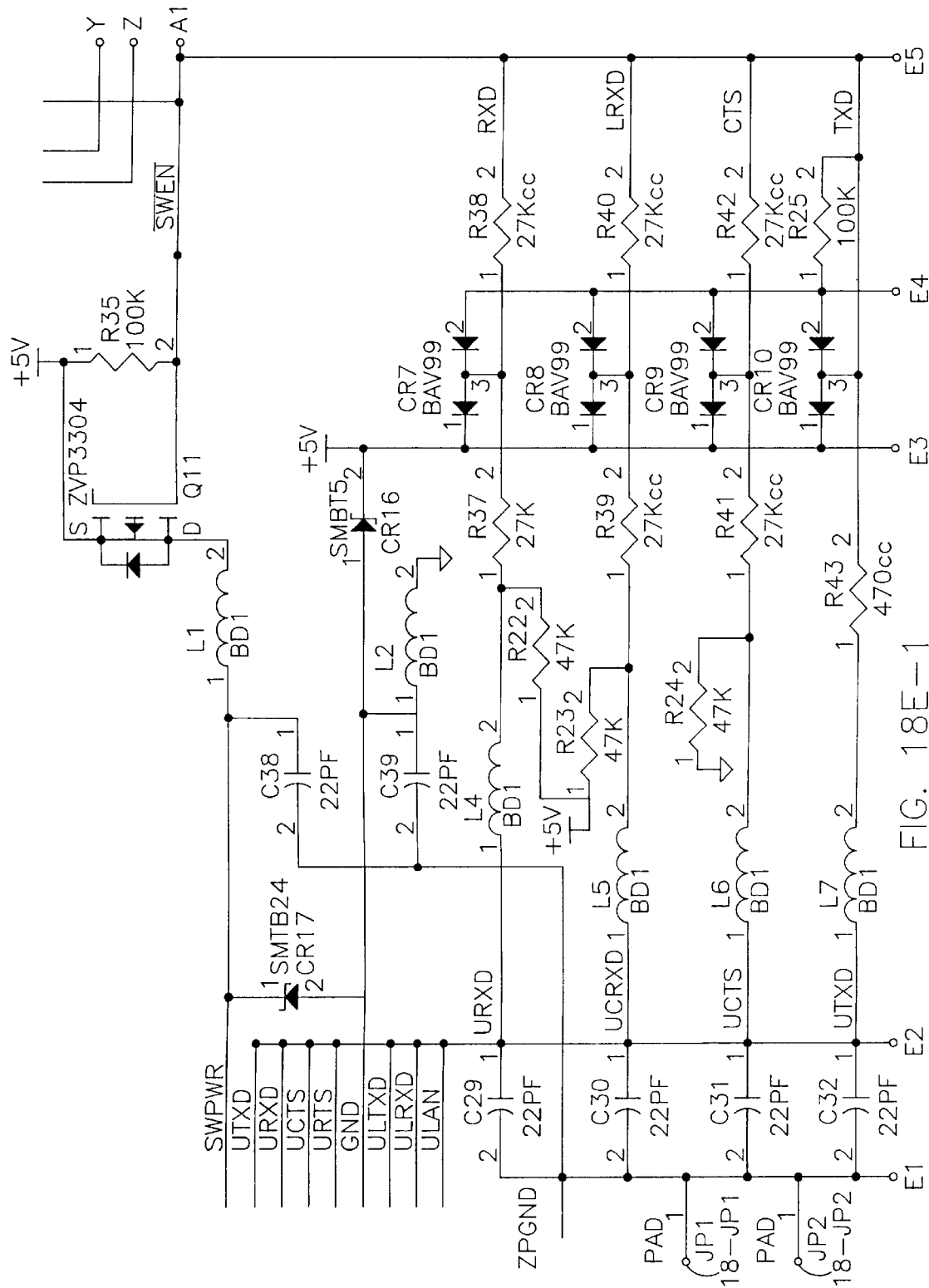
Figures 2, 18E:
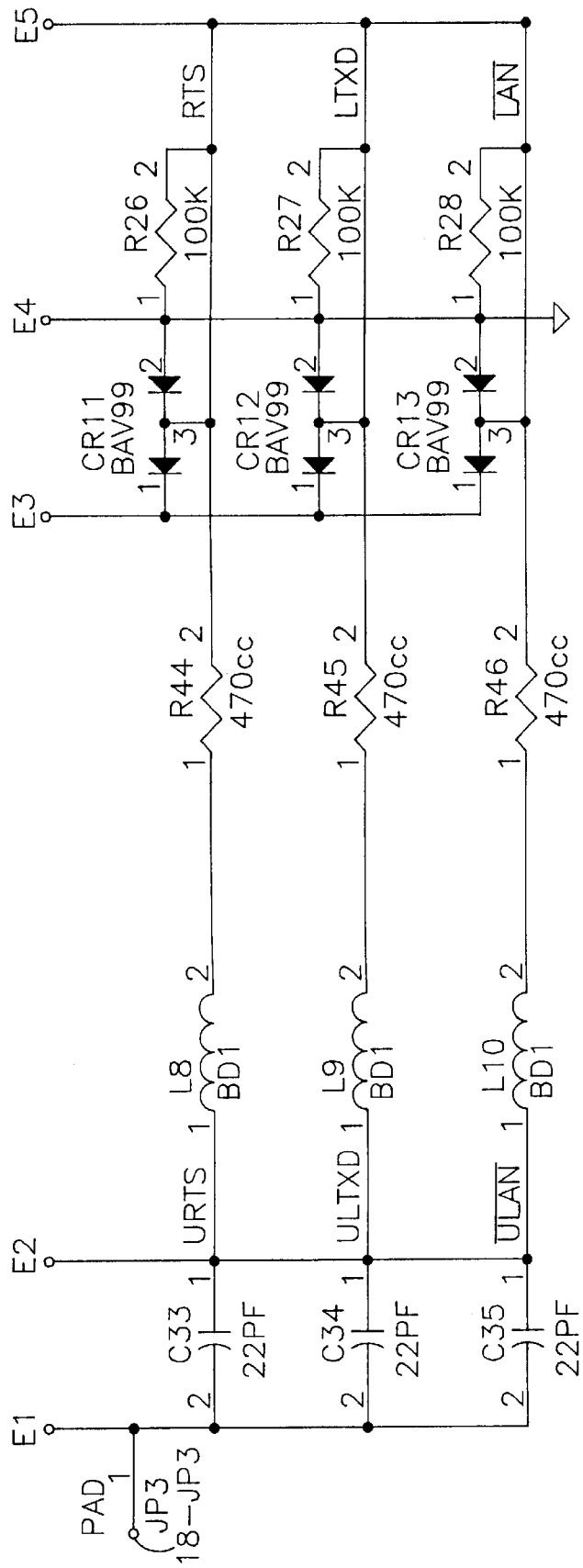
Figure 18F:
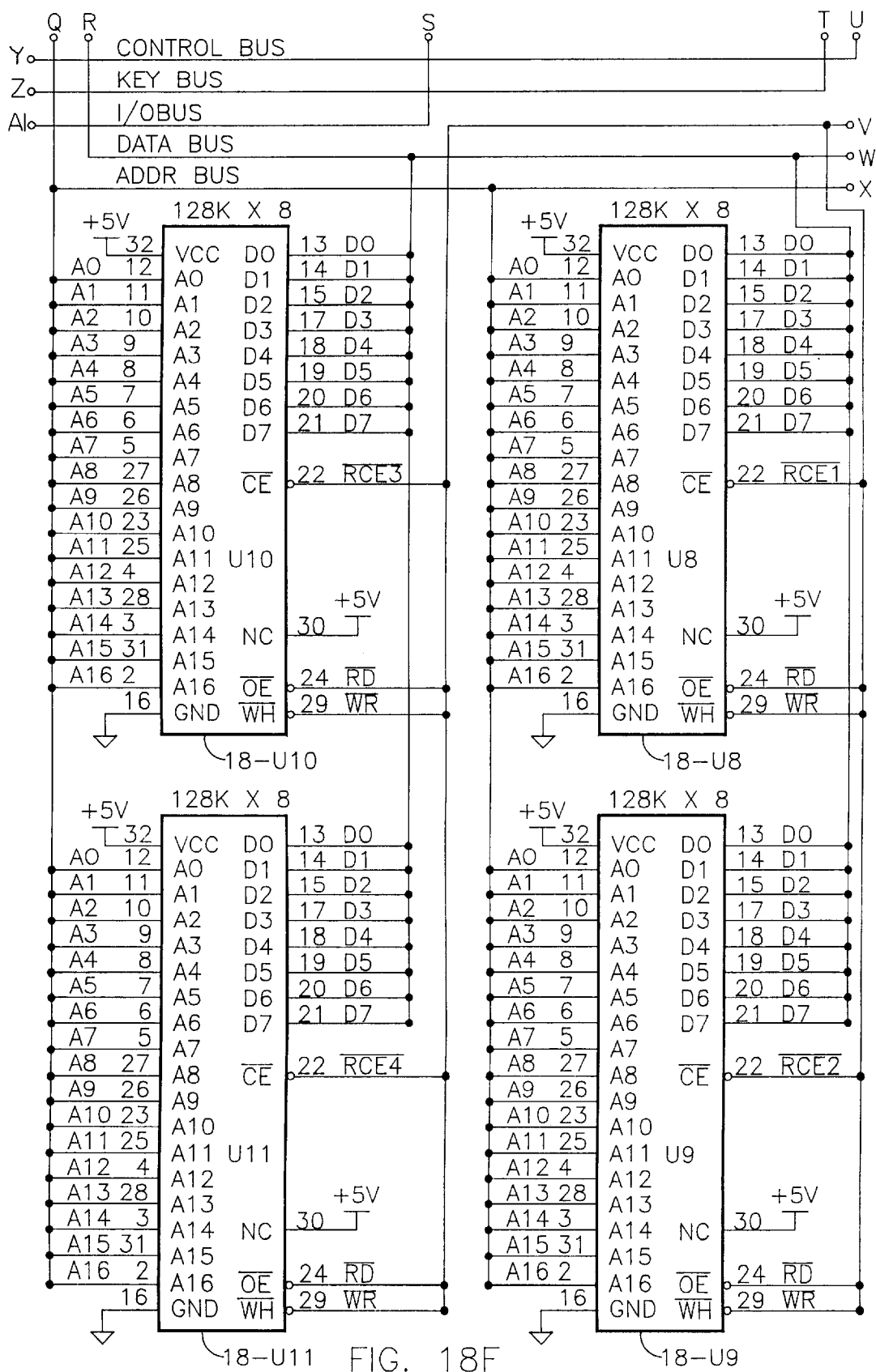
Figure 18G:
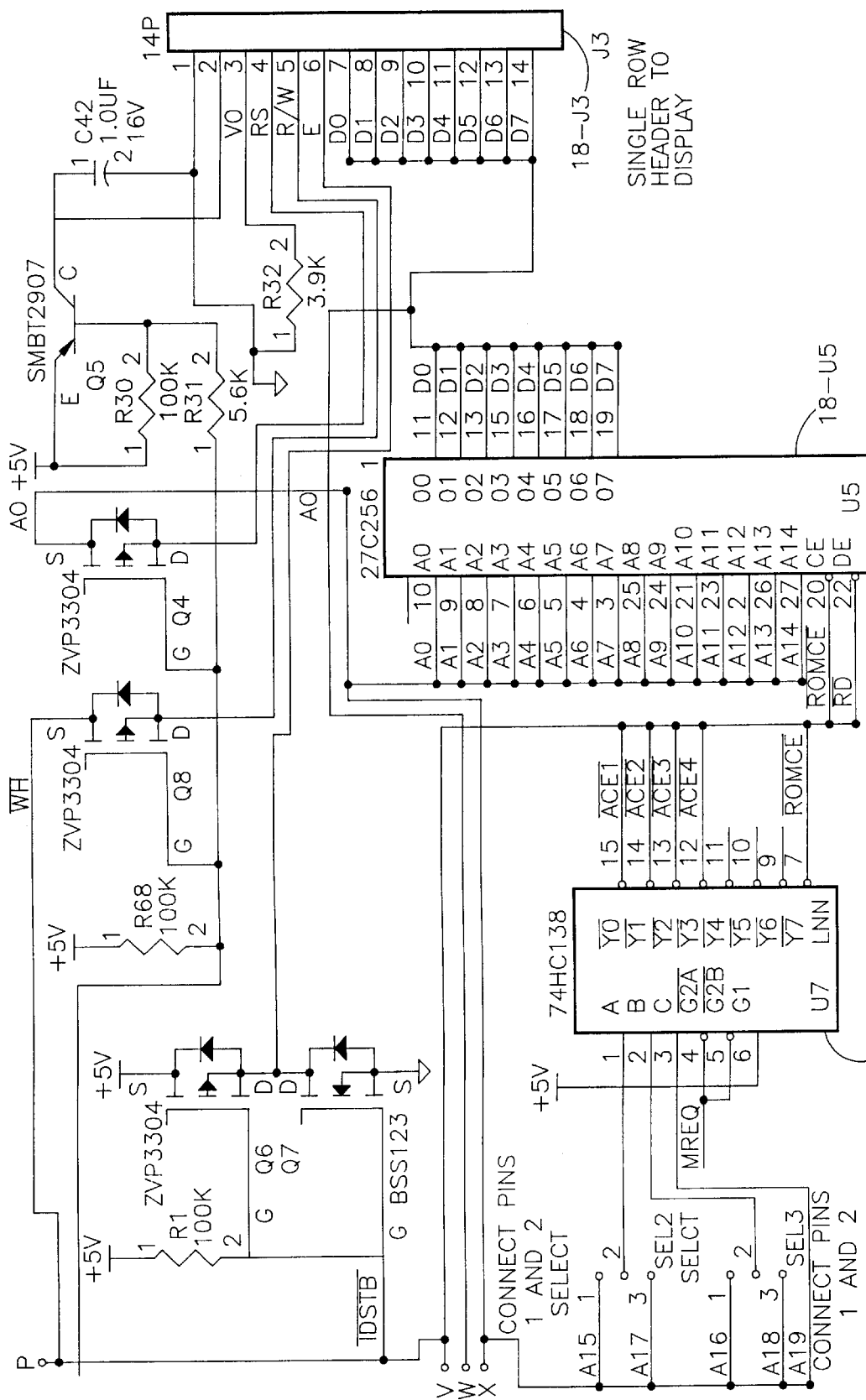

FIGS. 18A to 18G show a schematic diagram of exemplary electronic circuitry for the terminal of FIGS. 14, 15 and 16, FIG. 18B being a continuation of FIG. 18A to the right; FIG. 18C being a continuation of FIG. 18B to the right; FIG. 18D showing the contact pads and an exemplary charge input circuit for the terminal; FIG. 18E being a continuation of FIG. 18A in the downward direction and a continuation of FIG. 18D to the right; FIG. 18F being a continuation of FIG. 18B in a downward direction and a continuation of FIG. 18E to the right; and FIG. 18G being a continuation of FIG. 18C in the downward direction and a continuation of FIGS. 18B and 18F to the right.

Figure 19:
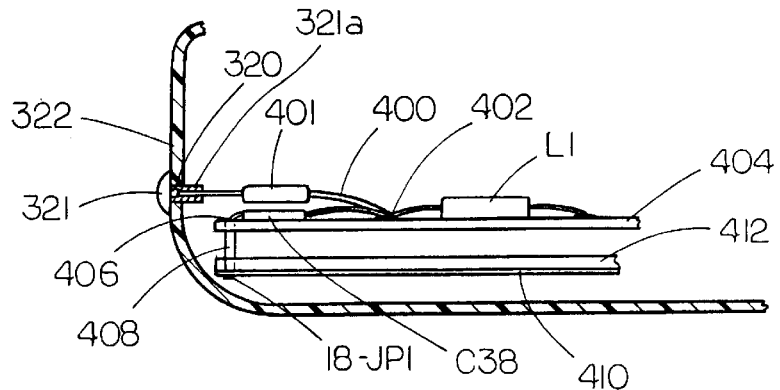

FIG. 19 is a diagrammatic partial longitudinal sectional view of the data terminal of FIGS. 14, 15 and 16, showing the general physical arrangement of the circuit elements shown in FIG. 18E, and also indicating the presence of a ferrite bead which may be provided between each cylindrical rivet of FIG. 15, and the respective corresponding pad of the row of pads represented in FIG. 18D.

Figure 20:
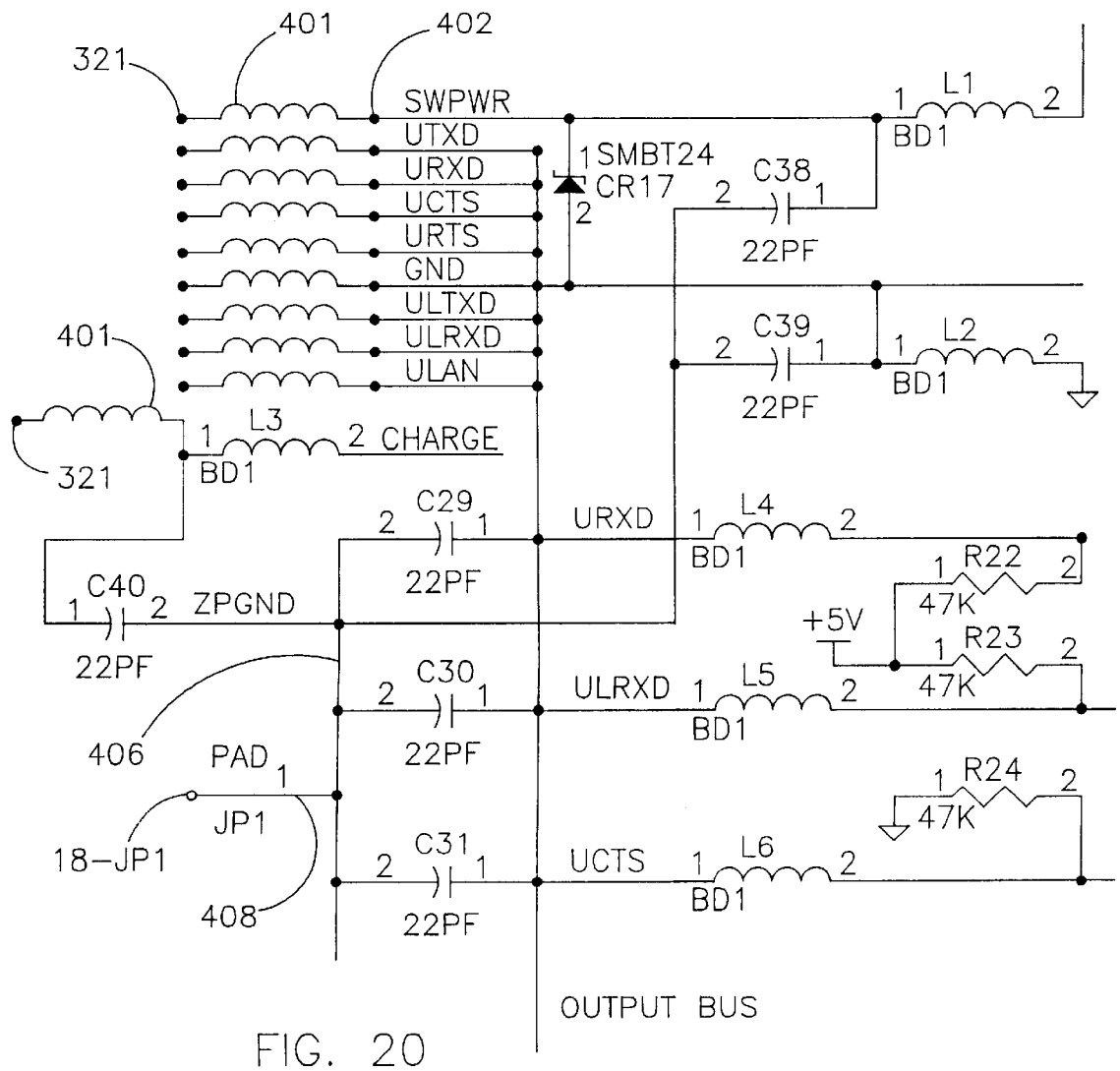

FIG. 20 is a circuit diagram showing the circuit arrangement of FIG. 18E and the inductances provided by the respective ferrite beads such as that physically indicated in FIG. 19.

Figure 21:
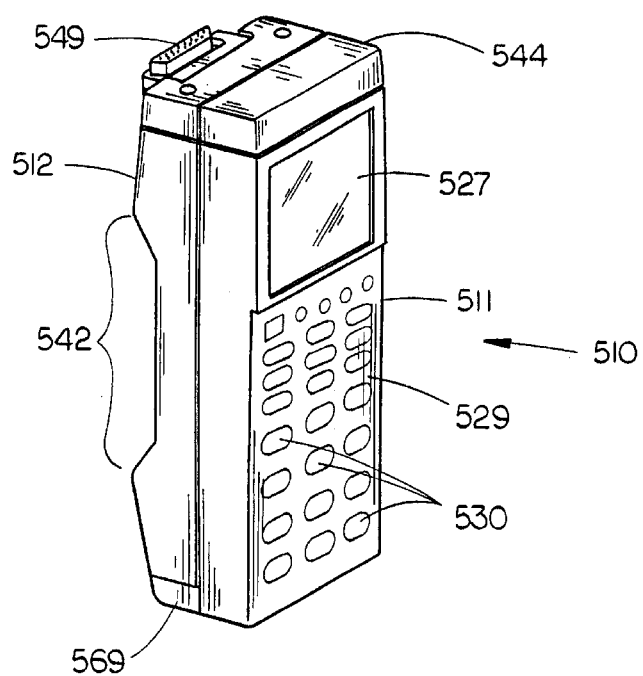

FIG. 21 is a somewhat diagrammatic frontal perspective view showing a hand-held data capture terminal embodying the technologies and teachings of the present invention.

FIG. 22 is a somewhat diagrammatic exploded view of the hand-held terminal illustrated in FIG. 21.

Figure 23:
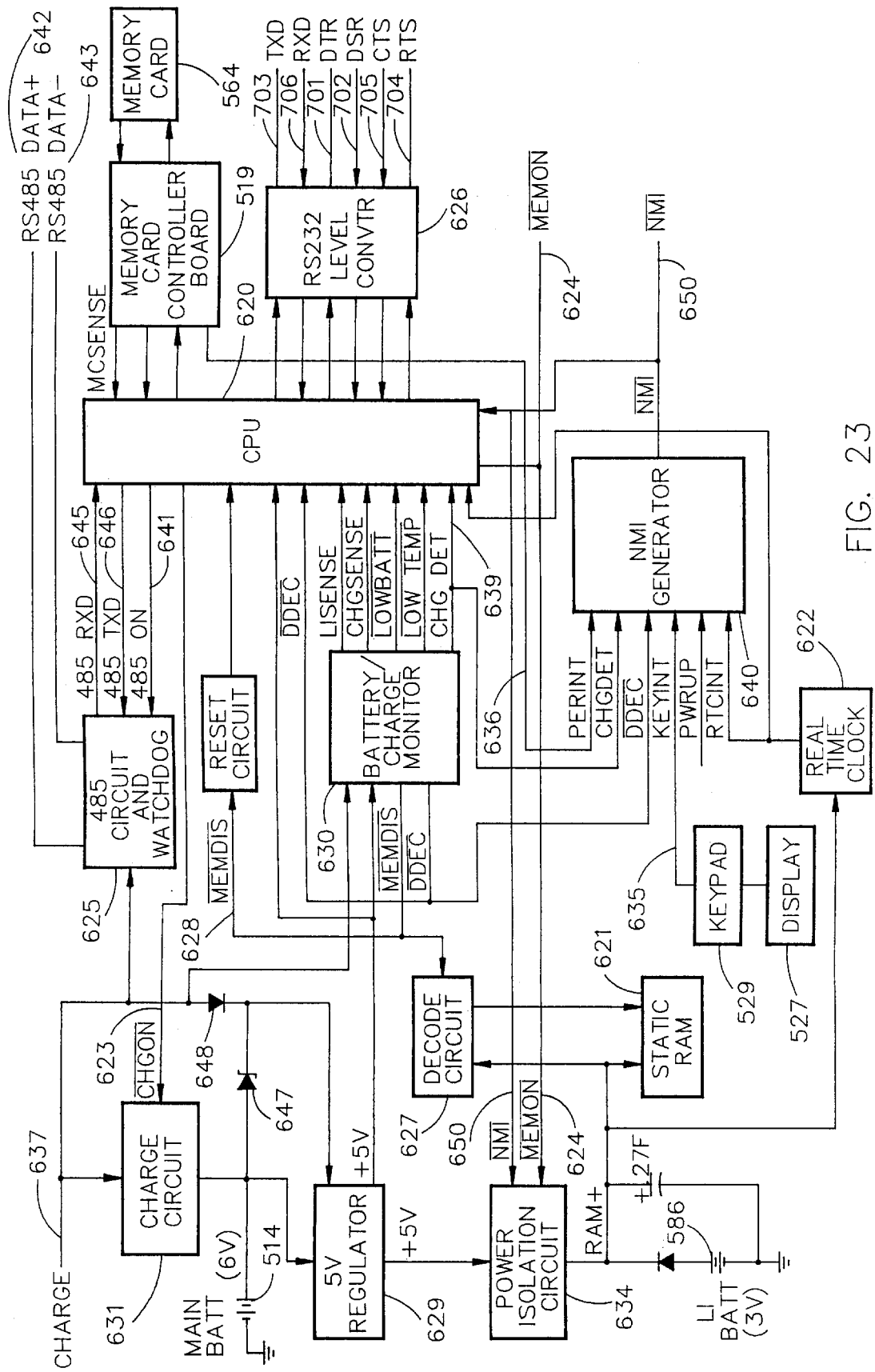

FIG. 23 is a schematic diagram showing the major electronic circuits and components contained within the terminal of FIGS. 21 and 22 and the interconnections between them.

Figure 24:
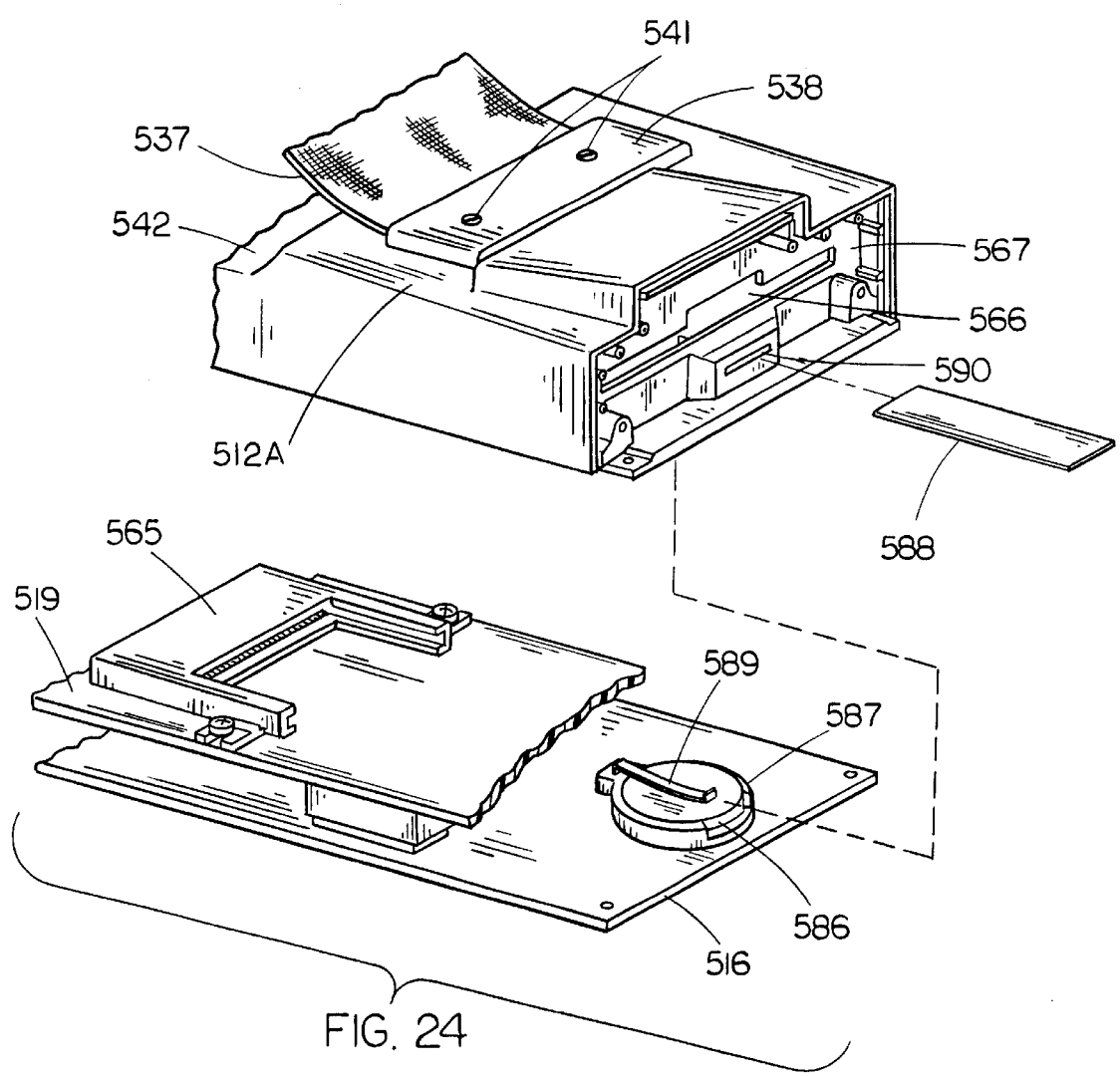

FIG. 24 is a somewhat diagrammatic exploded view of the top end of the terminal showing a peripheral memory card mounting/terminal block and a back-up lithium battery with an associated mylar insulating strip.

Figure 25:
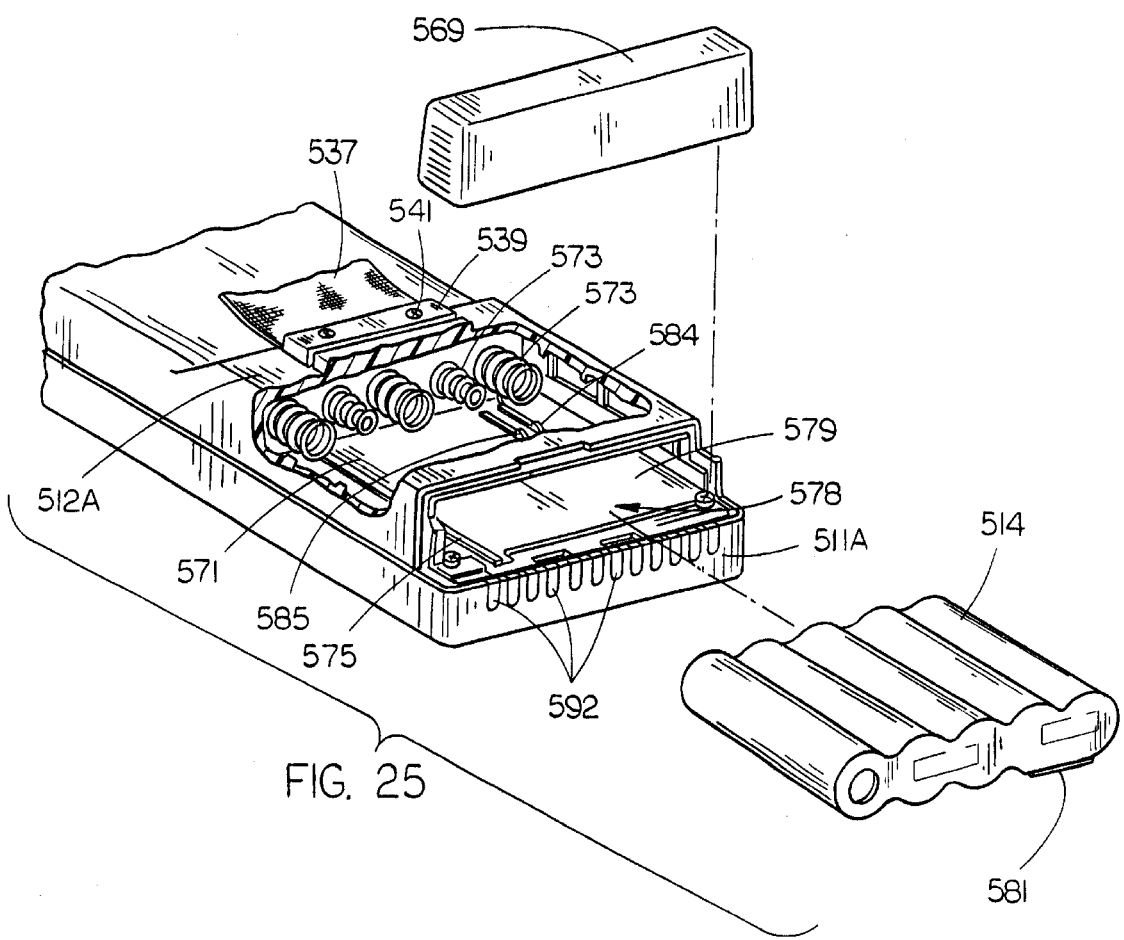

FIG. 25 is a diagrammatic partial perspective illustration of the terminal with a cut-away view of a battery compartment, showing a detached battery end cap and a removed nickel-cadmium battery pack.

Figure 26:
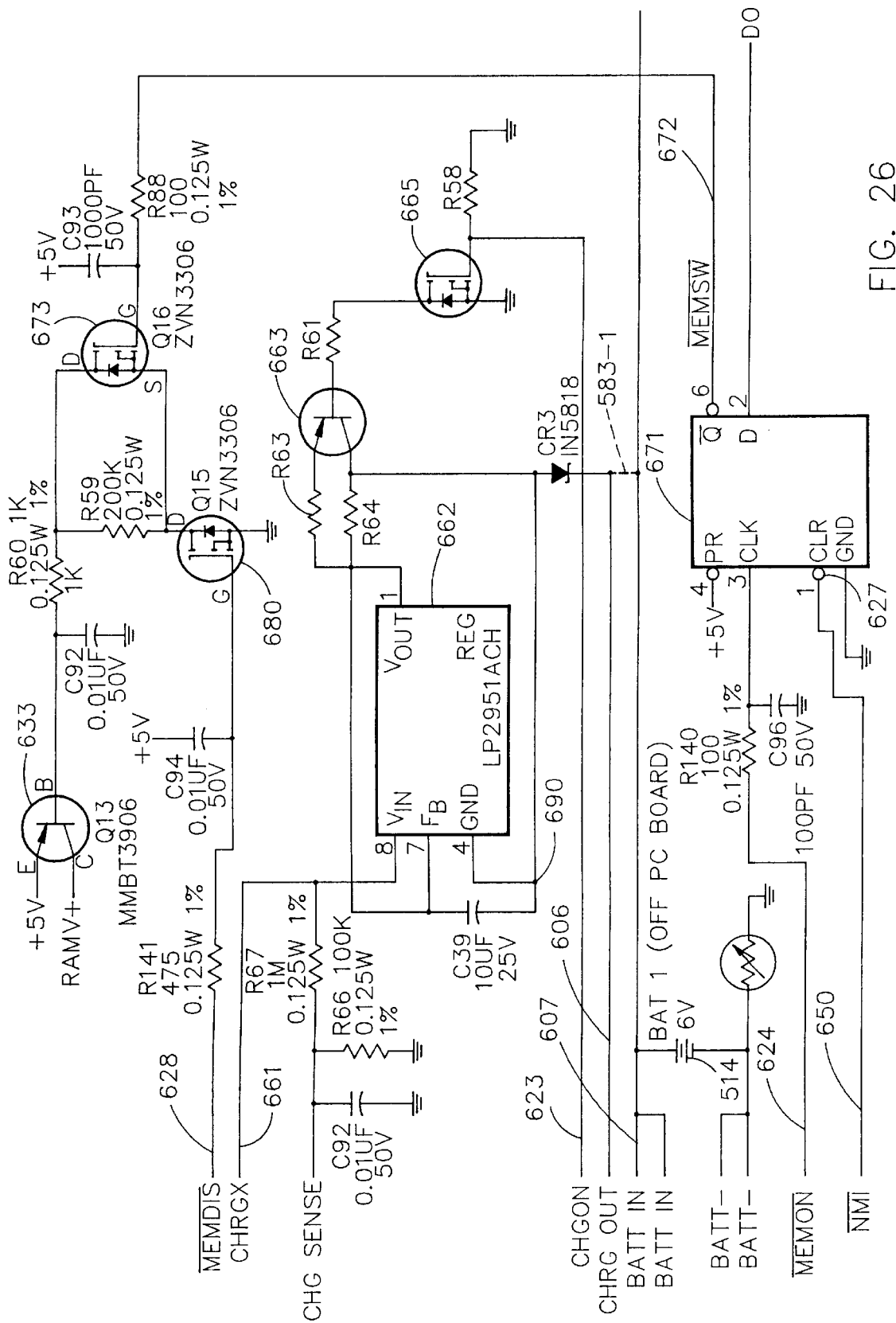

FIG. 26 shows preferred circuit details for the power control components of the terminal of FIGS. 21–25.

Figure 27:
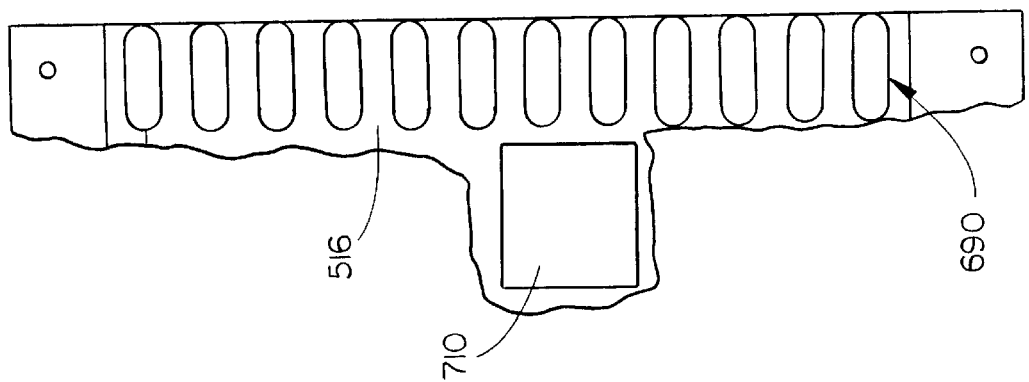

FIG. 27 is a somewhat diagrammatic partial plan view of the host printed circuit board of the terminal of FIGS. 21–26, for illustrating the connector pads and adjacent components.

Figure 28A:
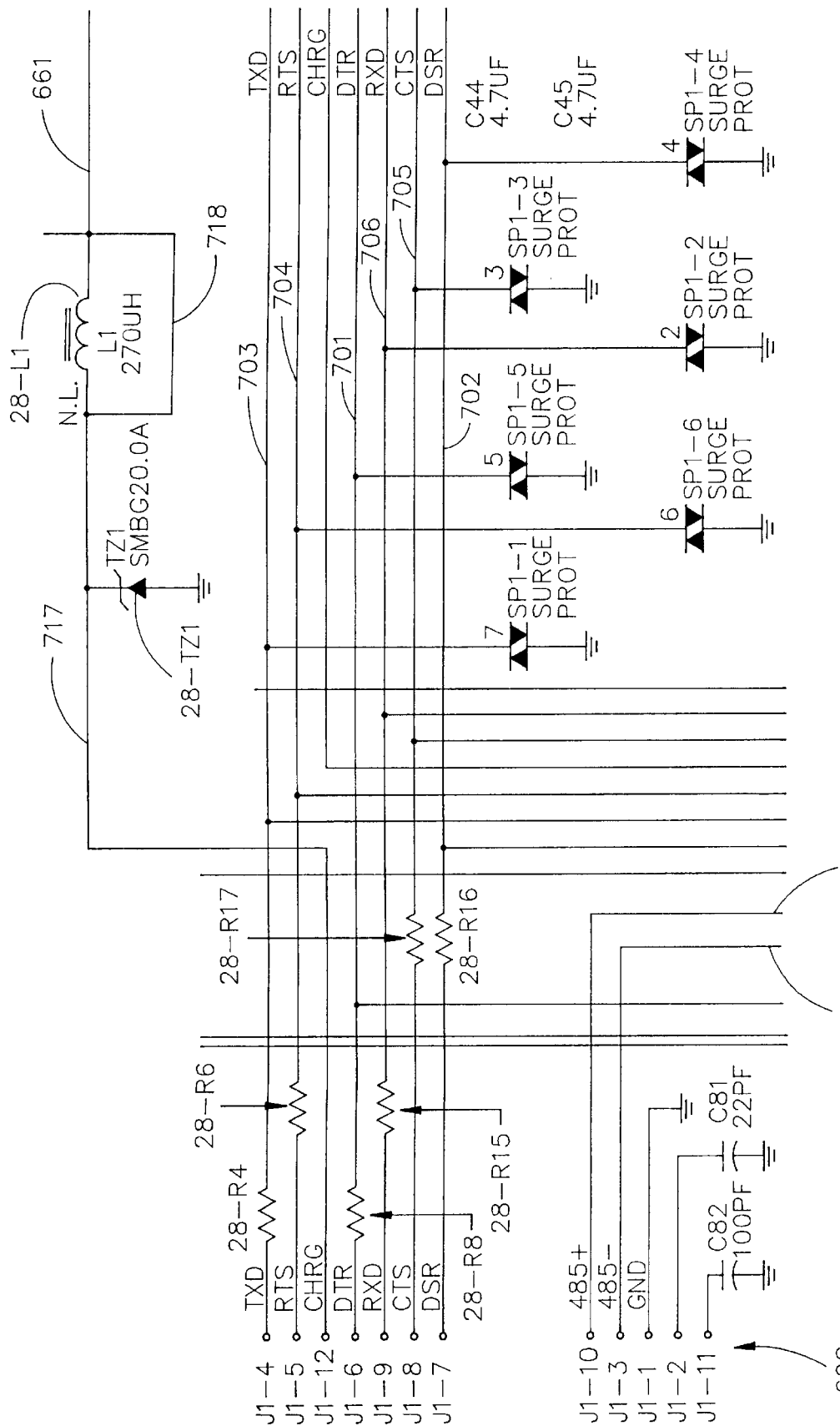
Figure 28B:
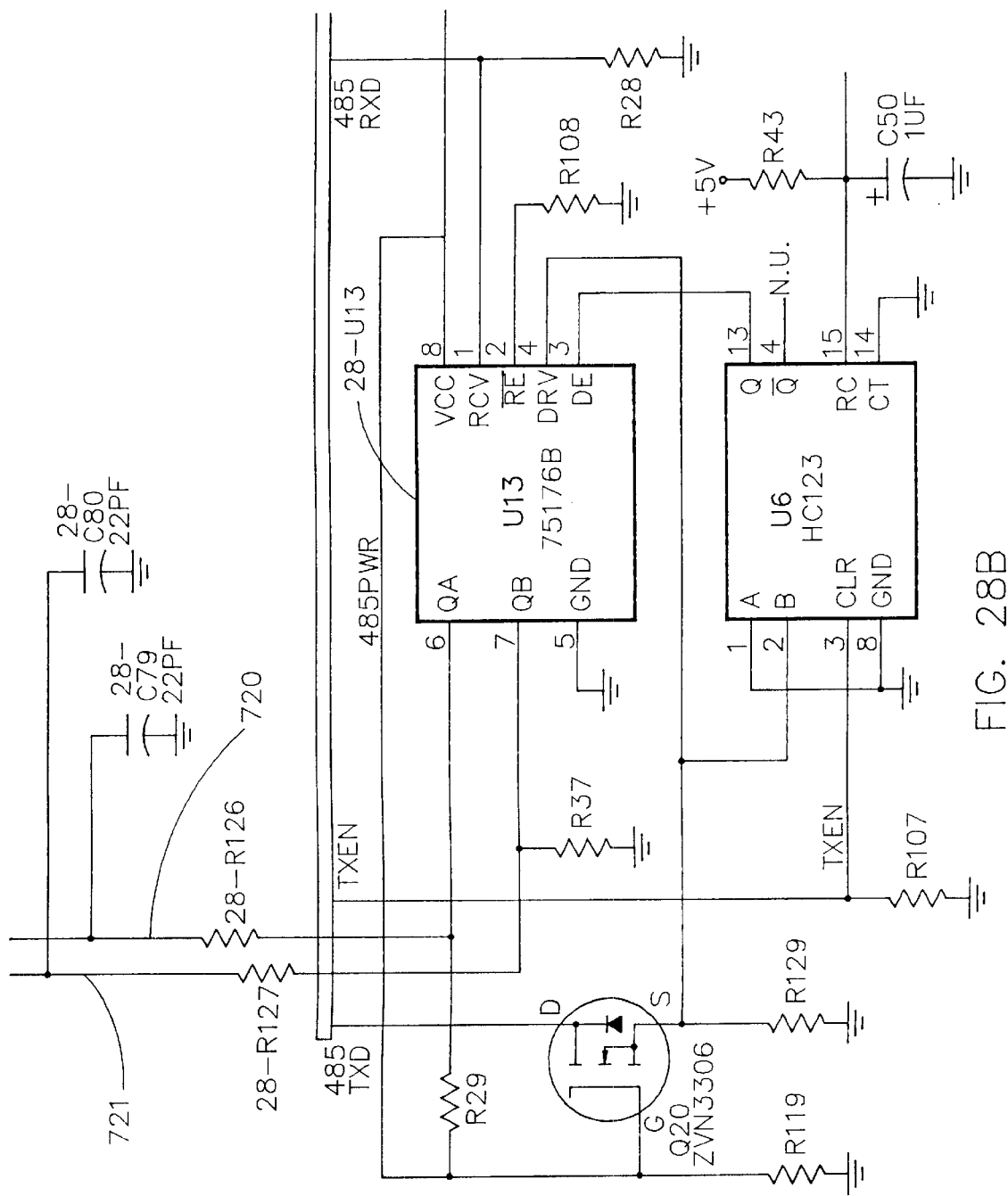

FIGS. 28A and 28B show a partial electric circuit diagram for indicating the electrical nature of certain of the components of FIG. 27; FIG. 28B being a continuation of FIG. 28A in a downward direction.

Figure 31:
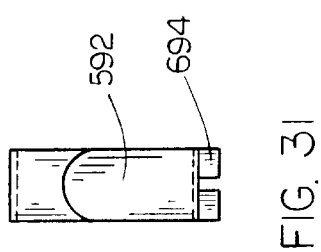
Figure 29:
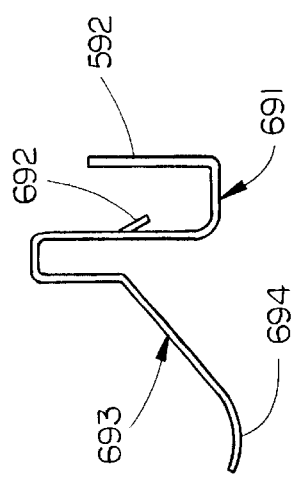
Figure 30:
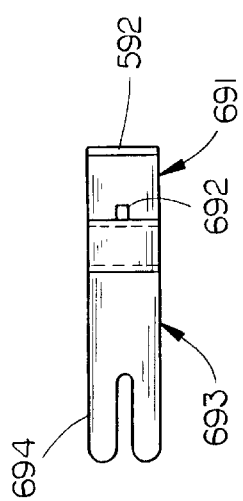

FIGS. 29, 30 and 31 are side, top and end elevational views of a surface contact clip which may be utilized for providing the external surface contacts of FIG. 25, and for coupling thereof with the contact pads of FIG. 27.

DETAILED DESCRIPTION

FIG. 1 shows a portable battery operated data terminal 10 which may be connected by means of a docking unit 11 with one or more peripheral devices such is 12–15 (e.g. devices that might be particularly suited for forklift truck applications), the terminal and peripheral devices being coupled via a local area network data bus 16 of a self-propelled manually steered vehicle 17. For the case of a forklift truck 17, docking units such as 11 may releasably accommodate terminals such as terminal 10 which receive and store data obtained by means of an optical bar code or RF tag scanner 18. As indicated at 19, vehicle power is generally available from the electrical system of the vehicle. Certain electric vehicles such as lift trucks may operate from voltages as high as 72 volts, so higher voltage operation must be accommodated as well as the more typical value of twelve volts.

A general characteristic of each LAN connected device in FIGS. 1 through 6 is that communication and control intelligence is required to receive and transmit information through the LAN. The terminal (e.g. terminal 10, FIG. 1) with its processor and memory system may serve as a communication controller or primary processor while each peripheral device (such as 12–15, FIG. 1) may comprise a secondary unit which typically contains a microcomputer to perform communication and control tasks. Certain applications may involve multiple terminals (such as 21–26, FIG. 2) connected to a single LAN data bus such as vehicle bus 16, FIG. 1, or such as LAN data bus 27 of fixed installation 28, FIG. 2. Multiple adapters such as 31–36 enable communication from terminal to terminal, and from any of multiple terminals to an RS-232 interface means such as 15, FIG. 1, or 37, FIG. 2. Such an interface may be used for data interchange with a host computer system overseeing a multiplicity of vehicles (such as 17, FIG. 1) or fixed installations (such as 28, FIG. 2), and may include the LAN controller (as indicated for interface means 37, FIG. 2).

Vehicle mounted terminals such as terminal 10, FIG. 1, may be removed from vehicle docking units such as 11 at the end of a working shift and physically inserted into one of the docking units 31–36 of a fixed installation 28 for transfer of accumulated data to a host computer. Components 15 and 37 may comprise LAN controller and protocol converters for adapting to an external RS-232 transmission system. Alternatively, a vehicle such as 17 could itself be coupled with a host computer via interface means 15, e.g. while for the case of an electrically driven vehicle, the vehicle batteries were being recharged. In each case, the batteries of terminals such as 21–26, FIG. 2, would be recharged e.g. from AC power as indicated at 38, FIG. 2. Where interface means 15, FIG. 1, does not include the LAN controller, terminals such as 10 may be automatically switched when in docking unit 11 so as to activate primary LAN programming enabling the microcomputer of terminal 10 to act as the LAN controller when on board vehicle 17. When such a terminal 10 is inserted in one of docking units 31–36 on the other hand, the terminal would operate as a standard secondary unit, and be identified dynamically by means of the primary programming of the LAN controller of interface means 37.

As shown in FIG. 3, a series of terminals such as 41–43 may be coupled with a LAN data bus 44 via respective docking units such as 45–47 which may be part of self propelled manually steered vehicle 48. Such multiple terminals can thus share peripheral devices on board the vehicle such as printer 49. Again the LAN controller may be external to the terminals, e.g. associated with printer 49 or an interface means such as 15, FIG. 1, or 37, FIG. 2.

FIG. 4 shows a diagram of a data terminal 60 and peripherals 61–67 in an arrangement that might be particularly suited to a route or delivery truck application. The LAN communication protocol is preferably designed to coordinate and resolve all of the resultant communication requirements. As in FIG. 1, terminal 60 may contain programming to act as the LAN controller and may be removably received in a mobile mount adapter 70 of a vehicle 71 which supplies operating and recharging power to the terminal batteries as indicated at 72. RF coupling means 67 may alternatively contain the network controller and further may couple the LAN data bus 73 with a stationary host so that data from terminal 60 and from measurement means 61–65 may be supplied periodically to a host computer system, and data from the host may be supplied for example to printer 66 as needed. In FIG. 1, LAN data bus 16 may have an RF modem coupled therewith, and in each of FIGS. 1, 3 and 4, the terminals may receive scheduling information or the like whenever required during a working day, from a host computer system via an RF link, for example. Thus on-line communication with a host computer may be established at any time. The network controller when separate from the terminal may contain a special buffer memory for storing data for one or more terminals which may be temporarily disconnected from the network. Such network controller and buffer memory may be part of an RF unit having two-way on-line communication with a host computer, in any of the embodiments of FIGS. 1–4.

Description of FIG. 5

The application of a LAN communication structure for networking multiple portable terminals may present unique difficulties since the portable terminals may be removed from the system for various purposes such as those previously described herein. Further it is desirable to provide a system whereby the terminals may be placed in generally random physical network locations by the terminal users. Preferably the terminals may be identified on a dynamic basis as they are added to the local area network, without requiring a unique "hard" terminal address for each terminal which may be associated with the network.

A unique feature of the preferred LAN protocol of the present invention is in its structure for addressing that establishes "virtual" rather than permanent physical identification of the communicating devices. This is advantageous in that communication sessions may involve a set of physical devices and connections that are constantly being changed and rearranged (as is common with portable data terminals and their peripherals). The implementation of the LAN communication protocol preferably conforms to the International Standards Organization (ISO) reference model for Open System Interconnection with the functional operations broken into "layers" as diagrammed in FIG. 5.

Description of FIG. 6

The physical electrical interface to the LAN is preferably as diagrammed in FIG. 6. Here the LAN data bus consists of a balanced two-wire signal pair 91 and 92 conforming to the EIA RS 485 interface standard with tri-state wire-OR capability for the desired multidrop characteristic. Because of the need for moderate line lengths (up to 100 feet), relatively fast signalling rates (up to 1 Mhz), and high immunity to electrical noise, the physical communication link must be treated as a transmission line with low characteristic impedance, typically 120 ohm. Line termination may be made through resistors such as 93 and 94 of a value equal to that characteristic impedance which results in a relatively high current required to drive a signal on the line. To achieve these characteristics, a line drive integrated circuit 95 is used that has sufficient output capability to provide the necessary output current. A typical device that has this capability is the Texas Instruments SN75176 type. In general, devices of this type are bipolar circuits that require significantly more operating current that is usually available in a portable product that is powered from batteries. To adapt the LAN data bus to the requirements of portable terminal devices such as shown in FIGS. 1–4, power to the line driver integrated circuit as indicated in FIG. 6 is switched e.g. by means of a power transistor 97 to minimize the battery current drain. Transistor 97 is shown as being controlled by a microcomputer 98 which may be part of the portable terminals of FIGS. 1–4. In general each peripheral in FIGS. 1–4 may also include a microcomputer for performing the functions of microcomputer 98.

It is useful to note that operation of the LAN is typically not needed when the terminal is being used in the portable mode, but is only required when the terminal is placed in a LAN interface docking unit. In this mode, power for operation is provided externally from vehicle power rather than the terminal batteries. The quick removability of a terminal and scanner means from its mobile mount docking means is symbolized by small circles 101 and 102 which in this case may represent the electrical connections formed between respective spring fingers 110, FIG. 7, of the mobile mount docking means such as 11, and respective mating external contact pads 111, FIGS. 7 and 9, of the terminal and scanner means.

With the driver/receiver and line termination arrangement as shown in FIG. 6, inactive or physically "not present" terminals represent virtually no loading or effect on the system. It is only when the terminal begins to transmit data that it is known to exist by the network. Consequently, no special switching or isolation is required to remove or replace a terminal from the system.

Description of FIGS. 7, 8 and 9

A significant difference between the LAN configurations typically used for personal computer networking and communications, and the configuration described here for use with portable data terminals has to do with the mechanical connector method employed for interface to the electrical network. Presently common commercially available LAN products may utilize coaxial cables and connectors, twisted pair conductors with some type of connector termination or in some cases, telephone wire with modular phone jacks. Each of these physical interface methods requires a "fastening" and "unfastening" operation when the attached device is connected and unconnected from the network. An important feature of the portable LAN described here is in its method of electrical connection between the LAN and the connected portable terminal which must be removed and replaced often during operation. To eliminate the need for fastening and unfastening of a connector, in a preferred embodiment conductive contact pads 111 are exposed e.g. at an undersurface of each terminal such as terminal 10, FIG. 1, and each docking unit such as 11 is provided with spring loaded mating contacts 110. The docking unit holds the terminal securely in place while aligning the external contact pads 111 with the mating contacts fingers 110. An additional feature of the LAN interface docking unit for mobile mounting applications is in its "open face" which allows connection to a scanner such as 18, FIGS. 1 and 7, without impeding the placement and removal of the terminal from the docking unit. Thus referring to FIG. 7, terminal 10 is shown in initial contact with the docking unit indicated at 11, with a connector 120 leading to scanner 18 located in the open area of the docking unit. The docking unit may have a contact assembly 125 including spring fingers 110 aligned with respective terminal contact pads 111. FIG. 8 is an enlarged view of contact assembly 125 and shows the initial position of contact finger 110 at 110A, and shows a deflected position at 110B (the terminal being fully inserted into and frictionally held by the adapter to maintain the deflected condition 110B of the spring fingers).

FIG. 9 is a bottom plan view of the terminal 10, showing its set of contact pads such as 111, and showing connector fittings at 127 and 128 one of which may receive the scanner connector 120, FIG. 7. In FIGS. 7 and 9, docking unit 11 is shown as comprising a base part 131 which may be notched at 132 to accommodate scanner fitting 120, and a pair of upstanding generally C shaped parts 133 and 134 which define a channel 135 for receiving the terminal 10. The parts 133 and 134 may have sloping surfaces such as 136, FIG. 7, which limit the downward movement of a terminal into the receiving channel, and serve to frictionally retain the terminal with a suitable degree of pressure between contact pads such as 111 and mating spring fingers such as 110.

The present disclosure represents a significant improvement, for example in providing one or more mobile mount docking units such as 11, FIG. 1, 45, 46, 47, FIG. 3, and 70, FIG. 4, on a multidrop data bus with diverse peripheral devices such as 12 to 15, FIG. 1, 49, FIG. 3, and 61 to 67, FIG. 4. Further, various devices may be added to the system on a dynamic basis during system operation, and assigned addresses as they become active on the network.

The conduit system containing the LAN data bus and power supply conductors may also contain a charging power line for supplying charging power to one of the contact fingers 110 which mates with the charging current input contact pad e.g. 111A, FIG. 9, of the terminal 10.

Discussion of Related Patent Application Concerning Battery Charging Control

The entire disclosure including the drawings of U.S. Pat. No. 4,885,523 are hereby incorporated herein by reference. The twenty-seventh figure of this incorporated Patent shows a charging arrangement which may be applied to an individually manned transport vehicle with local area network system as taught herein. Thus terminal 10 of the present disclosure may incorporate the terminal system (27-10A) and battery pack (27-10B) of the twenty-seventh figure. A charger (27-22) may be mounted adjacent mobile mount docking unit 11 and receive charging power from the vehicle. Where the vehicle system supplies power at a relatively high voltage such as seventy-two volts, preferably such voltage is reduced to a lower voltage value such as twelve volts at a location near the vehicle power source and then power at such lower voltage value is supplied by a suitable cable to the charger component (27-22). In this embodiment, the charger has terminals labeled +CHARGE, TEMP, GND, CHG CONTROL which would be connected to four of the spring fingers 110, FIG. 7, of the mobile mount docking unit 11. The other two spring fingers 110 would be connected to the lines LAN+DATA and LAN−DATA of the twenty-seventh figure which would correspond with LAN data bus 16, FIG. 1. The LAN interface (27-39) of the twenty-seventh figure would include line driver/receiver 95, FIG. 6, which would receive +5 volts and the Power control signal from the microcomputer of the terminal system (27-10A) of the twenty-seventh figure.

Where the terminal 10 is provided with an RF transceiver, the terminal may correspond with the terminal described in U.S. Pat. No. 4,953,113 which is hereby incorporated herein by reference.

Discussion of FIGS. 1–9

FIGS. 1, 3 and 4 illustrate vehicle data systems for vehicles such as forklift trucks and delivery vans which are utilized in product transport processes and the like. Such vehicles normally contain vehicle electric power means associated with the vehicle drive, e.g. a motive power engine-driven alternator or generator and vehicle storage battery for use in starting the engine, or electric storage batteries which themselves provide the propulsion energy. The vehicle power represented at 19 in FIG. 1, and at 72 in FIG. 4 preferably is derived from the vehicle electric power means. Vehicle power may also energize the LAN devices 12 to 15, FIG. 1, 45, 46, 47 and 49, FIG. 3, and 66 and 67, FIG. 4, as well as the interface circuits for devices 12 to 15, 49 and 61 to 67 which may correspond with LAN interface 95, 97, 98, FIG. 6. In such a case vehicle power is supplied via suitable voltage regulator means to points such as 140 and 141 in FIG. 6 as well as to microcomputer 98, for each device permanently associated with the LAN data bus in FIGS. 1, 3 and 4. Where components such as 95, 97, 98 in FIG. 6 are part of a removable device such as terminal 10, FIG. 1, terminals 41, 42, 43, FIG. 3, and 60, FIG. 4, such components may be supplied from battery power carried with the removable device, or from charging power (+CHG) derived from the vehicle electric power means, e.g. 19 or 72. The local area network means of FIGS. 1, 3 and 4 is preferably powered at least in part from vehicle electric power means and independently of fixed power sources (such as represented at 38 in FIG. 2).

While FIG. 1 shows an optical or RF scanner means 18 connected by a cable 150 and cable fitting 120 with a connector of the terminal 10 to form data terminal and scanner means, parts 10 and 18 may be in a single unit. The receiving channel of the mobile mount docking unit of FIGS. 1 through 4 may frictionally receive the handgrip part (15) and support the horizontally extended undersurface of the scanner barrel, while providing adequate clearance so as to insure against actuation of the trigger (32) as the scanner and terminal means (10) is inserted into and removed from the various docking units. Convenient access to the card receptacle (20) of the incorporated scanner and terminal means would thus be provided while the scanner and terminal unit was in place in each docking unit. Also the scanner and terminal unit would be held securely to enable normal application of manual pressure to the keyboard segments (11a, 11B).

Alternatively, the mobile mount docking units may contain interface components such as 95, 97, 98 which are energized from vehicle power, and also alternatively an optical coupling may be provided between a light emitting diode and light sensor of the scanner and terminal unit of the incorporated application and the microcomputer 98 within each adapter for accommodating the interchange of data between the scanner and terminal unit and the LAN data bus, e.g. to effect printout of data from the scanner and terminal unit on a printer such as 14, FIG. 1, 49, FIG. 3 or 66, FIG. 4, or to effect transmission of data via component 37, FIG. 2, or 67, FIG. 4.

The present invention may be implemented on an individually manned transport vehicle where the driver of the vehicle is the one concerned with operation of the on board devices. Since the driver at times must devote full attention to guidance of the vehicle, it is particularly appropriate that the data capture devices can be quickly inserted into and removed from mobile mount docking units, so that the driver may be completely unencumbered while driving the vehicle. It is advantageous to have a large area display which can be read at a distance e.g. from the driver seat of the vehicle. Such a display can provide information which is useful in moving from one work location to another, e.g. geographical type information; the display being positioned so that such information can be read at a glance e.g. during a brief stop of the vehicle while the driver remains at the controls of the vehicle.

Each of the connectors such as represented at 161 to 165, FIG. 1, 166 to 169, FIG. 3, and 171 to 173, FIG. 4, may be a standardized quick-connect and quick-disconnect type so that docking units and devices may be interchanged and placed at desired locations about each type of individually manned transport vehicle. For example, each connection such as 161 may include a set of spring fingers such as 110 receiving the LAN+ and LAN– connections such as 101, 102, FIG. 6. Each device may then include an interface such as shown at 95, 97, 98, and power supply means for energizing these components from vehicle electric power, (vehicle electric power being available e.g. from a twelve-volt d.c. plug-in power receptacle adjacent each connection 161–169, 171–173).

Each connection such as 110, 111, FIG. 7, may be maintained by a frictional ball and socket type detent such as indicated at 180, FIG. 7, which seats with an audible click into a terminal recess 181 when correct deflection of spring contacts 110 has been achieved.

Description of FIGS. 10–13

FIG. 10 shows subject matter similar to FIGS. 1 and 7, but in a more detailed manner and illustrates a presently preferred vehicle mounted docking unit 200.

In FIG. 10, frame 201 may be a rigid part of a vehicle such as a forklift truck, delivery van, or the like. The docket unit may have a mounting stand 202 including a base 203 secured to frame 201 and an upright 204 which adjustably carries the docking unit terminal receptacle means 206. Receptacle means 206 has a channel 207 for receiving a data entry terminal 10. Terminal 10 may be an RF terminal unit and have a RF antenna located as indicated at 208 in FIG. 1.

Receptacle means 206 may have opposing sidewalls 222 and 224 which are interconnected by rear wall 226. Front wall parts 228A, 228B and 228C cover only the margins 10a, 10b and 10c of the terminal avoiding interference with keypad 229 of data entry terminal 10. Bottom wall 230 interconnects with sidewalls 222 and 224 and the front wall parts and the rear wall 226. Contact elements 232 normally project above the level of bottom wall 230. Guide rails 234, 235 (FIG. 12) have sloping upper edges 234a, 235a to engage data entry terminal 10 as it is inserted into channel 207, so as to guide the terminal into proper alignment with contact elements 232.

The parts 222, 224 and 226 fit within a mounting frame 240. The frame 240 has a housing 241 at its rear side which is carried by an adjustment mechanism 242 of vehicle mount 202.

Contact elements 232 are arranged in spaced apart fashion in correspondence with the spacing of pads such as 111, 111A, FIG. 9. A gap 242 is present in bottom wall 230 and between parts such as 228A and 228C to accommodate connector 120 (FIGS. 7 and 11). Thus gap 242 corresponds with space 131 indicated in FIG. 7.

Detents 250 and 252 (see FIG. 12) may be carried on tabs 254, FIG. 10, 255, FIG. 11, which have upper margins integral with rear wall 226. The tabs 254, 255 accommodate resilient deflection of the detents as the terminal 10 is inserted into channel 207. The detents 250, 252 define a fully inserted position of the terminal 10 wherein a desired degree of contact pressure has been established between contact elements 232 and contact pads such as 111, 111A, FIG. 9, of the terminal.

In the embodiment shown in FIG. 9, the RF terminal 10 has a connector 127 providing for signal communication according to the RS-232 format. In this way terminal 10 may be compatible with an earlier version of docking system utilizing pin and socket type connectors. Where the docking unit is to receive RF terminals according to FIG. 9 which are not equipped with a LAN interface e.g. as shown in FIG. 6, such docking unit may be provided with a cooperating pin type connector 254 which is fully engaged with terminal connector 127, FIG. 9, when the terminal is inserted in channel 207 to the position established by detent means 250, 252.

When such transitional type terminal units are no longer required, the connector 254 may be dispensed with. An advanced type of RF terminal may omit both connectors 127 and 128, FIG. 9, so that the terminal is entirely free of recesses of the type indicated at 127 and 128 in FIG. 9. In this case, coupling to a separate reader unit such as 118 may be by means of a wireless link. All electrical contact type connections will then take place through contact pads such as 111, 111A, FIG. 9, which are generally flush with the exterior of the terminal unit for maximum imperviousness of the terminal to contaminants and mechanical damage.

A connector is indicated at 276 in FIG. 10, for providing quick connection and disconnection with a flexible cable leading to a suitable interface means e.g. as indicated at 15 in FIG. 1. A power connector 277, FIG. 10, may receive charging power via a second flexible cable. The second flexible cable may be connected with a battery charger for charging the batteries of terminal unit 10, and the battery charger may be energized from vehicle electric power as previously described.

Certain pin positions of connector 276 and the pins of power connector 277 may be connected via suitable interface circuitry with respective spring loaded contacts 232 so that all connections with a data terminal unit are via its contact pads such as 111, 111A, FIG. 9 as previously described e.g. with reference to FIG. 9. Other pin positions of connector 276 may connect with pin positions of connector 254 to accommodate transitional type terminals which are not equipped to operate exclusively via the open type abutting contact means 111, 111A, 232.

Where the terminal 10 has a hand strap as indicated at 10D, FIG. 9, or 537, FIG. 24, the rails 234, 235, FIG. 12, may be configured to insure that such strap and its mounting parts such as 10E, 10F, FIG. 9 or such as 538, FIG. 24, do not interfere with insertion of the terminal into channel 207 of the terminal receptacle means 206. Thus rails 234, 235 may engage the terminal at regions such as indicated at 512A, FIGS. 24 and 25.

Referring to FIG. 11, a plurality of contact elements 232 are deployed within a contact receiving block 278 of insulating material. Each contact element 232 comprises a formed resilient conductive strip having a first leg 280 in a fixed position. A second deflectable leg 282 of each strip is provided with a generally U-shaped section for projecting into channel 207. First leg 280 and second leg 282 are formed in generally parallel relationship and are connected by a reverse bend 288. Contact elements 232 are constructed of electrically conductive material with sufficient resilience so that deflectable leg 282 will return to a position with its free end at the upper end of a confining slot when not subjected to deflective force. (See position 110A, FIG. 8.)

Each contact element 232 is fitted into contact receiving block 278 such that contact elements 232 are spaced apart in parallel insulated relationship with the U-shaped sections of legs 282 projecting into channel 207 as shown in FIG. 10. Second legs 282 are deflectable downward to the position shown in FIG. 11 as the terminal unit reaches fully inserted position. First leg 280 of contact element 232 is provided with a protrusion corresponding to portion 281, FIG. 8, for establishing electrical contact with a conductive area on circuit board 290, FIG. 11, to which contact receiving block 278 is secured.

Referring to FIG. 11, it can be seen that contact receiving block 278 is positioned so as to extend into an opening of bottom wall 230.

As indicted at 181 in FIG. 7, the data terminal 10 has indentations for establishing fully inserted position. FIG. 11 shows one of the detents, e.g. 252, engaged in a cooperating segmental spherical indentation of the terminal. As the terminal is removed from channel 207, the detents 250 and 252 are cammed out of the receiving indentations by the mating segmental spherical surfaces thereof against the bias of the tabs 254, 255. As the lower end of the terminal clears the detents, the detents assume a normal position as shown in FIG. 10. Upon insertion of the terminal, its lower end cooperates with the segmental spherical external surfaces of the detents to deflect the detents rearwardly until the cooperating indentations of the terminal are moved into register therewith.

The front wall sections 228A, 228B may have raised ribs such as 292, FIGS. 10 and 11 with tapered upper ends 292a for cooperating with rails 234, 235 in the low friction guidance of the terminal into a precise position relative to spring loaded contact elements 232.

The employment of detents 250 and 252 in cooperation with indentations in the terminal 10 permits frame 240 to be disposed in other than generally vertical orientation while still maintaining a secure retention of data entry terminal 10 in the docking unit with firm reliable interengagement of contact pads such as 111, 111A, FIG. 9, of data entry terminal 10 with contact elements 232 in spite of vehicle jarring and vibration.

FIG. 13 shows a rear perspective view of the docking unit, showing a handle 293 which serves to loosen a clamping arrangement so that the terminal receptacle means 206 can be angularly adjusted fore and aft as represented by double headed arrow 294 and/or swiveled laterally about the axis of post 204 as indicated by double headed arrow 295. A preferred adjustment mechanism 242 is commercially available and is covered by U.S. Pat. No. 2,898,068.

Also shown in FIG. 13 is a signalling means 296 such as a horn for communicating with the operator particularly in a high noise environment. Toggle switch 297 may serve to disable the signalling means 296 when a high intensity audible signal is not required. The horn mechanism 296 is to be placed inside housing 241 in a future version.

Discussion Re FIGS. 7 and 10–13

FIG. 7 shows a holster 190 on base 131 for receiving and securely retaining a scanner such as 18, e.g. by a resilient liner 191 of the holster 190 frictionally engaging with a barrel 192 of the scanner. The holster 190 may be constructed e.g. at 193 to hold the handgrip part 194 and trigger 195 clear thereof so that the scanner of FIG. 7 is quickly and easily removed by manually grasping the handgrip part 194, and so that the trigger 195 will not be actuated as the scanner is manually inserted into the holster. FIGS. 10 and 11 show a similar holster 390 with resilient liner 391 and stop elements 393 of resilient material.

The scanner for bar codes need not be physically attached to the terminal. In configurations for warehouse scanning systems, a lot of the software effort involved may represent the accommodation of the periodic removal of major sections of the system to do remote scanning of marginally accessible codes. In conventional practice the scanner is always attached to the terminal by a pendant cable and if the code to be scanned is beyond the reach of the cable then the terminal must necessarily be removed from its holster. The terminal may represent a very significant portion of a "LAN" system and to remove it in this fashion may disable the system generally. Placing the terminal in its holster again may entail the reestablishment of the hierarchial or virtual address structure that was established prior to the removal of the terminal.

If, however, it is possible to only remove the scanner and to not be tied to the terminal by a cable then the degree of disability imposed upon the "LAN" system is significantly lessened and the software effort to develop such a system would be reduced.

The terminals now incorporate various types of scanner interfaces. Some of them have been add-on devices to accommodate scanner types manufactured by third parties. Others have been built-in and have been used to communicate with scanners such as shown in U.S. Pat. No. 4,766,300. Some of these handheld terminal devices provide power converters accommodating the requirements idiosyncratic to specific scanner types. All of such scanners directly draw power from the terminal, reducing operational time per battery charge.

A scanner such as 18, FIGS. 7 and 10–11, may be operated while disconnected from the terminal on a permanent basis. Terminals presently connect with a host by an RF link and maintain contact without benefit of cable. Of course, terminals mounted on a vehicle will be drawing their power from the vehicular electrical system. The power requirements for a scanner connected by cable to a terminal on a vehicle as in FIGS. 7 and 10–11 will not be a large factor in the power budget imposed upon the terminal.

Detaching the terminal from the scanner completely, provides benefits in the area of flexibility and ease of use. Since the scanner doesn't require contact with or attachment to the terminal the job of providing operating power no longer is the province of the terminal. The scanner, being completely portable would require its own battery pack but this pack would not have to be unusually capacious. Once the scanning function has been performed the scanner can be reinserted in its holster on the vehicle and charged back up to full capacity from vehicle power by its own charger.

The communication link replacing cable 150, FIG. 7, may be ultrasonic but could also be infrared or even another very low power RF link. Various modulation and demodulation schemes could be employed and the choice of the most appropriate means of encoding data on the channel would depend greatly upon the channel type used. Once the code had been read, the link between the scanner and the terminal could employ one of the various error checking and correcting procedures.

Physically the terminals would still incorporate a form of scanner interface but the link would not be mechanical. It would be desirable to provide a bidirectional data path. The scanner would include the matching interface to implement the link and using a bidirectional data path the scanner could receive an acknowledgement after a scan. Reception of such an acknowledgement would constitute an indication of a valid scan and the illumination of an indicator light would provide operator feedback. The lack of a response from the terminal in a specified time period would constitute a negative acknowledgement and another indication on the scanner would signal the operator that another scan was necessary.

Appropriate scanners for this type of operation would include current wand and modified CCD type scanners of Norand Corporation and a number of other manufacturer's laser scanners.

This scanner would be used typically, by a forklift operator in close proximity to his vehicle. Limited range would not be a significant deterrent here and may even be a benefit in an operation where multiple units are in use.

U.S. Ser. No. 08/024,892 filed Mar. 1, 1993 (issue fee paid Oct. 21, 1993), and shows a high performance data terminal coupled to a ruggedized printer. The printer may utilize a cradle type docking configuration. An overall printer system is shown in an application of George E. Chadima, Jr. and Darald R. Schultz U.S. Ser. No. 07/227,195 filed Aug. 2, 1988. This subject matter is now in a continuation-in-part application U.S. Ser. No. 07/549,298 filed Jul. 5, 1990, now U.S. Pat. No. 5,180,232 issued Jan. 19, 1993, the earlier application Ser. No. 07/227,195 having been abandoned in favor of Ser. No. 07/549,298. The disclosure including drawings and appendices of U.S. Pat. No. 5,180,232 is hereby incorporated herein by reference as showing portable and van-mounted printer systems to which the docking unit contact arrangement of the present invention may be applied.

By way of example, referring to the seventh figure of the incorporated application U.S. Pat. No. 5,180,232, in place of pin type connector (154) at the fixed end of the terminal receptacle, an open, abutment type contact arrangement such as represented by spring contact elements 232, FIGS. 10 and 11, may be applied to the movable retainer part (150 of the incorporated seventh figure) with a suitable flexible electrical connector (in place of 160), so that a terminal such as 10, FIGS. 10 and 11, can have its bottom end inserted into engagement with the movable retainer, utilizing manual force on the terminal 10 to displace the retainer against the action of its biasing spring (194, seventh incorporated figure). When the receiving space of the receptacle is sufficiently large the upper end of the terminal may be pressed into the receptacle. The retainer will then hold the terminal in the seated position by virtue of its overhanging lip (222, seventh incorporated figure) with external contact pad means such as 111, 111A, FIG. 9 in pressure engagement with the spring contact elements. The spring bias (194) on the retainer (150) will exert a greater force than the contact spring elements so that pressure engagement is established corresponding to that represented in FIG. 11. To remove the terminal, the sides of the terminal should be manually accessible so that the terminal can be manually shifted against the action of the spring bias (194) on the retainer (150) whereupon the upper end of the terminal can be lifted out of the receptacle and the terminal disengaged from the retainer (150).

This same description applies to the fifteenth figure of the incorporated U.S. Pat. No. 5,180,232 which shows a van-mounted printer. As shown in the incorporated fifteenth figure, the display is fully visually observable by the operator, and the keyboard is completely manually accessible while the terminal is in the printer receptacles of the incorporate seventh and fifteenth figures.

The various parts of the docking unit receptacle means 206 may be identical to parts forming a wall mounted docking unit such as may be represented by FIG. 2 hereof. Further details of a single docking unit for home or office use and of a wall or table mounted multiple docking assembly utilizing many parts identical to those of FIGS. 10–13 U.S. Pat. No. 5,052,943. The disclosure including the drawings of U.S. Pat. No. 5,052,943 is hereby incorporated herein by reference.

Description of FIGS. 14–16

In an early embodiment of the present invention to which the claims are directed, a data terminal 300, FIG. 15, having a two-line display (2 line by 16 characters) adjacent an upper display end 310, FIG. 16, and a forty key position keyboard 311 and with the general arrangement of these parts as shown for terminal 10, FIG. 10, was provided with a linear series of ten external contacts at ten through holes 320, FIG. 15, in the form of cylindrical rivets with circular rounded heads such as 321 disposed tightly flatwise against the end wall 322 so as to be generally flush with the exterior of the terminal at the upper end wall 322. A receptacle 330, FIG. 16, was in the form of a cradle-like structure with a bottom wall 331, optional side rails such as 334, one end wall 332 fixed to the bottom wall, and an opposite end 333 shiftable outwardly against the action of a pair of biasing spring means such as 336. The shiftable end 333 had a lip 333a for overlying a marginal portion of the terminal below the keyboard. The fixed end 332 of the receptacle had a recess 340 with a line of ten spring fingers such as 341 arranged for open, abutment type engagement with the respective external contact pads (rivet heads) such as 321 of the terminal. The recess 340 at the fixed end 332 received the margin of the upper, display end 310 of the terminal. In one version, the bottom wall 331 had a flat resilient pad at a level tending to guide the terminal for register with the recess 340. The lower margin of the terminal end 310 was rounded e.g. at 310a to further insure proper seating of the terminal in the recess as the shiftable end wall 333 urged the terminal toward the opposite recessed end wall 332. The spring force acting on the shiftable end wall is sufficient to completely overcome the resisting force of the receptacle contact spring fingers 341 so that the terminal is firmly and fixedly secured in the receptacle e.g. as shown in FIG. 16, and the electrical continuity between the terminal contact pads 321 and the receptacle spring fingers 341 will be reliably maintained in spite of severe jarring or vibration of the vehicle moving over rough terrain. The contact spring fingers 341 of the terminal receptacle are thus substantially deflected as the hand-held data terminal is inserted into position in the receptacle, e.g. by the action of the spring loaded shiftable end wall 333 of the receptacle.

In one version of terminal 300, as shown in FIG. 15, the sides of the lower case 300A tapered more sharply at the lower end to provide hand grip portions and abrupt shoulder portions which would serve to insure against the terminal slipping downwardly while being loosely gripped by one hand. The upper finger and thumb in the grip portions could rest against shoulder portions for a more secure and comfortable holding of the terminal. This feature is described and claimed in U.S. Pat. No. 4,953,113, and the disclosure including drawing figures one through fourteen of this U.S. Pat. No. 4,953,113 is hereby incorporated herein by reference in their entirety.

The overhang 332a, 333a at the respective ends of the receptacle insures that the terminal will be securely retained in spite of jarring resulting from vehicle motion and the like.

By way of example, with RS-232 interface circuitry mounted at 348 in chamber 350 of the receptacle fixed end wall 332, and a power receptacle extending through the end wall 332 at 351 and receiving vehicle power, one nine pin connector e.g. 352 at end wall 332 could supply data to the terminal from vehicle sensors such as represented at 61–65 in FIG. 4, while another nine pin connector at end wall 332 could output data including commands to various on-board control devices, e.g. such as represented at 15, 16, 12 and/or 14 in FIG. 1, and at 66 and/or 67 in FIG. 4. Each sensor could have an interface for transmitting the sensed data according to the RS-232 format.

This early type receptacle 330 securely held the terminal 300 therein in any orientation of the receptacle. The receptacle fixed end wall 332 had two standard nine pin D-sub connectors such as 352 at the exterior thereof for receiving mating connectors of cables providing signal communication, and also had a standard power connector as indicated at 351. The three connectors had threaded means for securing mating connectors therewith. By connecting a power cable energized from vehicle electric power with the receptacle power connector 351, the terminal rechargeable batteries at 360 could be maintained fully charged, and operating power to the terminal supplied via two of the mating abutment type contact positions 321, 341 of the receptacle and terminal. Interface circuitry within chamber 350 of the fixed end wall 332 of the receptacle provided for signal communication between the standard nine pin connectors such as 352 and other of the mating abutment type contact positions 321, 341.

Instead of using an RF link as represented at 67 in FIG. 4, it was possible to use the terminal 300 in an on-board receptacle to collect data from vehicle sensors such as indicated at 61–65, FIG. 4, and then to remove the terminal from the vehicle receptacle and transport the terminal to a home or office receptacle where data from the terminal could be loaded into a personal computer system or the like.

In the early embodiment as intended to be used on a vehicle (e.g. farm tractor), the terminal contained data storage means mounted at 370 (e.g. including one-half megabyte of RAM, and EPROM) and microcomputer operated control means mounted at 380, with the EPROM containing downloading/uploading control programming and application programming in RAM storage of means 370 for controlling on board devices and for receiving and storing data from a multiplicity of on-board analog and digital sensors as a basis for such control. The rechargeable battery means 360 received charging current from vehicle electric power while the terminal was in the vehicle mounted receptacle. The battery means facilitated transport of the terminal means to another receptacle e.g. associated with a personal computer system, and generally insured against loss of data from random access memory of the data storage means at 370.

The terminal 300 was of size and weight to be held in one hand and when the receptacle 300 was fixed to a vehicle or the like the terminal could be inserted into the receptacle with the use of one hand manipulating the terminal. It was also possible with the receptacle suitably secured to a vehicle or the like to remove the terminal from the receptacle by grasping opposite terminal side regions such as 381 from the top side thereof, FIG. 16, with one hand and moving the one hand to shift the end wall 333 outwardly, and then with the same one hand to lift the terminal at its display end 310 so as to clear the overhang 332a at the fixed end wall 332 of the receptacle.

With the terminal 300 in the early version of vehicle mounted receptacle 330, the full lines of displayed characters were disposed so that their axes were horizontal and so that the display and the legends at each row of key positions were upright and readily read by the operator; all key positions were readily manually actuated, even though there were to be between about twenty key positions and about forty key positions. By way of example, the early keyboard had forty key positions (eight rows of five positions each) with about twenty seven key positions having a second mode (selected by keys with legends "2nd" and "MODE"). The first mode legends included letters A through Z and numerals 0 through 9, "CLEAR", "ENTER", "MODE" and "2nd" while the second mode legends included symbols representing macro commands and relatively complex mathematical functions e.g. "Ln x".

The term "electrical interchange operation" may be used to refer to the data interchange and/or charging functions performed with the use of the terminal receptacle means such as 330.

The early terminal and receptacle versions had at least six abutment type electrical contact positions, e.g. between about six and about twelve contact positions, arranged in a linear series.

The early terminal housing was of Lexan insulating material and presented an essentially smooth sealed surface broken only by the ten rivets 321 and the keyboard and display at the frontal operating side. A sealed acoustic horn chamber 381 FIGS. 14 and 15, could be provided laterally adjoining battery compartment 382, and could be provided with a star pattern of apertures 383 for coupling sound signals to the exterior of the compartment. A battery plug or cover part 384, FIG. 14, which seals the battery compartment 382 when in place in the bottom wall of the terminal, has laterally deflectable free side parts with beads 385, 386 which snap over cooperating ledges in the battery compartment to retain the battery cover part 384 in place.

FIG. 14 shows the upper case 300B separated from the lower case 300A, with the keyboard member 387 of conductive rubber disposed therebetween. When the parts are cemented together, the margin 387a of member 387 serves as a gasket to provide a moisture and dust resistant seal.

The display window 388, FIG. 14, is sealed into an aperture 389 in the top casing 300B, and the keyboard member 387 has an aligned aperture 390, and has its margin 387a extending about the outer perimeter of the display region. The member 387 is a one piece conductive rubber configuration with forty raised lands 391 each projecting upwardly about 0.250 inch above the upper surface 392 of the housing to form the depressible key elements. Each key element had an interior downwardly facing cavity with a nub 393, FIG. 15, of resilient conductive material for bridging row and column conductors for effecting key actuation signalling.

Thus the terminal of FIGS. 14, 15 and 16 is effectively completely sealed against the entrance of moisture or dirt, and is entirely free of pin and socket type connectors. All electrically conductive interchange with the terminal from external data or charging means is via the ten contact pads 321 which are sealed in the end wall 322 of lower housing part 300A.

Description of FIGS. 17 and 18A–18G

In FIG. 17, the DSUB connectors corresponding to connector 352 are indicated at 17-J1 and 17-J2. A ten pin header leading to the contacts 341 is designated 17-J3, and the power connector 351 is represented as charge jack 17-J4. An EIA to TTL interface component 17-U1 may be a type MAX238. FIG. 17 thus represents an exemplary embodiment of the interface circuitry 348, FIG. 16.

FIGS. 18A to 18G represent exemplary terminal circuitry for the data terminal 300, FIGS. 14, 15 and 16. The major exemplary components are indicated in the following tabulation.

18-U1, FIG. 18A
    Real Time Clock e.g. Type 8583
18-U2, FIG. 18B
    Microprocessor, e. g. V25, PLCC Version, type uPD7032XG
18-U3, FIG. 18C
    Low Battery Detector e.g. LP2951ACM
18-U4, FIG. 18A
    NAND gate
18-U5, FIG. 18G EPROM, e.g. 27C256
  18-U7, FIG. 18G
    3 to 8 Line Decoder e.g. 74HC138
  18-U8, 18-U9, 18-U10, 18-U11, FIG. 18F
    RAM, e.g. four 128K×8 Chips
  18-REG 1, FIG. 18C
Voltage Regulator e.g. LM 317 LAZ
  18-J1, FIG. 18A
    Keyboard Column Header
  18-J2, FIG. 18D
    Ten Pads 351 (FIG. 15)
  18-J3, FIG. 18G
    Single Row Header to Display
  18-J4, FIG. 18C
    Output to Nine Volt NICAD Battery
  18-J5, FIG. 18C
    Output to Buzzer (in Compartment 381, FIG. 14) e.g. GMB 111
  18-J6, FIG. 18A
    Keyboard Row Header
Description of FIGS. 19 and 20

FIG. 19 is a diagrammatic partial longitudinal sectional view showing the data terminal 300 of FIGS. 14, 15 and 16 at its end wall 322 having the linear series of ten external contacts at ten through holes 320, FIG. 15. In FIG. 19, a rivet 321 is shown as having a hollow shank 321a extending through one of the holes 320. A wire 400 extends through a ferrite bead 401 and into the hollow shank 321a to which it may be soldered. The opposite end of wire 400 is in electrical contact with a pad 402 of a printed circuit board 404 which carries the circuitry of FIGS. 18A–18G. The single row of pads 402 is represented at 18-J2, FIG. 18D.

In the diagrammatic showing of FIG. 19, capacitor C38 has been physically indicated as connected between a respective pad 402 and a conductive trace 406 on printed circuit board 404 corresponding to line 406, FIG. 20. The trace 406 is indicated as being physically connected via jumper wires such as 408 with pads such as 18-JP1 on a conductive sheet or layer 410. In FIG. 18E, three jumper wires have been indicated associated with pads 18-JP1, 18 JP2, and 18-JP3 all of which would establish conductive connections between trace 406 and conductive layer 410. The layer 410 serves as zero potential ground (ZPGND). In FIG. 19, a ferrite bead has been indicated at L1 and corresponds with inductance L1 in FIGS. 18E and 20. Each of the inductors L1 through L10 in FIG. 18E and FIG. 18D may be implemented as a surface mounted ferrite bead as shown diagrammatically for L1 in FIG. 19.

Should an electrostatic discharge occur at one of the rivets 321, FIG. 19, it will be seen from FIG. 20, that a current flow path will be present from 321, FIG. 20, through the inductance presented by the associated ferrite bead 401, and through one of the capacitors C38, C39, C40, C29 through C35, FIGS. 18E and 20, to the zero potential ground 410, FIG. 19. It is considered that such current flow paths in conjunction with the further inductances L1 through L10 provide pi filters tending to protect sensitive circuit components on board 404 as shown in FIGS. 18A–18G from detrimental effects of electrostatic discharge. Layer 412, FIG. 19, may be of dielectric material and may cover the entire area of conductive layer 410 to protect the components of printed circuit board 404 from any electrical potential build up on layer 410.

In existing prior art units, electrostatic discharge protection is afforded by use of conductive metallic enclosures or by use of metallic sheathing applied to the inner walls of the enclosure of the devices, such sheathing or metallic enclosures being electrically connected to ground terminals of external devices when interconection of hand-held data entry terminals is effectuated. Such methods of electrostatic discharge protection are susceptible to transient signals coming into the devices over interconnection circuitry from exterior units, though affording reasonable protection from transient signals created by electrostatic discharge arising on the exterior of the unit.

The preferred embodiment of the invention is provided with integrated electrostatic discharge protection associated with the incoming signal paths of the device. Because of this novel advance, the housing of the data entry terminal may be constructed of lighter materials and molded from polymeric materials into an aesthetically pleasing and comfortably held form. The expensive application of metallic sheathing is avoided while isolation of sensitive circuit components from electrostatic discharge transients is achieved.

From the foregoing it is apparent that an object of the invention is to provide a hand-held data entry terminal device having improved isolation of sensitive circuit components from electrostatic discharge transients entering the terminal over interconnection means used for coupling the terminal with external devices.

The claimed invention comprised central processing means and associated control circuitry, the circuitry including signal carrying pathways and having transient suppressing elements associated with the signal carrying pathways. In Ser. No. 07/345,200 as filed Apr. 28, 1989, such transient suppressing elements comprised capacitors C29 through C35, C38, C39, FIG. 18E; C40, FIG. 18D; and inductances L1, L2, L4 through L10, FIG. 18E; and L3, FIG. 18D. It is considered that such transient suppressing circuit elements inherently provided static discharge protection substantially exceeding the 4000 volt protection which would be required for signal carrying pathways associated only with a D type connector fitting such as 549, FIG. 21.

FIG. 21 shows a portable hand-held data capture terminal 510 embodying aspects of the present invention. The terminal 510 has an elongated housing formed of parts 511 and 512, the back housing part 512 of which is formed in a manner so as to enable a user to hold the device comfortably in one hand for extended periods of time. With respect to the contour of housing part 512, reference is made to the disclosure including drawing figures one through fourteen of the corresponding U.S. Pat. No. 4,953,113 is hereby incorporated herein by reference in its entirety.

In the preferred embodiment of the invention, terminal 510 may be powered by a rechargeable nickel-cadmium battery pack 514 (FIG. 25) or a plurality of AA size batteries. Enclosed within the terminal housing 511, 512 are four permanently mounted printed circuit boards 516–519, FIG. 22, namely a host printed circuit board 516, a display printed circuit board 517, a keypad printed circuit board 518, and a peripheral controller printed circuit board 519. Interconnections between the circuit boards are accomplished through a plurality of pin and socket type connectors including pin type connectors 520 and mating receptacle type connectors 521. An exception is the interconnection between display board 517 and keypad board 518 which is accomplished through a resilient conductive pad 523. When assembled, front housing part 511 and back housing part 512 are joined together by a plurality of screws 525.

The front housing part 511 of the terminal 510 provides a mounting platform for a display 527 (FIG. 22) which may provide a visual indication of various types of information. In the preferred embodiment of the invention, display 527 is of a liquid crystal display (LCD) variety providing sixteen lines, with twenty characters per line, of display area. Optionally, the display 527 may be of a four line type. The display 527 may be mounted upon a display printed circuit board 517 which is then mounted or secured to front housing part 511 by a plurality of screws 528. In addition, the front housing part 511 may provide a mounting platform for a keypad 529 (FIG. 21), having a plurality of keys 530 thereon. In the preferred embodiment of the invention, keypad 529 is provided with either twenty-three or forty keys. The control and interface circuitry for keypad 529 may be contained on keypad printed circuit board 518 (FIG. 22) which is mounted or secured to front housing part 511 by a plurality of screws 532.

Electrical interconnections between the display printed circuit board 517 and keypad printed circuit board 518 may be accomplished through a resilient, conductive pad 523, which may be located between overlapping portions of the aforementioned circuit boards and retained in this location by means of the pressure exerted upon it when the respective circuit boards are mounted in the housing part 511. Conductive pad 523 may contain a plurality of generally parallel, spaced apart conductive elements embedded within it. The overlapping portions of display printed circuit board 517 and keypad printed circuit board 518 each contain a plurality of coplanar, generally parallel, and evenly spaced apart connector elements 534 and 535, respectively. The respective conductive elements of conductive pad 523, when conductive pad 523 is mounted between the overlapping portions of keypad printed circuit board 518 and display printed circuit board 517, are in positive contact with corresponding aligned connector elements 534 and 535, and provide respective paths for the transfer of electrical signals therebetween. Alternatively, the required electrical interconnections between display printed circuit board 517 and keypad printed circuit board 518 may be accomplished through a flexible multi-conductor ribbon type cable.

The back housing part 512 of the terminal 510 may provide a mounting platform for a removable, elastic type flexible strap 537 (FIG. 22). Flexible strap 537 may allow the user of the terminal 510 to relax the user's grip on the terminal 510 for short periods of time, without actually removing the terminal 510 from the user's hand. The flexible strap 537 may be secured to the bottom of housing part 512 by means of two retaining clamps 538 (FIG. 22) and 539 (FIG. 25). Retaining clamps 538 and 539 are secured to housing part 512 through the use of screws such as 541, with two screws 541 securing each retaining clamp. In the preferred embodiment of the invention, retaining clamps 538 and 539 may be removed with simple hand tools, allowing the flexible strap 537 to be easily replaced. Beneath the flexible strap 537 and generally between retaining clamps 538 and 539, the bottom of housing part 512 is contoured in such a way that, when the terminal 510 is being held by the user, the user's hand is placed on a recessed area 542 (FIG. 21) in housing part 512 and beneath flexible strap 537.

Referring to FIG. 22, the top end of the terminal 510 may be enclosed with a removable end cap 544. End cap 544 is attached with two screws 545 to housing part 512. When installed on terminal 510, end cap 544 overlies and encloses cavity 547. Located on, and part of the end cap 544 may be a multiple pin D-sub type connector 549, which may in turn be direct or hard wired via a flexible multi-conductor ribbon type cable 550 to a connector platform 551, on which may be mounted two connector receptacles 522 and 523. Cable 550, connector platform 551 and connector receptacles 552 and 553 may also be mounted on and be part of end cap 544. Screws such as 554, FIG. 22, may secure parts 551, 552, 553 in a precise location with only connectors 552, 553 projecting beyond the confines of the end cap housing. The multiple pin D-sub connector 549 may provide a communications port capable of the two-way transfer of data with other compatible devices according to the RS-232C standard as defined by the Electronic Industries Association. When end cap 544 is installed on terminal 510, receptacles 552 and 553 automatically mate with a plurality of pins 557 and 558 which protrude through connector blocks 559 and 560. Pins 557 and 558, and connector blocks 559 and 560 are each attached or connected to peripheral controller board 519. In a preferred embodiment of the invention, the end cap 544 may be removable using common hand tools. Alternatively, a plain type of end cap housing which does not contain a D-sub connector 549 or any of its associated components such as 550–553, may be used in place of end cap 544.

Memory card 564 may currently be used to increase the embedded memory of the terminal 510 by up to five hundred-twelve kilobytes of data, and/or may also contain various application programs which may be run on the terminal 510. In a preferred embodiment memory card 564 may contain up to four megabytes of available memory or programming and still be compatible with computer terminal 510. Memory card 564 may be easily installed in or removed from terminal 510 by removal of end cap 544. With end cap 544 removed, memory card 564 may be inserted in or removed from a mounting/electrical contact block 565 (FIG. 24). The mounting/electrical contact block 565 may be mounted on and electrically connected to the peripheral type memory card controller board 519 (FIG. 22). When memory card 564 is installed in mounting/electrical contact block 565 it occupies the area of cavity 547 and extends through an opening 566 in wall 567. Wall 567 is formed when top housing 511 and bottom housing 512 are joined together.

Memory card controller board 519 may contain the electronic components and circuitry necessary to control the operation of memory card 564, as well as to interface the operation of memory card 564 with that of the terminal 510. In addition, peripheral controller board 519 provides the electronic circuitry required to interface the two-way data transfer which may occur through D-sub connector 549. In a preferred embodiment, controller board 519 may be a peripheral type device which may be exchanged or otherwise configured to enable the use of various types of end cap devices. These various end cap devices may enable terminal 510 to perform a wide variety of functions not currently possible with existing hand held data capture devices including, but in no way limited to, the two-way transfer of data through space using radio frequency waves as the data carrying medium, the two-way transfer of data over telephonic communication links, and the two-way transfer of data between the terminal and a bar code reading device.

Referring again to FIG. 22, the cavity of the housing part 512 receiving the battery pack 514 may be enclosed by a battery compartment hatch 569. The battery compartment hatch 569 may have attached to its surface a plurality of conductive metallic type contacts 572. Metallic contacts 572, in conjunction with a plurality of metallic springs 573 located in the battery compartment 571, may complete the electrical path of the batteries enclosed in the battery compartment 571. When the battery compartment hatch 569 is properly installed on the terminal 510, it comes in contact with a conductive metallic rod 575 (FIG. 25) which extends the length of the battery compartment and is hard wired to battery supply connector 576, FIG. 22, and completes the ground or negative potential path for the batteries. The enclosed batteries are arranged in the battery compartment in a series type configuration to provide the required voltage. The positive potential of the battery path is completed by the hard wiring of a metallic spring 573 to battery supply connector 576. Battery supply connector 576 contains a plurality of receptacles which mate with host board 516 to provide the battery power to the terminal 510. Battery compartment hatch 569 attaches to the bottom housing part 512 of terminal 510 through the interlocking and meshing of railings on both the battery compartment hatch 569 and bottom housing part 512. The battery compartment is formed by a cavity within terminal 510, with a somewhat rectangular opening 578 on which three corners are rounded and one corner is somewhat squared.

Battery pack 514 may be constructed of a plurality of nickel-cadmium battery cells, arranged in such a way as to provide approximately six volts of direct current electrical power. In addition, battery pack 514 may contain a formed metallic plate 581 which may be attached to the nickel-cadmium batteries in such a way as to form a somewhat squared edge on one corner 582 of the battery pack 514. The somewhat squared corner 582 (FIG. 22) of the battery pack 514 may correspond with the previously described somewhat squared corner on the rectangular opening 578 of the battery compartment 571, and may prevent the improper insertion of battery pack 514 into the battery compartment 571. In addition, metallic plate 581 may be further formed to create a conductive metallic shunt 583 (FIG. 22). When battery pack 514 is installed in computer terminal 510, metallic shunt 583 engages probes 584 and 585 (FIG. 25) to create an electrically conductive path or short circuit between the probes 584 and 585. The probes may form part of the battery charging circuit of the terminal 510 and may disable this circuit when not electrically shorted together, thereby preventing the inadvertent and possibly hazardous application of recharging electrical power to non-rechargeable (e.g. alkaline) batteries.

Instead of the metallic shunt 583, a bar type magnet could be placed in one of the valleys between battery cells of the rechargeable battery pack 514, FIG. 22. A magnetic field sensor e.g. a Hall-effect switch would preferably be placed on the underside of the host circuit board 516 in a position so as to respond to the presence of the bar magnet when a rechargeable battery pack was correctly inserted in the battery compartment. When the bar magnet was in the correct position in the battery compartment, the Hall-effect switch would be actuated to enable circuitry to pass the charging current to the battery 514. In the absence of the magnetic field from the bar magnet, the battery charging circuit would be disabled. Such an arrangement would not be as sensitive to variations in the battery pack dimensions as the probe arrangement 584, 585, FIG. 25. The cost of implementation would be low since no discrete wires would need to be connected between the magnetic field sensor and the battery charging control circuit where both the magnetic field sensor and control circuit were located directly on the host circuit board and could be connected by conventional printed circuit conductors. The wall 579 separating the battery compartment from the host circuit board 516 may be relatively thin and is of non-magnetic material to facilitate use of a magnetic field sensor as just described.

In place of the battery arrangement 514, the batteries can be mounted in an enclosed drawer part with square and rounded edges, which slides endwise into a receiving compartment. External contacts on the drawer may be substituted for the array of external contacts as shown at 592, FIG. 25. The rear external contacts at the drawer external wall may be connected with respective spring contacts at the forward end of the drawer which spring contacts engage with fixed contacts in the roof of the battery compartment as the drawer is fully inserted. A coin operated latch may be rotatable through a given angular amount in one direction to lock the battery drawer in place, and may be rotatable in the opposite direction to unlock the battery drawer.

Referring to FIG. 24, a lithium type battery 586 may be mounted upon a host printed circuit board 516 (FIG. 22) and retained in position by a non-conductive type of mounting pod 587. When installed, battery 586 may provide stand-by electrical power to ensure any data stored in the memory circuits is retained should the primary power supply drop below a predetermined level, and may further maintain the operation and memory of an integrated circuit type of real-time clock during the same conditions. The lithium battery 586 may be provided with a electrically non-conductive (e.g. mylar) strip 588 which, when installed between the battery 586 and an electrically conductive battery retaining clip 589, may prevent activation of the stand-by battery power during the aforementioned conditions until such a time as the non-conductive strip 588 is removed by the user. For ease of removal, non-conductive strip 588 may protrude through an opening 590, which may be located on the top end of computer terminal 510 and under the end cap 544 which may be attached thereto.

Electrostatic discharge (ESD) protection may be provided exclusively through circuit techniques and board mounted devices arranged in such a manner as to protect the entire electronic circuitry of terminal 510 from the potentially harmful effects of transient signal phenomena, including that introduced to the terminal 510 through any external connectors such as 592, FIG. 25. The elimination of shielding devices commonly used to provide protection from said transient signal phenomena on previous types of portable data capture terminals may enable lighter, molded polymeric materials to be used in the manufacturing process of certain components.

In the model RT2210 radio data terminal of Norand Corporation, static shock protection is provided against electrostatic discharge up to 16,000 volts. In an embodiment according to FIGS. 21–26, 27, 28A and 28B, the terminal is protected from electrical discharge up to at least 20,000 volts, at the external surface contacts 592, FIG. 25, by the transient suppressing elements of FIGS. 28A, 28B.

Description of FIG. 23

Referring now to FIG. 23, the terminal functional block diagram is illustrated. A central processor unit (CPU) 620 may contain program storage and reside on the host printed circuit board 516. CPU 620 controls all terminal functions, executes machine instructions in proper sequence, and supervises data communication with devices inside and outside the terminal 510. However, it may allow an optional auxiliary processor unit on the peripheral controller board 519 to control some external access (e.g. reading from and/or writing to an auxiliary memory card 564). The CPU 620 may abort all communications throughout terminal 510 should power available from the main batteries (e.g. nickel-cadmium battery pack 514) drop below a predetermined level. All access to static RAM 621, the real time clock 622, the keypad 529 and keypad circuit board 518, and display 527 and display circuit board 517 are accomplished through CPU 620. The CPU 620 also controls the charging current applied to battery pack 514 by control of CHGON line 623, and generates a signal on MEMON line 624 to initiate a sleep mode of the terminal. In addition, CPU 620 allows activation of the 485 circuit and watchdog timer component 625, RS232 level converter 626, and the backlight of display 527.

The memory in static RAM 621 is decoded in the decode circuit 627. MEMDIS line 628 is coupled with this circuit and will inhibit access to static RAM 621 in the event the five volt regulator 629 has dropped out of regulation, indicating the installed batteries (e.g. nickel-cadmium battery pack 514) are no longer providing the necessary voltage. In the preferred embodiment of the invention, memory in the static RAM may be selectively configured in one of varying sizes.

The terminal 510 may be equipped with a battery/charge monitor circuit 630 as well as a battery charge circuit 631. The battery/charge monitor circuit 630 monitors the main battery and provides a signal on the LOWBATT line if battery voltage drops below a certain value. The signal on the LOWBATT line informs the CPU 620 that battery power is getting low, and CPU 620 in turn will notify the user through the display 522. The terminal 510 will continue to operate normally as long as the LOWBATT line remains in a high logical state. If the LOWBATT line goes low, the terminal 510 will switch to its inactive (sleep) state, but will be allowed to become active if a key 530 (FIG. 21) is pressed. A further output of the monitor component 630 is the DDEC line. The DDEC line provides a true indication if the five volt regulator 629 begins to drop out of regulation. When the DDEC line goes low, the terminal 510 switches to sleep mode promptly, saving all data in the static RAM 621, which will have backup power in the event that the main batteries are removed. Finally, when the output of the main batteries (through five volt regulator 629) drops to a predefined level, the MEMDIS line 628 will carry a low logical signal, causing the static RAM 621 to be disabled, the CPU 620 to be reset and the transistor 633 (FIG. 26),located in the power isolation circuit 634, to switch to nonconducting mode. The CPU 620 is equipped with an analog input port which allows it to monitor several other battery/charge conditions. The signals available at this port may provide information regarding the charge level, and the voltage level of any power source of an inserted memory card. Another signal which may be monitored here is an extended duration signal emanating from the KEYINT line 635. The controller board 519 may also provide an interrupt signal on PERINT line 636, which is made available to the CPU 620 on this analog port.

The charge circuit 631 is disabled unless a shorting mechanism (conductive metallic plate 583, FIG. 22) which is located on and part of the nickel-cadmium battery pack 514, is present and properly installed in the battery compartment as described previously. Charging of an installed nickel-cadmium battery pack 514 occurs automatically when a charge voltage of a predetermined value is present on CHARGE line 637. Charging of the installed nickel-cadmium battery pack 514 may occur selectively at a rate of approximately twenty milliamps or a rate of approximately seventy-five milliamps, and is determined by the terminal software through CPU 620. The CPU 620 also monitors the ambient air temperature and, if below a predetermined level, preferably approximately five degrees Celsius, the CPU 620 causes the LOWTEMP line to provide a signal, which causes constant current charge to default to the lower charge (twenty milliamps) rate. When terminal 510 is first attached or otherwise connected to a charger, the CHGDET line 639 goes active for approximately four milliseconds, then returns to its inactive state. This causes NMI generator 640 to generate a pulse to wake the terminal 510 from its sleep mode and signal that a charger is present.

A charger must be attached to terminal 510 for the 485 circuit and watchdog component 625 to function, as this circuit is powered by the charger. The 485 circuit and watchdog circuitry 625 may provide the terminal 510 with a communications port capable of synchronous two-way data communication with other compatible devices, transferring data at a rate not greater than five hundred thousand bits per second, according to the predominate RS485 standard as defined by the Electronic Industries Association. When CPU 620 detects the presence of a charger, it activates the 485 circuit and watchdog through 4850N line 641. Data may then be transmitted and received by terminal 510 on RS485 DATA+line 642 and RS485 DATA–line 643, these lines being connected to a pair of a number of coplanar, generally parallel and evenly spaced conductive metallic pads 592 (FIG. 25). Received data is applied to the CPU 620 from the 485 circuit and watchdog circuit 625 on 485RXD line 645, while transmitted data is applied to the 485 circuit and watchdog circuit 625, from CPU 620, on 485TXD line 646.

Five volt regulator 629 may operate from either the main battery supply or an attached charger. If both are present, the output voltage of the charger will be higher than the battery voltage, causing five volt regulator 629 to choose current from the charger supply rather than the batteries. This is accomplished through "OR" wiring of diodes 647 and 648.

Terminal 510 has been designed to be in an inactive state (sleep mode) for the majority of time to conserve battery power. NMI line 650 must be pulsed for terminal 510 to wake up and begin program execution. The pulse on NMI line 650 is generated by the NMI generator 640 and may be generated by a pulse on KEYINT line from the keypad 529, a pulse on RTCINT line from the real time clock 622, simultaneous pulses on LOWBATT line and DDEC line, a pulse on CHGDET line 639, a pulse on PERINT line 636 from peripheral controller board 519, or a pulse on the PWRUP line (from the 5V regulator 629).

Power is applied to the peripheral controller board 519 under the control of CPU 620. Once the controller board power is stable and the controller board microprocessor is stable, the controller board microprocessor begins a hand shaking sequence with CPU 620 to establish a communication link. This link has some software support to monitor data integrity throughout the transfer of data. The controller board 519 is equipped with a pair of analog switches which isolate the data bus on the controller board 519 from the memory data bus on the host printed circuit board 516. This isolation prevents inadvertent data bus interference during the power up routine of the peripheral controller board microprocessor. The memory card controller board microprocessor controls all address and data bus generation required to access memory card 564. The power to the memory card 564 is enabled by a sequenced combination of signals both from the CPU of the host board 516 and the microprocessor of the memory card controller board 519. When power to memory card 564 is off, the contents of the random access memory (RAM) of memory card 564 may be maintained by a lithium battery located on a part of memory card 564, unless a charger is attached to terminal 510, in which case power for memory card 564 will be supplied by the charger.

Description of FIG. 26

Referring to FIG. 26, unique battery charging and terminal sleep mode circuits are illustrated. When terminal 510 is attached or otherwise connected to a compatible recharging device, a charging voltage may be introduced on the CHRGX line 661 (FIG. 26). The charging voltage on CHRGX line 661 may then be applied to a voltage regulating device 662 e.g. type LP 2951 ACM. The regulated charging voltage output of regulating device 662 may be applied to a transistor switch 663 through a resistor R63. Transistor switch 663 may be software controlled, and may be activated or turned on when the signal on CHGON line 623 changes its logical state, which may cause field effect transistor 665 to change state which then may cause transistor switch 663 to change state. Transistor switch 663 may provide a constant charging current through a diode CR3, to the installed battery pack 514, for a predetermined length of time. The charging current may be applied to installed battery pack 514 through metallic terminals in the battery compartment shorted by metallic shunt 583 on the battery pack, FIG. 22.

The sleep mode circuitry of terminal 510 monitors the input activity of the terminal 510 and, when no activity is detected for a predetermined length of time, may cause the terminal 510 to shift to a stand-by or sleep mode to conserve the power supplied by the installed batteries. When in the inactive state, the memory array and real time clock circuits of terminal 510 require less power than when in an active state. In operation, when the terminal 510 has been inactive (e.g. no keys 530 are pressed on keypad 529) for a predetermined amount of time, MEMON line 624 may pulse. This pulse may be sensed on the CLK input of flip-flop integrated circuit 671, which may cause its Q output to switch levels. Resistor R140 and capacitor C96 may ensure that no false signals are received by flip-flop 671. The Q output of flip-flop 671 is designated MEMSW line 672. The state of MEMSW line 672 may cause field effect transistor 673 to change state. MEMSW line 672 may be filtered by resistor R88 and capacitor C93. When field effect transistor 673 changes states, it greatly reduces the amount of current flowing through the base of transistor 633 by causing resistor R59 to be placed in series with resistor R60. The greatly reduced current flow through the base of transistor 633 allows the regulated supply of the terminal 510, provided by the power of the installed batteries applied through a voltage regulating device, to provide less current, thus increasing the active life of the installed batteries.

When terminal 510 again becomes active (e.g. a key 530 is depressed on keypad 529) NMI line 650 may pulse. The pulse on NMI line 650 may be sensed by flip-flop 671, FIG. 26, at its CLR input, and may then cause the Q output of flip-flop 671 to change state. The state of MEMSW line 672, FIG. 26, at the Q output of flip-flop 671 may now cause field effect transistor 673 to reset to its former state, returning current flow through the base of transistor 633 to its active level.

The terminal 510 may operate exclusively from the power supplied through a regulating device by the installed batteries (e.g. battery pack 514, FIG. 22) until the MEMDIS line 628, FIG. 26, changes state. The MEMDIS line may change state when the installed batteries or attached charger do not provide sufficient voltage to operate the terminal. When the MEMDIS line changes state, it may change the state of field effect transistor 680. The MEMDIS line may be filtered by resistor R141 and capacitor C94. When field effect transistor 680 changes state it may cause interruption of current flow through the base of transistor 633, effectively removing the regulated supply of terminal 510 from the memory array. When this occurs, the standby lithium battery 586, FIG. 23, or a charged capacitor may supply the memory array and real time clock circuits until such time that the main power supply is returned to the level required to power the terminal 510. A charged capacitor may provide short term back-up power for the terminal 510, with the lithium battery providing power when the stored charge of the capacitor is depleted. The lithium battery 586 may provide long term back-up power. When the main power of terminal 510 is restored to an operational level, the MEMDIS line 628, FIG. 26, may return to its former state which may restore normal current flow through the base of transistor 633.

Further Discussion of FIGS. 23 and 26

It will be apparent to those skilled in the art that the diagrams diagrams of FIGS. 23 and 26 are for the purpose of illustration of selected circuit features. Certain simplifications have been made. For example, standard parts such as data bus and address bus components are omitted to avoid cluttering the drawings with too many lines; further, e.g. in an actual circuit according to FIG. 26, pin 4 of the regulator 662 is actually connected to ground through a parallel circuit comprised of two zener diodes type TMPZ5240 each of a ten volt value. Thus circuit point 690 is connected with the cathodes of the two zener diodes, and the anodes of the two zener diodes are connected to ground. The shunt conductor indicated at 583-1 in FIG. 23 may be taken as representing the shunt conductor 583 of FIG. 22. The below listed components were given the indicated circuit values in an implementation of FIG. 23:

R63 17.4 ohms 0.125 watt 1%
R64 61.9 ohms 0.125 watt 1%
R61 475 ohms 0.125 watt 1%
R58 one megohm 0.125 watt 1%
Transistors 663 and 665 were implemented as follows:
Transistor 663 type MMBT 3906
Transistor 665 type ZVN 3306
Arrowheads have been added in FIG. 23 to indicate exemplary directions of information flow in case this may facilitate consideration of the drawings.

Description of FIGS. 27, 28A, 28B, 29–31

FIG. 27 shows printed circuit board 516 with twelve conductive pads generally designated 690 in FIGS. 22 and 27, and specifically designated J1-1 through J1-12 in FIGS. 27 and 28A. The surface contacts 592, FIG. 25, may be formed as shown in FIGS. 29–31, so that U-shaped part 691 embraces a grooved edge of end wall 511A, FIG. 25, e.g. with a tongue part 692, FIGS. 29–30, tending to retain the U-shaped part 691 engaged with the end wall 511A. The free end part 693 includes a deflectable contact part 694 for pressure engagement with a respective pad 690 of printed circuit board 516.

A header is indicated at 520, FIG. 22, on the host printed circuit board 516, for connecting with a receptacle 521 on the peripheral device circuit board 519. One of such headers may be associated with lines 701–706, FIG. 28A, and the header positions may bear the designations as follows:

| Associated Line, FIG. 28A | Header Position Designation |
| --- | --- |
| 701 | DTR |
| 702 | DSR |
| 703 | TXD |
| 704 | RTS |
| 705 | CTS |
| 706 | RXD |

It is found that a D type connector such as 549, FIG. 21, does not require the same electrostatic discharge protection as the surface contacts 592, FIG. 25, since when a potential source exceeding about 4000 volts is brought into proximity to the connecter 549, an arc is produced to the grounded conductive shell of the connector, even with a probe disposed at the center of the connector.

Surge protector component 710, FIG. 27, is located closely adjacent contact pads 690, and is electrically connected with pads J1-4 through J1-9 as illustrated in FIG. 28A, the individual surge protection elements being designated SP1-1 through SP1-6 in FIG. 28A. The interposed series resistors are designated 28-R4, 28-R6, 28-R8, 28-R15, 28-R16 and 28-R17, and each may have a value of one kilohm, 0.125 watt, 1%.

The exemplary electrostatic discharge protection for external surface contacts 592, FIG. 25, as shown in FIGS. 27 and 28A provides protection to level converter 626, FIG. 23, (e.g. type MAX 236) up to 20,000 volts, for example at the following listed ports.

| Line, FIGS. 28A | Signal Designation | Port of Communications Component Type MAX 236 | |
|---|---|---|---|
| | | Pin | Designation |
| 701 | DTR | 24 | T4 OUT |
| 702 | DSR | 16 | R3IN |
| 703 | TXD | 2 | T1 OUT |
| 704 | RTS | 3 | T2 OUT |
| 705 | CTS | 23 | R2 IN |
| 706 | RXD | 4 | R1 IN |

Reference numerals 701–706 have correspondingly been applied to the lines connected with these ports of component 626 in FIG. 23.

The CHRG input from contact J1-12 is connected with CHRGX line 661, FIGS. 26 and 28A, via a conductor 717 having a shunt zener diode 28-TZ1, type SMBG20.0A, twenty volts. An inductance 28-L1, 270 microhenries, could be introduced in series between conductors 717 and 661 by severing the shunt conductor 718.

FIG. 28B shows the circuitry associated with pads J1-10 and J1-3, and lines 720 and 721 (designated 485+ and 485−). For component 28-U13 (differential bus transceiver type 75176B), sufficient electrostatic discharge protection is provided by the networks 28-C79, 28-R126 and 28-C80, 28-R127, FIG. 28B.

In FIG. 15 and also in FIG. 25, only dielectric material of the end wall 322, FIG. 15, or end wall 511A, FIG. 25, is in the vicinity of the surface contacts at the exterior of the terminals. Thus there is no external conductive shield in the vicinity of the surface contacts comparable to the metal shield of the D-connector 549, FIG. 21. The external surfaces of the housings are free of such grounded shields over distances about each surface conductor which are large in comparison to the spacing between such surface conductors.

The provision of a high-performance portable data terminal which may be coupled to a ruggedized modular printer has virtually eliminated the use of manual route books and handwritten invoices in the beverage, snack, dairy and bakery delivery industries. Commonly available printer systems may be adapted to connect with either the electrical connector fitting 549 of FIG. 21 or with the external surface contacts 592, FIG. 25.

Certain aspects of the modular printer system are described and claimed in a copending application of George E. Chadima, Jr. and Darald R. Schultz, U.S. Ser. No. 07/549,298 filed Jul. 5, 1990.

It will be apparent that many modifications and variations may be effected without departing from the scope of the novel teachings and concepts of the present disclosure.

Supplementary Discussion Re FIGS. 27–31

It has proven advantageous in the commercial product corresponding to FIGS. 27–31 to provide a conductive coating at the interior of the housing part corresponding to part 512, FIG. 21, and to connect the grounded surface contact e.g. J1-1, FIGS. 27 and 28A directly to the conductive coating. In this way each of the surge protectors SP1-1 through SP1-6 and 28-TZ1 have their grounded sides connected to the conductive coating. The conductive coating may have a surface area greater than an area equal to the product of the length and width of the housing part such as 512. If an ohm meter has its probes applied to the opposite ends of the length dimension of the coating, the resistance reading may be less than one ohm.

We claim:

1. In a data capture system,
    a hand-held data terminal having size and weight to be held in one hand, and having an exterior;
    a rechargeable battery for supplying power to said hand-held data terminal during portable operation;
    a terminal receptacle for releasably receiving said hand-held data terminal for the recharging of said rechargeable battery;
    said hand-held data terminal having electrical contact pads for coupling with said rechargeable battery;
    said terminal receptacle having cooperating electrical contacts for engagement with the electrical contact pads of said hand-held data terminal when inserted into said terminal receptacle such that recharging of said rechargeable battery can be effected via said electrical contact pad and the cooperating electrical contact in engagement therewith,
    said hand-held data terminal having said electrical contact pad substantially flush with said exterior thereof, said cooperating electrical contact of said terminal receptacle being resiliently urged for pressure engagement with said electrical contact pad without requiring any substantial penetration of the terminal receptacle into the hand-held data terminal, and the receptacle engaging the hand-held data terminal and holding the hand-held data terminal to maintain said pressure engagement between said electrical contact pad and the cooperating electrical contact,
    said terminal receptacle having a generally vertical wall with the cooperating electrical contact being resiliently urged in direction away from said vertical wall, and an end of the hand-held data terminal with said electrical contact pad being moved downwardly to align said electrical contact pad with said cooperating electrical contact, and said terminal receptacle having constraining surfaces constraining said end of said hand-held data terminal as it is moved downwardly to ensure alignment of respective electrical contact pads with the respective cooperating electrical contacts.

2. In a data capture system according to claim 1, said terminal having an operating panel at one side thereof, and said terminal receptacle providing user access to the operating panel while the terminal is in the terminal receptacle.

3. In a data capture system according to claim 1, said terminal having a display arranged for visual observation while the terminal is in the terminal receptacle.

4. In a data capture system according to claim 1, said terminal having a manually operable control arranged for manual operation while the terminal is in the terminal receptacle.

5. In a data capture system according to claim 1, said terminal having a manually operated keyboard with from about twenty to about forty individual finger operated keys accessible for manual operation while the terminal is in the terminal receptacle.

6. In a data capture system according to claim 1, said exterior of said hand-held data terminal having an exterior face, said electrical contact pad comprising first and second electrical contact pads for coupling with said rechargeable battery, and further electrical contact pads, said first and second electrical contact pads and said further electrical contacts all being substantially flush with said exterior face and being arranged in a row, said cooperating electrical contacts comprising first and second cooperating electrical contacts for pressure engagement with said first and second electrical contact pads and further cooperating electrical contacts arranged in a row with said first and second cooperating electrical contacts for pressure engagement with said further cooperating electrical contacts, said terminal having operating panel at one side thereof, and said terminal receptacle providing user access to the operating panel while the terminal is in the terminal receptacle.

7. In a data capture system according to claim 6, said operating panel comprising a display arranged for visual observation while the terminal is in the terminal receptacle.

8. In a data capture system according to claim 6, said operating panel comprising a manually operable control arranged for manual operating while the terminal is in the terminal receptacle.

9. In a data capture system according to claim 6, said operating panel comprising a manually operated keyboard with from about twenty to about forty individual finger operated keys accessible for manual operation while the terminal is in the terminal receptacle.

10. In a data capture system according to claim 6, with contact faces of the respective contact pads and cooperating contacts including a circular rounded contact face for open abutment type pressure engagement and electrical continuity with a cooperating contact face, the contact faces of the respective cooperating contacts being substantially deflected as the hand-held data terminal is positioned in said terminal receptacle for recharging of said rechargeable battery.

11. In a data capture system,
a data capture device having size and weight to be held in one hand, a having rechargeable battery for supplying power thereto during portable operation, and having a data storage for storing data therein,
a device receptacle for releasably receiving said data capture device for the recharging of said rechargeable battery, and for the interchange of data with said data capture device,
said data capture device having a keyboard and display, and said device receptacle providing user access to the keyboard and display while the data capture device is in the device receptacle,
said data capture device having an exterior face and having a row of electrical contact pads generally flush with said exterior face, including first and second electrical contact pads for coupling with said rechargeable battery and further electrical contact pads,
said device receptacle having a row of cooperating electrical contacts including first and second cooperating electrical contacts and further cooperating electrical contacts arranged for engagement with said first and second electrical contact pads and said further electrical contact pads without requiring any substantial penetration of the device receptacle into the data capture device,
said device receptacle having a generally vertical wall with said row of cooperating electrical contacts arranged horizontally for individual pressure engagement with said first and second and further electrical contact pads, said data capture device when fully assembled being held by said device receptacle with said exterior face thereof confronting said generally vertical wall and with said cooperating electrical contacts individually resiliently urged against the respective first and second and further electrical contact pads, said data capture device with said row of electrical contact pads disposed horizontally being moved downwardly to align said row of electrical contact pads with said row of cooperating electrical contacts, and said device receptacle constraining said data capture device as it is moved downwardly to ensure alignment of the first and second and further electrical contact pads with respective cooperating electrical contacts.

12. In a data capture system according to claim 11, said device receptacle having a charging potential input connected with said first and second cooperating electrical contacts of said row of cooperating electrical contacts, and serving to supply battery charging current to said rechargeable battery means via said first and second electrical contact pads, at least one of the further electrical contact pads and the further cooperating electrical contacts serving to couple a direct current voltage between said data capture device and said device receptacle.

13. In a data capture system according to claim 11, the device receptacle having RS-232 interface circuitry and a power input for the interchange of data and power with the data capture device.

14. In a data capture system according to claim 13, the power input being connected to said first and second cooperating electrical contacts, one of the further cooperating electrical contact supplying a direct current potential.

15. In a data capture system according to claim 11, said data capture device having a recharging circuit connected with one of said electrical contact pads, comprising a voltage regulator and electrostatic discharge protector coupled between said one of said electrical contact pads and said voltage regulator.

16. In a data capture system according to claim 11, said data capture device having electronic circuit elements subject to damage by electrostatic discharge, connected with respective ones of said row of electric contact pads, and electrostatic discharge protector coupled between the respective ones of said row of electric contact pads and the electronic circuit elements, the electrostatic discharge protector comprising a zero potential ground plane, and a capacitatively coupling with the contact pads to the zero potential ground plane.

17. In a data capture system,
a hand-held data terminal having size and weight to be held in one hand, and having an exterior;
a rechargeable battery for supplying power to said hand-held data terminal during portable operation;
a terminal receptacle for releasably receiving said hand-held data terminal for the recharging of said rechargeable battery;
said hand-held data terminal having electrical contact pads for coupling with said rechargeable battery;
said terminal receptacle having cooperating electrical contacts for engaging with the electrical contact pads of said hand-held data terminal when inserted into said terminal receptacle such that recharging of said rechargeable battery can be effected via said electrical contact pad and the cooperating electrical contact in engagement therewith, said hand-held data terminal having said electrical contact pad substantially flush with said exterior thereof, said cooperating electrical contact of said terminal receptacle being resiliently urged for pressure engagement with said electrical contact pad without requiring any substantial penetration of the terminal receptacle into the hand-held data terminal, and the receptacle engaging the hand-held data terminal and holding the hand-held data terminal to maintain said pressure engagement between said electrical contact pad and the cooperating electrical contact, said terminal receptacle having a wall with the cooperating electrical contact being resiliently urged in direction away from said wall, and an end of the hand-held data terminal with said electrical contact pad being moved to align said electrical contact pad with said cooperating electrical contact, and said terminal receptacle having constraining surfaces constraining said end of said hand-held data terminal as it is moved to ensure alignment of respective electrical contact pads with the respective cooperating electrical contacts.

18. In a data capture system according to claim 17, said terminal having an operating panel at one side thereof, and said terminal receptacle providing user access to the operating panel while the terminal is in the terminal receptacle.

19. In a data capture system according to claim 17, said terminal having a display arranged for visual observation while the terminal is in the terminal receptacle.

20. In a data capture system according to claim 17, said terminal having a manually operable control arranged in manual operation while the terminal is in the terminal receptacle.

21. In a data capture system according to claim 17, said terminal having a manually operated keyboard with from about twenty to about forty individual finger operated keys accessible while the terminal is in the terminal receptacle.

22. In a data capture system according to claim 17, said exterior of said hand-held data terminal having an exterior face, said electrical contact pad comprising first and second electrical contact pads for coupling with said rechargeable battery, and further electrical contact pads, said first and second electrical contact pads and said further electrical contacts all being substantially flush with said exterior face and being arranged in a row, said cooperating electrical contacts comprising first and second cooperating electrical contacts operably in pressure engagement with said first and second electrical contact pads and further cooperating electrical contacts arranged in a row with said first and second cooperating electrical contacts for pressure engagement with said further cooperating electrical contacts, said terminal having operating panel at one side thereof, and said terminal receptacle providing user access to the operating panel while the terminal is in the terminal receptacle.

23. In a data capture system according to claim 22, said operating panel comprising a display arranged for visual observation while the terminal is in the terminal receptacle.

24. In a data capture system according to claim 22, said operating panel comprising a manually operable control arranged for manual operation while the terminal is in the terminal receptacle.

25. In a data capture system according to claim 22, said operating panel comprising a manually operated keyboard with from about twenty to about forty individual finger operated keys operably accessible while the terminal is in the terminal receptacle.

26. In a data capture system according to claim 22, with contact faces of the respective contact pads and cooperating contacts including a circular rounded contact face in open abutment type pressure engagement and electrical continuity with a cooperating contact face, the contact faces of the respective cooperating contacts being substantially deflected as the hand-held data terminal is positioned in said terminal receptacle for recharging of said rechargeable battery.

27. In a data capture system, a data capture device having size and weight to be held in one hand, said data capture device having a rechargeable battery for supplying power thereto during portable operation, and having a data storage for storing data therein, a device receptacle for releasably receiving said data capture device for the recharging of said rechargeable battery, and for the interchange of data with said data capture device, said data capture device having a keyboard and display, and said device receptacle providing user access to the keyboard and display while the data capture device is in the device receptacle, said data capture device having an exterior face and having a row of electrical contact pads generally flush with said exterior face, including first and second electrical contact pads for coupling with said rechargeable battery and further electrical contact pads, said device receptacle having a row of cooperating electrical contacts including first and second cooperating electrical contacts and further cooperating electrical contacts arranged for engaging with said first and second electrical contact pads and said further electrical contact pads without requiring any substantial penetration of the device receptacle into the data capture device, said device receptacle having a wall with said row of cooperating electrical contacts arranged for individual pressure engagement with said first and second and further electrical contact pads, said data capture device when fully assembled being held by said device receptacle with said exterior face thereof confronting said wall and with said cooperating electrical contacts individually resiliently urged against the respective first and second and further electrical contact pads, said data capture device with said row of electrical contact pads being moved to align said row of electrical contact pads with said row of cooperating electrical contacts, and said device receptacle constraining said data capture device as it is moved to ensure alignment of the first and second and further electrical contact pads with respective cooperating electrical contacts.

28. In a data capture system according to claim 27, said device receptacle having a charging potential input connected with said first and second cooperating electrical contacts of said row of cooperating electrical contacts, and serving to supply battery charging current to said rechargeable battery means via said first and second electrical contact pads, at least one of the further electrical contact pads and the further cooperating electrical contacts serving to couple a direct current voltage between said data capture device and said device receptacle.

29. In a data capture system according to claim 27, the device receptacle having RS-232 interface circuitry and a power input for the interchange of data and power with the data capture device.

30. In a data capture system according to claim 27, the power input being connected to said first and second cooperating electrical contacts, one of the further cooperating electrical contact supplying a direct current potential.

31. In a data capture system according to claim 27, said data capture device having a recharging circuit connected with one of said electrical contact pads, comprising a voltage regulator and electrostatic discharge protector coupled between said one of said electrical contact pads and said voltage regulator.

32. In a data capture system according to claim 27, said data capture device having electronic circuit elements subject to damage by electrostatic discharge, connected with respective ones of said row of electric contact pads, and electrostatic discharge protector coupled between the respective ones of said row of electric contact pads and the electronic circuit elements, the electrostatic discharge protector comprising a zero potential ground plane, and a capacitative coupling with the contact pads to the zero potential ground plane.

* * * * *